United States Patent
Morita

(10) Patent No.: US 8,081,579 B2
(45) Date of Patent: Dec. 20, 2011

(54) COMMUNICATION CONTROL APPARATUS, WIRELESS COMMUNICATION APPARATUS, COMMUNICATION CONTROL METHOD AND WIRELESS COMMUNICATION METHOD

(75) Inventor: Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 21 days.

(21) Appl. No.: 12/516,547

(22) PCT Filed: Nov. 28, 2007

(86) PCT No.: PCT/JP2007/072964
§ 371 (c)(1),
(2), (4) Date: Dec. 10, 2009

(87) PCT Pub. No.: WO2008/066078
PCT Pub. Date: Jun. 5, 2008

(65) Prior Publication Data
US 2010/0091660 A1    Apr. 15, 2010

(30) Foreign Application Priority Data

Nov. 28, 2006 (JP) .................. 2006-320231
Dec. 27, 2006 (JP) .................. 2006-352779
Dec. 27, 2006 (JP) .................. 2006-352788
Jan. 30, 2007 (JP) .................. 2007-019626

(51) Int. Cl.
*G01R 31/08* (2006.01)
(52) U.S. Cl. ......... 370/252; 370/253; 370/412; 370/413
(58) Field of Classification Search .................. 370/252, 370/253, 244, 338, 329, 412, 413
See application file for complete search history.

(56) References Cited

U.S. PATENT DOCUMENTS 6,614,763 B1    9/2003    Kikuchi et al. ............... 370/252
(Continued)

FOREIGN PATENT DOCUMENTS

JP    2000-224172    8/2000
(Continued)

OTHER PUBLICATIONS

Japanese language office action dated Oct. 18, 2011 and its English language translation for corresponding Japanese application 2006352779.

*Primary Examiner* — Ricky Ngo
*Assistant Examiner* — David Oveissi
(74) *Attorney, Agent, or Firm* — DLA Piper LLP (US)

(57) ABSTRACT

The communication control apparatus 100 of the present invention carries out complementary communication by selecting plural wireless communication paths 10A, 10B between a wireless communication apparatus 300 and itself. The communication control apparatus 100 includes: a calculation unit (135, 137, 105) for calculating, on the basis of a packet received by way of each wireless communication path, ideal signal-reception timing and allowable limit timing of the received packet at the wireless communication path; a memory unit (107) for receiving and memorizing variation absorbing time at the received packet in the application transmitted from the wireless communication apparatus; and a selection unit (105) for selecting the plural different wireless communication paths such that variation request time, obtained on the basis of the ideal signal-reception timing and the allowable limit timing at each wireless communication path calculated by the calculation unit, does not exceed the variation absorbing time in the application memorized in the memory unit.

13 Claims, 29 Drawing Sheets

U.S. PATENT DOCUMENTS

| | | | |
|---|---|---|---|
| 2001/0009547 A1 | 7/2001 | Jinzaki et al. | 370/390 |
| 2004/0076191 A1* | 4/2004 | Sundqvist et al. | 370/516 |
| 2005/0238013 A1* | 10/2005 | Tsuchinaga et al. | 370/389 |
| 2006/0039335 A1 | 2/2006 | Ono et al. | 370/338 |
| 2006/0067291 A1 | 3/2006 | Nakata | 370/341 |
| 2007/0223467 A1* | 9/2007 | Makiuchi et al. | 370/363 |

FOREIGN PATENT DOCUMENTS

| | | |
|---|---|---|
| JP | 2002-164915 | 6/2002 |
| JP | 2003-008638 | 1/2003 |
| JP | 2006-060579 | 3/2006 |
| JP | 2006-129439 | 5/2006 |

* cited by examiner

FIG. 24

| Transmission band section prior to renewal | Transmission band limit value | Type of limit value |
|---|---|---|
| Rpre0, Rpre1 | Rlmt0 | Type0 |
| Rpre1, Rpre2 | Rlmt1 | Type1 |
| Rpre2, Rpre3 | Rlmt2 | Type2 |
| Rpren-1, Rpren | Rlmtn-1 | Typen-1 |
| Rpren, Rpren+1 | Rlmtn | Typen |

COMMUNICATION CONTROL APPARATUS, WIRELESS COMMUNICATION APPARATUS, COMMUNICATION CONTROL METHOD AND WIRELESS COMMUNICATION METHOD

CROSS REFERENCE TO RELATED APPLICATIONS

Present application is a national stage on international application No. PCT/JP2007/072964 filed on Nov. 28, 2007. This application also claims priorities to and benefits of JP 2006-320231 filed 28 Nov. 2006, JP 2006-352779 and JP 2006-352788 both filed 27 Dec. 2006, and JP 2007-019626 filed 30 Jan. 2007, the entire contents of which are incorporated herein by reference.

TECHNICAL FIELD

The present invention relates to a novel communication control apparatus, wireless communication apparatus, communication control method and wireless communication method, in which plural different wireless communication paths are available for use and, with regard to request band of an application having real time characteristic in use (which application will occasionally be referred to as "application" hereinafter), it is possible to complement a band insufficient in one wireless communication path with the other wireless communication path to implement communication.

BACKGROUND ART

For example, in wireless communication network using internet protocol (IP) groups (which network will occasionally be referred to as "radio IP network" hereinafter), as disclosed in e.g. C. Perkins, "IP Mobility Support (RFC2002)", [online], October 1996, IETF, [searched on 15 Mar. 2006], internet<URL: http://www.ietforg/rfc/rfc2002.txt, what is called "mobile IP" is prescribed to improve mobility of wireless communication apparatuses.

In mobile IP, Care of Address, which is dynamically allocated in accordance with positions of a wireless communication apparatus, is used.

SUMMARY OF INVENTION

Technical Problem

In recent years, there has increasingly been realized an environment where a wireless communication apparatus can use plural radio IP networks (e.g. a mobile phone network and radio LAN network).

If such an environment is provided, it can be considered to carry out communication by using plural radio IP networks simultaneously so that a band insufficient in one radio IP network can be complemented with the other radio IP network.

However, in a case in which one radio IP network functions as a master path and the other radio IP network functions as a slave path such that a band insufficient in the master path is complemented by the slave path, if a transmission band with respect to the slave path is set beyond the allowable band in the path thereof, since the allowable range of the slave path does not meet the band which requires complementation, packets corresponding to the band to be complemented, which are transmitted to the slave path, are temporally accumulated in a buffer present on the slave path and then sequentially transmitted. Due to this, on the reception side, there arises a delay between the packets received by way of the master path and the packets received by way of the slave path. This delay appears, in a VoIP packet, as overtaking of SN (sequence number).

In a real-time application such as VoIP, a jitter buffer is provided in order to absorb variations such as overtaking between packets in the network. However, in a case in which delay between the paths is relatively large and exceeds the buffer capacity of the jitter buffer, the packets delayed exceeding the buffer capacity, if it is received, will be discarded. Therefore, if transmission of the packets exceeding the allowable band were to be continued, the amount of packets accumulated in the buffer present on the path increases (to the limit of the buffer), whereby there arise differences in delay in accordance with the accumulated amount and eventually all of the packets which have been transmitted for complementation will be discarded on the reception side.

In a wireless communication path, in particular, the acceptable band range depends on changes in propagation environment such as fading. Therefore, if transmission of packets is carried out in a state in which the propagation environment is poor by using the same transmission band (transmission rate) as the normal cases, there arise differences in delay and discard of packets.

In order to avoid complementing a band beyond the allowable band, it is necessary to accurately detect variations in the allowable band of the path to be complemented, in particular, band-narrowing of bands and notify the detected results to the transmission side. For example, it is necessary to assume the allowable band of the path on the basis of the reception state of the packets, calculate a transmission band of the path on the basis of the assumption results and the band requested by the application, and transmit to the packet transmitting side a control message (transmission band control Msg) containing the transmission band information thus calculated. Due to this, it is possible to change the transmission band on the basis of the received transmission band control Msg.

However, in a case in which the allowable band of a communication path is narrowed with respect to the transmission band, the packets corresponding to the band exceeding the allowable band is accumulated in the communication path, as described above. Therefore, if packets corresponding to the band exceeding the allowable band is continually transmitted, delay in time due to accumulation increases. In order to avoid this phenomena, it is necessary, in a case in which the allowable band of the communication path is narrowed with respect to the transmission band, to narrow the transmission band to the allowable band or below it at an early stage. However, in order to analyze the allowable band and calculate a transmission band in accordance therewith, it takes a considerable processing time.

Therefore, accumulation, i.e. delay in time, is increased by this processing time, whereby it takes relatively long time to resolve the accumulation problem. The higher the original transmission band is and the lower the allowable band is, the more increase in this accumulation is resulted. In other words, when a transmission/reception state at a relatively high transmission band is rapidly shifted to a transmission/reception state at a very low allowable band, a lot of packets have to be discarded.

In a case of jitter buffer capacity in a real-time application such as VoIP, if communication is carried out only by a single path, packets are delayed depending only on the path and thus it is possible to effect setting only in accordance with the path.

However, if there exist two or more paths having different wireless communication methods, if plural paths are simply selected and one of them is used as a master path, the other is used as a slave path and a band insufficient in the master path is to be complemented by the slave path, since the transmission characteristics at the respective paths are different, a slave path having more significant or much less significant delay characteristics than the master path may be selected.

Due to this, in a case in which a slave path having more significant delay characteristics than the master has been selected, packets arriving by way of the slave path have delay in time more significant than the jitter buffer and are more likely to be discarded even if these packets arrived. In a case in which a slave path having much less significant delay characteristics than the master has been selected, packets arrive quickly, exceeding the buffer capacity of the jitter buffer, whereby there is a concern that these packets is likely to be discarded as overflow.

A first object of the present invention is to provide a communication control apparatus, a wireless communication apparatus, a communication control method and a wireless communication method, in which plural different wireless communication paths, which are the most suitable to an application, are selected, a band insufficient in one of the wireless communication paths is complemented by another wireless communication path such that communication can be carried out and the packets which have arrived can be effectively prevented from being discarded.

A second object of the present invention is to provide a communication control apparatus, a wireless communication apparatus, a communication control method and a wireless communication method, in which plural different wireless communication paths are available for use and when communication is carried out as a band insufficient in one of the wireless communication paths is complemented by another wireless communication path, a transmission band can be appropriately controlled such that packets, which are not reproduced due to delay in the arrival times thereof and thus discarded, will not be generated.

A third object of the present invention is to provide a communication control apparatus, a wireless communication apparatus, a communication control method and a wireless communication method, in which plural different wireless communication paths are available for use and when communication is carried out as a band insufficient in one of the wireless communication paths is complemented by another wireless communication path, the number of packets discarded due to band-narrowing of the communication paths can be effectively decreased.

A fourth object of the present invention is to provide a communication control apparatus, a wireless communication apparatus, a communication control method and a wireless communication method, in which plural different wireless communication paths are available for use and when a band insufficient in one of the wireless communication paths is complemented by another wireless communication path, setting a transmission band beyond an increase limit, which is independent of a propagation environment, with respect to another wireless communication path can be avoided, and a transmission band can be appropriately controlled such that packets, which are not reproduced due to delay in the arrival times thereof and thus discarded, will not be generated.

Solution to Problem

In a first aspect of the invention for achieving the first object, a communication control apparatus, in which plural different wireless communication paths are selected between a wireless communication apparatus and itself, a band insufficient in one of the wireless communication paths is complemented by another wireless communication path with respect to a request band of an application having real time characteristic in use, such that communication between the wireless communication apparatus and a corresponding party is controlled, comprises: a calculation unit for calculating, on the basis of a packet received by way of each wireless communication path, ideal signal-reception timing and allowable limit timing of the received packet at the wireless communication path; a memory unit for receiving and memorizing variation absorbing time at the received packet in the application transmitted from the wireless communication apparatus; and a selection unit for selecting the plural different wireless communication paths such that variation request time, obtained on the basis of the ideal signal-reception timing and the allowable limit timing at the wireless communication path calculated by calculation unit, does not exceed the variation absorbing time in the application memorized in the memory unit.

In a second aspect of the present invention, the communication control apparatus according to the first aspect is characterized in that the selection unit selects as the one wireless communication path a wireless communication path having the slowest allowable limit timing calculated by the calculation unit, of the selected plural different wireless communication paths.

In a third aspect of the present invention, the communication control apparatus according to the first aspect is characterized in that the selection unit obtains the variation request time by subtracting the earliest ideal signal-reception timing from the slowest allowable limit timing calculated by the calculation unit in the selected plural different wireless communication paths.

In a fourth aspect of the present invention for achieving the first object, a wireless communication apparatus, in which plural different wireless communication paths are selected between itself and a communication control apparatus, and a band insufficient in one of the wireless communication paths is complemented by another wireless communication path with respect to a request band of an application having real time characteristic in use, such that wireless communication with a corresponding party by way of the communication control apparatus is effected, comprises: a calculation unit for calculating, on the basis of a packet received by way of each wireless communication path, ideal signal-reception timing and allowable limit timing of the received packet at the wireless communication path; a memory unit for memorizing variation absorbing time at the received packet in the application; and a selection unit for selecting the plural different wireless communication paths such that variation request time, obtained on the basis of the ideal signal-reception timing and the allowable limit timing at each wireless communication path calculated by calculation unit, does not exceed the variation absorbing time in the application memorized in the memory unit.

In a fifth aspect of the present invention, the wireless communication apparatus according to the fourth aspect is characterized in that the selection unit selects as the one wireless communication path a wireless communication path having the slowest allowable limit timing calculated by the calculation unit, of the selected plural different wireless communication paths.

In a sixth aspect of the present invention, the wireless communication apparatus according to the fourth aspect is characterized in that the selection unit obtains the variation request time by subtracting the earliest ideal signal-reception timing from the slowest allowable limit timing calculated by the calculation unit in the selected plural different wireless communication paths of the respective wireless communication paths.

Further, In a seventh aspect of the present invention for achieving the first object, a communication control method, in which plural different wireless communication paths are selected between a communication control apparatus and a wireless communication apparatus, and a band insufficient in one of the wireless communication paths is complemented by another wireless communication path with respect to a request band of an application having real time characteristic in use, such that communication between the wireless communication apparatus and a corresponding party thereof is controlled, comprises the steps of: calculating, on the basis of a packet received by way of each wireless communication path, ideal signal-reception timing and allowable limit timing of the received packet at the wireless communication path; receiving and memorizing variation absorbing time at the received packet in the application transmitted from the wireless communication apparatus; and selecting the plural different wireless communication paths such that variation request time, obtained on the basis of the ideal signal-reception timing and the allowable limit timing at the wireless communication path calculated in the calculating step, does not exceed the variation absorbing time in the application memorized in the memorizing step.

Further, in an eighth aspect of the present invention for achieving the first object, a wireless communication method, in which plural different wireless communication paths are selected between a wireless communication apparatus and a communication control apparatus, and a band insufficient in one of the wireless communication paths is complemented by another wireless communication path with respect to a request band of an application having real time characteristic in use, such that wireless communication with a corresponding party by way of the communication control apparatus is effected, comprises the steps of: calculating, on the basis of a packet received by way of each wireless communication path, ideal signal-reception timing and allowable limit timing of the received packet at the wireless communication path; and selecting the plural different wireless communication paths such that variation request time, obtained on the basis of the ideal signal-reception timing and the allowable limit timing at each wireless communication path calculated by the calculation step, does not exceed a preset variation absorbing time in the application.

Yet further, in a ninth aspect of the present invention for achieving the second object, a communication control apparatus, in which plural different wireless communication paths are available for use between a wireless communication apparatus and itself, and a band insufficient in one of the wireless communication paths is complemented by another wireless communication path with respect to a request band of an application having real time characteristic in use, such that communication between the wireless communication apparatus and a corresponding party is controlled, comprises: a calculation unit for calculating, on the basis of a packet received by way of each wireless communication path, a range of allowable reception timing of packet reception at each wireless communication path; a band-state analyzing unit for analyzing a band state of the wireless communication path on the basis of comparison of reception timing of a packet transmitted at timing other than predetermined timing, with the range of allowable reception timing calculated by the calculation unit with respect to the wireless communication path to which the packet has been transmitted; and a transmission control unit for transmitting to the wireless communication apparatus, based on a result of analysis by the band-state analyzing unit, transmission control information for controlling a transmission band of a packet at the wireless communication path.

In a tenth aspect of the present invention, the communication control apparatus according to the ninth aspect is characterized in that: the band-state analyzing unit analyzes that the allowable band of the wireless communication path is wider than the transmission band when the reception timing of a packet received earlier than the predetermined timing is within the range of the allowable reception timing at the wireless communication path calculated by the calculation unit; and the transmission control unit, when the band-state analyzing unit has analyzed that the allowable band is wider than the transmission band, transmits to the wireless communication apparatus the transmission control information for controllably broadening the transmission band of the wireless communication path.

Yet further, in an eleventh aspect of the present invention for achieving the second object, a wireless communication apparatus, in which plural different wireless communication paths are available for use between a communication control apparatus and itself, and a band insufficient in one of the wireless communication paths is complemented by another wireless communication path with respect to a request band of an application having real time characteristic in use, such that communication between a corresponding party by way of the communication control apparatus is effected, comprises: a calculation unit for calculating, on the basis of a packet received by way of each wireless communication path, a range of allowable reception timing of packet reception at each wireless communication path; a band-state analyzing unit for analyzing a band state of the wireless communication path on the basis of comparison of reception timing of a packet transmitted at timing other than predetermined timing, with the range of allowable reception timing calculated by the calculation unit with respect to the wireless communication path to which the packet has been transmitted; and a transmission control unit for transmitting to the communication control apparatus, based on a result of analysis by the band-state analyzing unit, transmission control information for controlling a transmission band of a packet at the wireless communication path.

In a twelfth aspect of the present invention, the wireless communication apparatus according to the eleventh aspect is characterized in that: the band-state analyzing unit analyzes that the allowable band of the wireless communication path is wider than the transmission band when the reception timing of a packet received earlier than the predetermined timing is within the range of the allowable reception timing at the wireless communication path calculated by the calculation unit; and the transmission control unit, when the band-state analyzing unit has analyzed that the allowable band is wider than the transmission band, transmits to the communication control apparatus the transmission control information for controllably broadening the transmission band of the wireless communication path.

Yet further, in a thirteenth aspect of the present invention for achieving the second object, a communication control method, in which plural different wireless communication paths are available for use between a communication control apparatus and a wireless communication apparatus, and a band insufficient in one of the wireless communication paths is complemented by another wireless communication path with respect to a request band of an application having real time characteristic in use, such that communication between the wireless communication apparatus and a corresponding party is controlled, comprises the steps of: calculating, on the basis of a packet received by way of each wireless communication path, a range of allowable reception timing of packet reception at each wireless communication path; analyzing a band state of the wireless communication path on the basis of comparison of reception timing of a packet transmitted at timing other than predetermined timing, with the range of allowable reception timing calculated with respect to the wireless communication path to which the packet has been transmitted; and transmitting to the wireless communication apparatus, based on a result of analysis of the band-state, transmission control information for controlling a transmission band of a packet at the wireless communication path.

Yet further, in a fourteenth aspect of the present invention for achieving the second object, a wireless communication method, in which plural different wireless communication paths are available for use between a wireless communication apparatus and a communication control apparatus, and a band insufficient in one of the wireless communication paths is complemented by another wireless communication path with respect to a request band of an application having real time characteristic in use, such that communication with a corresponding party by way of the communication control apparatus is effected, comprises the steps of: calculating, on the basis of a packet received by way of each wireless communication path, a range of allowable reception timing of packet reception at each wireless communication path; analyzing a band state of the wireless communication path on the basis of comparison of reception timing of a packet transmitted at timing other than predetermined timing, with the range of allowable reception timing calculated with respect to the wireless communication path to which the packet has been transmitted; and transmitting to the wireless communication apparatus, based on a result of analysis of the band-state, transmission control information for controlling a transmission band of a packet at the wireless communication path.

Yet further, in a fifteenth aspect of the present invention for achieving the third object, a communication control apparatus, in which plural different wireless communication paths are available for use between a wireless communication apparatus and itself; and a band insufficient in one of the wireless communication paths is complemented by another wireless communication path with respect to a request band of an application having real time characteristic in use, such that communication between the wireless communication apparatus and a corresponding party is controlled, comprises: a packet reception monitoring unit for monitoring, on the basis of a packet received by way of each wireless communication path, a band state of the corresponding wireless communication path; an allowable band analyzing unit for analyzing, on the basis of a result of monitoring by the packet reception monitoring unit, i.e. on the basis of a packet received by way of each wireless communication path, a predicted allowable band of a wireless communication path other than a band-narrowed wireless communication path; and a transmission control unit for transmitting to the wireless communication apparatus, on the basis of a result of monitoring by the packet reception monitoring unit, transmission band limiting information for limiting a transmission band of a packet with respect to the band-narrowed wireless communication path and transmitting to the wireless communication apparatus, on the basis of a result of analysis by the allowable band analyzing unit, transmission band control information for broadening a transmission band of a packet with respect to a wireless communication path of which packet-transmission band can be made a broadband.

In a sixteenth aspect of the present invention, the communication control apparatus according to the fifteenth aspect is characterized in that: the packet reception monitoring unit monitors a band state on the basis of a range of allowable reception timing of packets received by way of each wireless communication path and reception timing of a packet received by way of the corresponding wireless communication path; and the allowable band analyzing unit analyzes, in a wireless communication path other than the band-narrowed wireless communication path, a predicted allowable band of the wireless communication path on the basis of comparison of reception timing of a packet transmitted at timing other than predetermined timing, with the range of allowable reception timing corresponding to the wireless communication path.

Yet further, in a seventeenth aspect of the present invention for achieving the third object, a wireless communication apparatus, in which plural different wireless communication paths are available for use between and a communication control apparatus and itself, and a band insufficient in one of the wireless communication paths is complemented by another wireless communication path with respect to a request band of an application having real time characteristic in use, such that communication with a corresponding party by way of the communication control apparatus is effected, comprises: a packet reception monitoring unit for monitoring, on the basis of a packet received by way of each wireless communication path, a band state of the corresponding wireless communication path; an allowable band analyzing unit for analyzing, on the basis of a result of monitoring by the packet reception monitoring unit, i.e. on the basis of a packet received by way of a wireless communication path other than a band-narrowed wireless communication path, a predicted allowable band of the corresponding wireless communication path; and a transmission control unit for transmitting to the communication control apparatus, on the basis of a result of monitoring by the packet reception monitoring unit, transmission band limiting information for limiting a transmission band of a packet with respect to the band-narrowed wireless communication path and transmitting to the communication control apparatus, on the basis of a result of analysis by the allowable band analyzing unit, transmission band control information for broadening a transmission band of a packet with respect to a wireless communication path of which packet-transmission band can be broadened.

In an eighteenth aspect of the present invention, the communication control apparatus according to the seventeenth aspect is characterized in that: the packet reception monitoring unit monitors a band state on the basis of a range of allowable reception timing of packets received by way of each wireless communication path and reception timing of a packet received by way of the corresponding wireless communication path; and the allowable band analyzing unit analyzes, in a wireless communication path other than the band-narrowed wireless communication path, a predicted allowable band of the wireless communication path on the basis of comparison of reception timing of a packet transmitted at timing other than predetermined timing, with the range of allowable reception timing corresponding to the wireless communication path.

Yet further, in a nineteenth aspect of the present invention for achieving the third object, a communication control method, in which plural different wireless communication paths are available for use between a communication control apparatus and a wireless communication apparatus, and a band insufficient in one of the wireless communication paths is complemented by another wireless communication path with respect to a request band of an application having real time characteristic in use, such that communication between the wireless communication apparatus and a corresponding party is controlled, comprises the steps of: monitoring, on the basis of a packet received by way of each wireless communication path, a band state of the corresponding wireless communication path; transmitting to the wireless communication apparatus, on the basis of a result of the monitoring step, transmission band limiting information for limiting a transmission band of a packet with respect to the band-narrowed wireless communication path, analyzing a predicted allowable band of a wireless communication path other than a band-narrowed wireless communication path on the basis of a packet received by way of the wireless communication path, and transmitting, to the wireless communication apparatus, transmission band control information for broadening a transmission band of a packet with respect to a wireless communication path of which packet-transmission band can be made a broadband.

Yet further, in a twentieth aspect of the present invention for achieving the third object, a wireless communication method, in which plural different wireless communication paths are available for use between a communication control apparatus and a wireless communication apparatus, and a band insufficient in one of the wireless communication paths is complemented by another wireless communication path with respect to a request band of an application having real time characteristic in use, such that communication with a corresponding party by way of the communication control apparatus is effected, comprises the steps of monitoring, on the basis of a packet received by way of each wireless communication path, a band state of the corresponding wireless communication path; transmitting to the communication control apparatus, on the basis of a result of the monitoring step, transmission band limiting information for limiting a transmission band of a packet with respect to the band-narrowed wireless communication path, analyzing a predicted allowable band of a wireless communication path other than a band-narrowed wireless communication path on the basis of a packet received by way of the wireless communication path, and transmitting, to the communication control apparatus, transmission band control information for broadening a transmission band of a packet with respect to a wireless communication path of which packet-transmission band can be made a broadband.

Yet further, in a twenty-first aspect of the present invention for achieving the fourth object, a communication control apparatus, in which plural different wireless communication paths are available for use between a wireless communication apparatus and itself, and a band insufficient in one of the wireless communication paths is complemented by another wireless communication path with respect to a request band of an application having real time characteristic in use, such that communication between the wireless communication apparatus and a corresponding party is controlled, comprises: a reception unit for receiving a packet transmitted by way of each wireless communication path; an acquisition unit for acquiring a request band of an application; a recording unit for recording the maximum increase value when a transmission band in which the wireless communication apparatus transmits packets is increased, with associating the maximum increase value with the transmission band of each wireless communication path; and a transmission control unit for transmitting to the wireless communication apparatus, on the basis of the total transmission bands of the plural wireless communication paths and a request band of an application acquired by the acquisition unit, when the total transmission bands are insufficient to the request band, transmission control information for increasing a transmission band of each wireless communication path such that the insufficient band range is covered and the transmission band does not exceed the corresponding maximum increase value recorded in the recording unit.

In a twenty-second aspect of the present invention, the communication control apparatus according to the twenty-first aspect is characterized in that: when a reception band of a packet received by the reception unit does not reach the transmission band which the transmission controlling unit has commanded to the wireless communication apparatus by the transmission control information, the reception band is recorded as a candidate of the maximum increase value to be renewed; when a reception band of a packet received by the reception unit is equal to or exceeds the transmission band which the transmission controlling unit has commanded to the wireless communication apparatus by the transmission control information, the transmission band is recorded as a candidate of the maximum increase value to be renewed; and the maximum increase value in the transmission band is renewed based on the candidate of each maximum increase value.

In a twenty-third aspect of the present invention, the communication control apparatus according to the twenty-second aspect is characterized in that the maximum increase value in the transmission band is renewed based on the candidate of each maximum increase value and a transmission band in which transmission to the wireless communication apparatus is effected.

In a twenty-fourth aspect of the present invention, the communication control apparatus according to the twenty-first aspect is characterized in that the transmission control unit transmits, to the wireless communication apparatus, transmission control information for preferentially increasing a transmission band of a wireless communication path which has not experienced descending variation in band within a predetermined period.

In a twenty-fifth aspect of the present invention, the communication control apparatus according to the twenty-first aspect is characterized in that the transmission control unit transmits, to the wireless communication apparatus, transmission control information for preferentially increasing a transmission band of a wireless communication path having a relatively low transmission band.

Yet further, in a twenty-sixth aspect of the present invention for achieving the fourth object, a wireless communication apparatus, in which plural different wireless communication paths are available for use between a communication control apparatus and itself, and a band insufficient in one of the wireless communication paths is complemented by another wireless communication path with respect to a request band of an application having real time characteristic in use, such that communication with a corresponding party by way of the communication control apparatus is effected, comprises: a reception unit for receiving a packet transmitted by way of each wireless communication path; an acquisition unit for acquiring a request band of an application; a recording unit for recording the maximum increase value when a transmission band in which the wireless communication apparatus transmits packets is increased, with associating the maximum increase value with the transmission band of each wireless communication path; and a transmission control unit for transmitting to the communication control apparatus, on the basis of the total transmission bands of the plural wireless communication paths and a request band of an application acquired by the acquisition unit, when the total transmission bands are insufficient to the request band, transmission control information for increasing a transmission band of each wireless communication path such that the insufficient band range is covered and the transmission band does not exceed the corresponding maximum increase value recorded in the recording unit.

In a twenty-seventh aspect of the present invention, the wireless communication apparatus according to the twenty-sixth aspect is characterized in that: when a reception band of a packet received by the reception unit does not reach the transmission band which the transmission controlling unit has commanded to the communication control apparatus by the transmission control information, the reception band is recorded as a candidate of the maximum increase value to be renewed; when a reception band of a packet received by the reception unit is equal to or exceeds the transmission band which the transmission controlling unit has commanded to the communication control apparatus by the transmission control information, the transmission band is recorded as a candidate of the maximum increase value to be renewed; and the maximum increase value in the transmission band is renewed based on the candidate of each maximum increase value.

In a twenty-eighth aspect of the present invention, the communication control apparatus according to the twenty-seventh aspect is characterized in that the maximum increase value in the transmission band is renewed based on the candidate of each maximum increase value and a transmission band in which transmission to the communication control apparatus is effected.

In a twenty-ninth aspect of the present invention, the communication control apparatus according to the twenty-sixth aspect is characterized in that the transmission control unit transmits, to the communication control apparatus, transmission control information for preferentially increasing a transmission band of a wireless communication path which has not experienced descending variation in band within a predetermined period.

In a thirtieth aspect of the present invention, the wireless communication apparatus according to the twenty-sixth aspect is characterized in that the transmission control unit transmits, to the communication control apparatus, transmission control information for preferentially increasing a transmission band of a wireless communication path having a relatively low transmission band of the respective wireless communication paths.

Yet further, in a thirty-first aspect of the present invention for achieving the fourth object, a communication control method, in which plural different wireless communication paths are available for use between a communication control apparatus and a wireless communication apparatus, and a band insufficient in one of the wireless communication paths is complemented by another wireless communication path with respect to a request band of an application having real time characteristic in use, such that communication between the wireless communication apparatus and a corresponding party is controlled, comprises the steps of receiving a packet transmitted by way of each wireless communication path; acquiring a request band of an application; recording the maximum increase value when a transmission band in which the wireless communication apparatus transmits packets is increased, with associating the maximum increase value with the transmission band of each wireless communication path; and transmitting to the wireless communication apparatus, on the basis of the total transmission bands of the plural wireless communication paths and a request band of an application thus acquired, when the total transmission bands are insufficient to the request band, transmission control information for increasing a transmission band of each wireless communication path such that the insufficient band range is covered and the transmission band does not exceed the corresponding maximum increase value recorded in the recording unit.

Yet further, in a thirty-second aspect of the present invention for achieving the fourth object, a wireless communication method, in which plural different wireless communication paths are available for use between a communication control apparatus and a wireless communication apparatus and a communication control apparatus, and a band insufficient in one of the wireless communication paths is complemented by another wireless communication path with respect to a request band of an application having real time characteristic in use such that communication with a corresponding party by way of the communication control apparatus is effected, comprises: receiving a packet transmitted by way of each wireless communication path; acquiring a request band of an application; recording the maximum increase value when a transmission band in which the wireless communication apparatus transmits packets is increased, with associating the maximum increase value with the transmission band of each wireless communication path; and transmitting to the communication control apparatus, on the basis of the total transmission bands of the plural wireless communication paths and a request band of an application thus acquired, when the total transmission bands are insufficient to the request band, transmission control information for increasing a transmission band of each wireless communication path such that the insufficient band range is covered and the transmission band does not exceed the corresponding maximum increase value recorded in the recording unit.

Advantageous Effects on Invention

According to the first to the eighth aspects of the present invention, it is possible to select plural different wireless communication paths, which are the most suitable for an application, so that the variation request time calculated based on allowable limit timing in each wireless communication path does not exceed variation absorbing time in the application and complement a band insufficient in one of the wireless communication paths by another wireless communication path to carry out communication, whereby discard of packets which arrived can be efficiently reduced.

According to the ninth to the fourteenth aspects of the present invention; a range of allowable reception timing of packet received in each wireless communication path is calculated; a band state of the wireless communication path is analyzed on the basis of the range of allowable reception timing thus calculated and reception timing of a packet transmitted by timing other than predetermined timing at the wireless communication path; and on the basis of a result of the analysis, transmission control information for controlling a transmission band of a packet in the wireless communication path is transmitted to the packet transmission side. Therefore, when a larger transmission band is needed and/or the band has been narrowed, a transmission band can be appropriately controlled by changing the allotment ratio of the transmission band between the plural wireless communication paths when the paths are being used, so that there will be no packets which are discarded without being reproduced due to delay in arriving time thereof.

According to the fifteenth to the twentieth aspects of the present invention; a band state of each wireless communication path is monitored on the basis of received packet and, based on a result of the monitoring, transmission band limiting information for limiting a transmission band of a packet with respect to a band-narrowed wireless communication path is transmitted to the packet transmission side; a predicted allowable band of a wireless communication path other than the band-narrowed wireless communication path is analyzed on the basis of a packet received by way of the wireless communication path; and transmission band control information for broadening the transmission band of a packet with respect to a wireless communication path of which packet-transmission band can be broadened is transmitted to the packet transmission side. Therefore, the number of discarded packets when band-narrowing of a communication path occurs can be efficiently reduced.

According to the twenty-second to the thirty-second aspects of the present invention; the maximum increase value when a transmission band, in which the corresponding party transmits packets, is increased is recorded with associating the maximum increase value with the transmission band of each wireless communication path; and, when the total transmission bands of the plural wireless communication paths are insufficient to the request band of an application, transmission control information, for increasing a transmission band of each wireless communication path such that the insufficient band range is covered and the transmission band does not exceed the recorded corresponding maximum increase value, is transmitted to the corresponding party. Therefore, in complementing a band insufficient in one of the wireless communication paths by another wireless communication path, it can be avoided that the transmission band of the other wireless communication path is set beyond an increase limit which is independent of a propagation environment, whereby the transmission band can be appropriately controlled such that there will be no packets which have to be discarded without being reproduced due to delay in arriving time thereof.

BRIEF DESCRIPTION OF DRAWINGS

FIG. 24 is a view showing a content of a record in a transmission band increase limit table shown in FIG. 23.

| | REFERENCE SIGNS LIST |
|---|---|
| 1 | Communication system |
| 10A, 10B | Radio IP network |
| 10C | Communication network |
| 20 | Network |
| 40 | IP telephone terminal |
| 100 | Switching server |
| 101, 301 | Communication I/F |
| 103, 303 | Reception unit |
| 105, 305 | Path selection unit |
| 107, 307 | Memory unit |
| 109, 309 | Transmission path selection Msg generating unit |
| 111, 311 | Packet transmission path control unit |
| 113, 313 | Transmission path selection Msg analyzing unit |
| 115, 315 | Transmission unit |
| 117 | Communication I/F |
| 131, 331 | Reception portion |
| 133, 333 | Packet reception monitoring unit |
| 135, 355 | Ideal reception timing generating unit |
| 137, 337 | Allowable range calculating unit |
| 141, 341 | Transmission portion |
| 317 | Application processing unit |
| 2 | Communication system |

-continued

REFERENCE SIGNS LIST

| | |
|---|---|
| 150 | Switching server |
| 151Rx, 153Rx, 155Rx, 351Rx, 353Rx | Reception interface unit |
| 151Tx, 153Tx, 155Tx, 351Tx, 353Tx | Reception interface unit |
| 157, 357 | Packet reception monitoring unit |
| 159, 359 | Allowable band analyzing unit |
| 161, 361 | Transmission band calculating unit |
| 163, 363 | Transmission band control Msg analyzing unit |
| 165, 365 | Allowable band test-implementing unit |
| 167, 367 | Transmission path selection unit |
| 350 | Mobile node (MN) |
| 355 | Application processing unit |
| 3 | Communication system |
| 200 | Switching server |
| 201Rx, 203Rx, 205Rx, 401Rx, 403Rx | Reception interface unit |
| 201Tx, 203Tx, 205Tx, 401Tx, 403Tx | Reception interface unit |
| 207, 407 | Packet reception monitoring unit |
| 209, 409 | Allowable band analyzing unit |
| 211, 411 | Message analyzing unit |
| 213, 413 | Packet transmission path control unit |
| 215, 413 | Transmission path selection unit |
| 400 | Mobile node (MN) |
| 405 | Application processing unit |
| 4 | Communication system |
| 250 | Switching server |
| 251Rx, 253Rx, 255Rx, 451Rx, 453Rx | Reception interface unit |
| 251Tx, 253Tx, 255Tx, 451Tx, 453Tx | Reception interface unit |
| 257, 457 | Packet reception monitoring unit |
| 259, 459 | Allowable band calculating unit |
| 261, 461 | Increase limit table renewal unit |
| 263, 463 | Transmission band increase limit table |
| 265, 465 | Transmission band increase limit unit |
| 267, 467 | Transmission band control Msg analyzing unit |
| 269, 469 | Packet transmission path control unit |
| 271, 471 | Transmission path selection unit |
| 450 | Mobile node (MN) |
| 455 | Application processing unit |

DESCRIPTION OF EMBODIMENTS

Next, an embodiment of the present invention will be described with reference to drawings.

First Embodiment (Overall Schematic Structure of Communication System)

Figure 1:
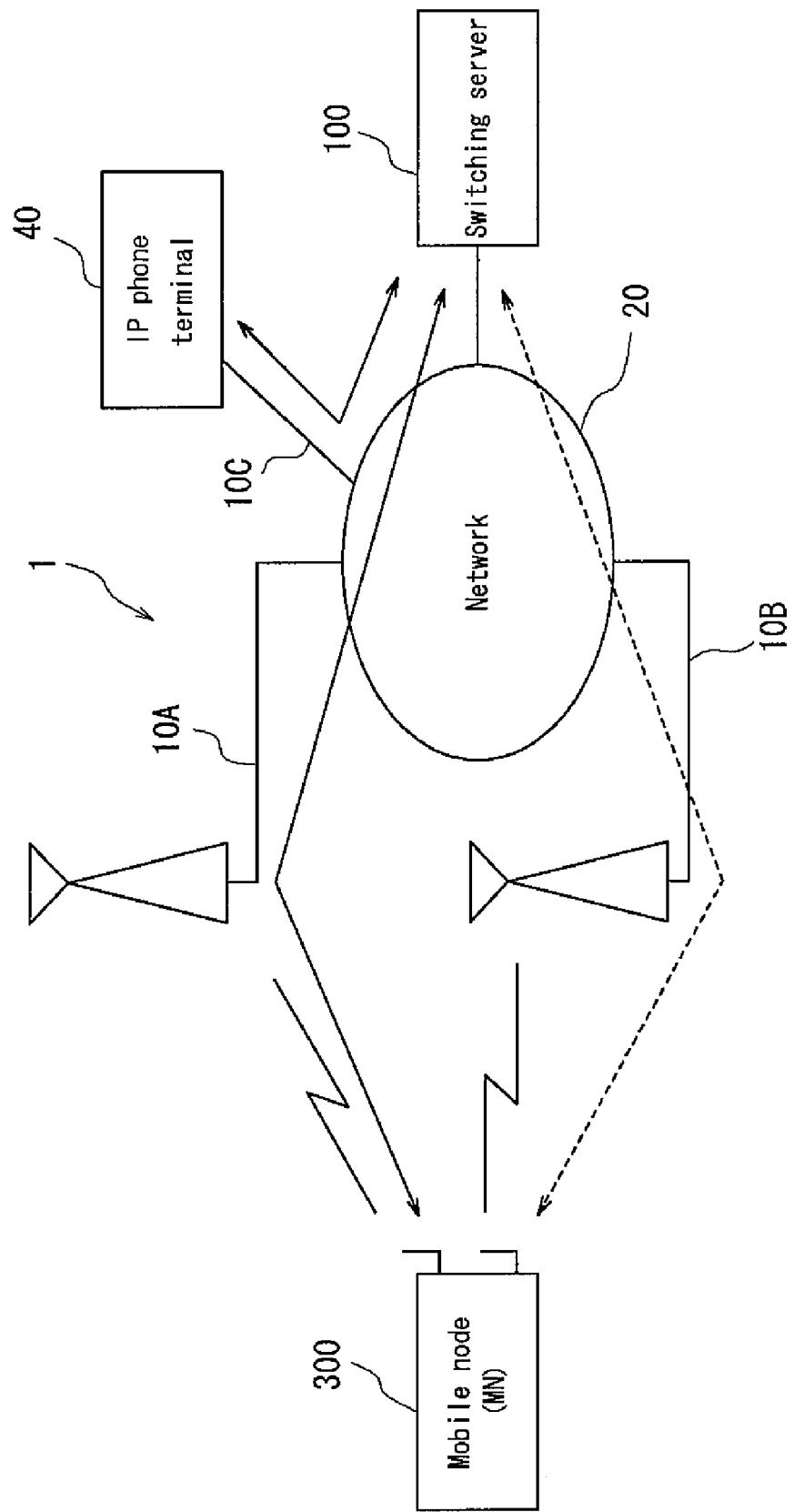
FIG. 1 is a overall schematic structural view of a communication system of an embodiment of the present invention

FIG. 1 is an overall schematic structural view of a communication system 1 according to a first embodiment of the present invention. As shown in FIG. 1, the communication system 1 includes a radio IP network 10A and a radio IP network 10B as plural different wireless communication paths available to mobile node 300 which is a wireless communication apparatus (the mobile node 300 will be referred to as "MN300" hereinafter). The radio IP network 10A is an IP network capable of transmitting IP packets. The radio IP network 10A dynamically allots Care of IP Address to MN300 in accordance with the position of MN300. This radio IP network 10A is, for example, a mobile phone network using CDMA (specifically, HRPD as the standard of 3GPP2) as the wireless communication method.

The radio IP network 10B can transfer IP packets in a manner similar to that of the radio IP network 10A. The radio W network 10B allots Care of IP Address to MN300. The radio IP network 10B is, for example, mobile WiMAX according to the prescriptions of IEEE802.16e as the wireless communication method.

The Care of IP Address at the radio IP network 10A is provided from the radio IP network 10A when MN300 is connected with the radio IP network 10A. Similarly, the Care of IP Address at the radio IP network 10B is provided from the radio IP network 10B when MN300 is connected with the radio IP network 10B. Further, the Care of IP Addresses at the radio IP network 10A and the radio LP network 10B are made to correspond to home IP addresses (virtual addresses).

In FIG. 1, in order to simplify the drawing, two radio IP networks 10A and 10B are shown. However, different wireless communication paths where MN300 can be used are not restricted to these radio IP network 10A and radio IP network 10B and a larger number of radio IP networks may be used.

Plural radio IP networks including the radio IP network 10A and the radio IP network 10B are connected to a network 20 such as internet or the like. To the network 20, a switching server 100, constituting a communication control apparatus for controlling the wireless communication paths with MN300, is connected.

The switching server 100 has VPN router function for implementing a routing process of an IP packet and ensures IP mobility of MN300 by establishing a tunnel of VPN (IPSec) between MN300 and the switching server 100 to realize virtualization of OSI layer 3.

Specifically, in the present embodiment, different from the case of mobile IP (for example, RFC2002), MN300 selects plural radio IP networks, for example, the radio IP network 10A and the radio IP network 10B, according to an application, further selects as the master path one of the radio LP networks, for example, the radio IP network 10A from the selected plural IP networks, sets other radio IP network(s) 10B as the slave paths, and simultaneously uses these plural radio IP networks, with complementing a band insufficient in the master path with respect to the request band of the application by the slave path(s), to implement communication with a communication counterpart (specifically, an IP phone terminal 40).

The switching server 100 is connected with the IP phone terminal 40 by way of a communication network 10C connected with the network 20. The IP phone terminal 40 converts phonetic signals and VoIP packets with each other and/or transmits/receives IP packets.

Specifically, the switching server 100 (communication apparatus) receives an IP packet (VoIP packet) which MN300 (wireless communication apparatus) has transmitted to the IP phone terminal 40 (the communication counterpart) by using the selected plural different radio IP networks, with complementing insufficient band by a predetermined cycle (20 ms). The switching server 100 then relays the IP packet to the IP phone terminal 40. Further, the switching server 100 receives an IP packet (VoIP packet) which the IP phone terminal 40 has transmitted to MN300 in a predetermined cycle (20 ms) and relays the IP packet to MN300, with complementing insufficient band by using the selected plural different radio IP networks.

In the present embodiment, when a session is established with respect to the switching server 100 from the MN300 side, prior to actual implementation of the application, a control message is transmitted from MN300 to the switching server 100 by way of every available radio IP network. To a control message transmitted to one of the available radio IP networks, e.g. a radio IP network which has been preset in accordance with the application, application information including allowable time (Tapr) of a jitter buffer, as variation absorbing time of a received packet in the application, is inserted.

Further, the switching server 100 receives the control message transmitted by MN300, memorizes the allowable time (Tapr) included in the application information, and calculates ideal reception timing and allowable limit timing of packet received at each radio IP network. Then, on the basis of the ideal reception timing and allowable limit timing at each radio IP network thus calculated and the allowable time (Tapr), there are selected plural radio IP networks which are the most suitable for the application, in which networks variation request time, i.e. accumulation request time (Tjit) of jitter buffer in which no packet arriving from any radio IP network is discarded, does not exceed allowable time (Tapr). The switching server 100 transmits to MN300 information of the selected radio IP network and the allowable band (range) as a transmission path selection message (Msg). Accordingly, in the switch server 100 and MN300, the application is implemented with complementing the insufficient band by simultaneously using the selected plural radio IP networks.

On the other hand, when a session is established from the switching server 100 side to MN300, similarly, prior to actual implementation of the application, a control message is transmitted from the switching server 100 to MN300 by way of every available radio IP network.

Allowable time (Tapr) for each application is stored in advance at MN300, so that allowable time (Tapr) corresponding to the application which is to be executed is read out when MN300 receives a control message transmitted by the switching server 100. Accordingly, in this case, it is not necessary that the application information of a control message transmitted from the switching server 100 includes allowable time (Tapr). Further, MN300 calculates, based on the packets of the control message received by way of each radio IP network, ideal reception timing and allowable limit timing of received packets at each radio IP network and selects, based on the ideal reception timing and allowable limit timing at each radio IP network and allowable time (Tapr) thus read out, plural radio IP networks which are the most suitable for the application, in which networks accumulation request time (Tjit) of jitter buffer as variation request time does not exceed allowable time (Tapr). MN300 transmits to the switching server 100 the information of the selected radio IP networks and the allowable band as a transmission path selection message (Msg). Accordingly, in the switch server 100 and MN300, the application is implemented with complementing the insufficient band by simultaneously using the selected plural radio IP networks.

Next, the functional block structure of the communication system 1 will be described. Specifically, the functional block structures of the switching server 100 and MN300 included in the communication system 1 will be described, and portions thereof which are relevant to the present embodiment will mainly be described below. It should be noted that the switching server 100 and MN300 may be provided with a logic block (power source portion) or the like, which is not either illustrated in the drawings or described below but essentially required to realize the functions of the apparatus.

(Switching Server 100)

Figure 2:
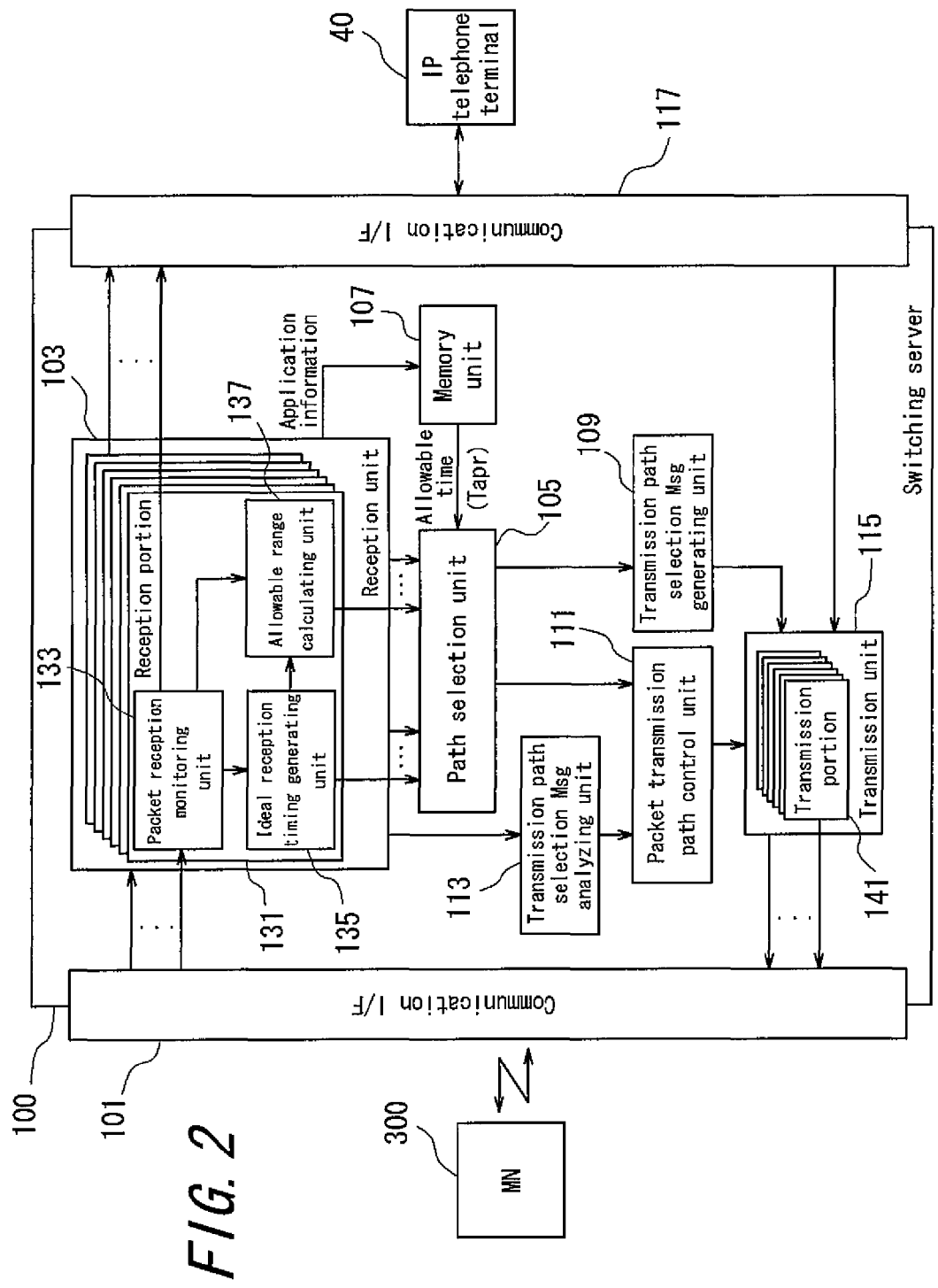
FIG. 2 is a functional block structural view of a switching server as shown in FIG. 1.

FIG. 2 is a functional block diagram showing a structure of the main portions of the switching server 100. The switching server 100 includes communication interface (I/F) 101 with MN300, a reception unit 103, a path selection unit 105, a memory unit 107, a transmission path selection Msg (mes-sage) generating unit 109, a packet transmission path control unit 111, a transmission path selection Msg (message) analyzing unit 113, a transmission unit 115 and communication I/F 117 with IP phone terminal 40.

The communication I/F 101 structures communication I/F corresponding to the available plural radio IP networks (wireless communication paths) and is constituted of, for example, 1000BASE-T prescribed by IEEE802.3ab, being connected to the network 20 and thus different wireless communication paths.

Figure 3:
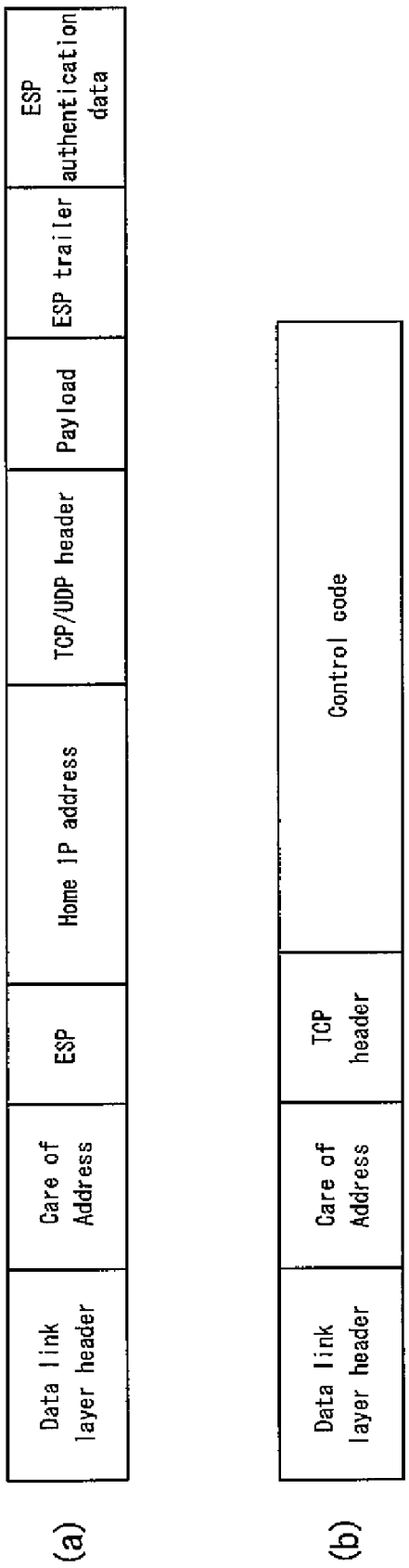
FIG. 3 is a structural view of IP packets of the embodiment as shown in FIG. 1.

In the present embodiment, since VPN by IPSec is set as described above, packets transmitted/received by the communication I/F 101, specifically, the VoIP packet transmitted/received between the switching server 100 and MN300 (more specifically, VoIP packets transmitted by MN300) have a structure as shown in FIG. 3(*a*). That is, In the VoIP packet, home IP header (home IP address), TCP/UDP header and payload are encapsulated and Care of IP Address is added.

An access control packet transmitted/received between the switching server 100 and MN300 has a structure as shown in FIG. 3(*b*). Specifically, the access control packet is constituted of data-link layer header, Care of IP Address, TCP header and a control code.

The communication I/F 117 structures communication I/F corresponding to the communication network 10C and is connected to the network 20 to be used for in implementing communication with the IP phone terminal 40.

The switching server 100 as shown in FIG. 2 can use six different wireless communication paths between MN300 by way of the communication I/F 101. Accordingly, the reception unit 103 includes six reception portions 131 corresponding to the six wireless communication paths. The transmission unit 115 also includes six transmission portions 141 corresponding to the six wireless communication paths.

In the reception unit 103, each reception portion 131 includes packet reception monitoring unit 133, ideal reception timing generating unit 135, and allowable calculating unit 137, such that a packet transmitted by MN300 by way of a corresponding wireless communication path is received by packet reception monitoring unit 133 by way of the communication I/F 101.

The packet reception monitoring unit 133 has a jitter buffer for absorbing jitter of a packet received by the communication I/F 101 and classifies the received packets in accordance with the types of packets. Specifically, in a case in which the received packet is a control message which MN300 has transmitted by starting session from MN300, the packet reception monitoring unit 133 supplies: the received packet to ideal reception timing generating unit 135 and allowable range calculating unit 137; and application information included in the control message received by way of at least one of the wireless communication paths to the memory unit 107, whereby allowable time (Tapr) in the application to be executed is stored in the memory unit 107. Further, in a case in which the received packet is a transmission path selection message (Msg) which MN300 has transmitted by starting session from the switching server 100, the packet reception monitoring unit 133 supplies the transmission path selection message (Msg) to transmission path selection Msg analyzing unit 113. Further, when the received packet is a packet after the application is executed, the packet reception monitoring unit 133 transmits the received packet to the IP phone terminal 40 by way of the communication I/F 117.

The ideal reception timing generation unit 135 generates ideal reception timing in the wireless communication path of the packet transmitted by MN300, on the basis of the received packet from the packet reception monitoring unit 133, supplies the ideal reception timing thus generated to the allowable range calculating unit 137 and the path selection unit 105. The method of generating this idea reception timing will be described hereinafter.

The allowable range calculating unit 137 calculates, based on the received packet from the packet reception monitoring unit 133 and the ideal reception timing from the ideal reception timing generating unit 135, an allowable range as an allowable reception timing range from ideal reception timing at a packet in the wireless communication path, and supplies the allowable range thus calculated to the path selection unit 105. The method of calculating this allowable range will be described below.

The path selecting unit 105 calculates allowable limit timing on the basis of the ideal reception timing obtained from the reception portion 131 corresponding to each wireless communication path and the allowable range thereof and selects, on the basis of the allowable limit timing of each wireless communication path thus calculated and the allowable time (Tapr) in the application to be executed, which allowable time is stored in the memory unit 107, plural communication paths which are the most suitable for the application, in which communication paths variation request time, i.e. accumulation request time (Tjit) of jitter buffer in which no packet arriving from any wireless communication path is discarded, does not exceed allowable time (Tapr), and supplies the result to transmission path selection Msg generating unit 109 and packet transmission path control unit 111.

Accordingly, in the present embodiment, the ideal reception timing generating unit 135, the allowable range calculating unit 137 and the path selection unit 105 of each wireless communication path constitute a calculation unit for calculating ideal reception timing and allowable limit timing of packet received at each wireless communication path, and the path selection unit 105 constitutes a selection unit for selecting plural wireless communication paths such that the accumulation request time (Tjit) of jitter buffer does not exceed allowable time (Tapr) of the application. The operation of selecting a specific path, including the operation at the path selection unit 15, will be described later.

The transmission path selection Msg generating unit 109 generates a transmission path selection Msg including allowable band information of each wireless communication path thus selected, on the basis of information of the wireless communication path selected by the path selection unit 105. The allowable band of each wireless communication path is calculated, for example, on the basis of the number of packets received within a unit time at the ideal reception timing at the wireless communication path. This transmission path selection Msg is supplied to the transmission unit 115 and transmitted to MN300, from a predetermined transmission portion 141 set in accordance with the application or any transmission portion 141 by way of the communication I/F 101, under the control of the packet transmission path control unit 111. The transmission path selection Msg is transmitted by using an access control packet as shown in FIG. 3(*b*).

The transmission path selection Msg analyzing unit 113 analyzes, by the session start from the switching server 100, the wireless communication paths selected by MN300 and the allowable band of each of the wireless communication paths, on the basis of transmission path selection Msg from MN300, which Msg is supplied from the packet reception monitoring unit 133, and supplies such information to the packet transmission path control unit 111.

The packet transmission path control unit 111 effects control, when a session is established from the switching server 100 with respect to MN300, such that control message is sent from the switching server 100 to MN300 by way of all available transmission portions 141 of the transmission unit 115, prior to actual execution of the application.

Further, when the application is actually executed, packet transmission path control unit 111 controls a transmission portion 141 corresponding to the transmission unit 115, on the basis of information of the plural wireless communication paths selected by the path selection unit 105 or information of the plural wireless communication paths selected by MN300 and analyzed by the transmission path selection Msg analyzing unit 113 and transmits the VoIP packet from the IP phone terminal 40 received by way of the communication I/F 117, to MN300 by way of the communication I/F 101, with using the selected plural wireless communication paths or more specifically, allotting the selected communication paths in accordance with the allowable band of each wireless communication path or complementing the insufficient band by the selected communication path. Each transmission portion 141 of the transmission unit 115 has a jitter buffer for absorbing jitter of a packet received by the communication I/F 117.

Specifically, each transmission portion 141 thus selected adds, to an IP packet including a home IP address received from the IP phone terminal 40, a corresponding Care of IP Address and transmits the IP packet having a Care of IP Address added thereto from the communication I/F 101 to the corresponding radio IP network.

The switching sever 100 of the present embodiment has, in addition to the aforementioned functions, a function to check the order of the IP packets transmitted/received between MN300 and the IP phone terminal 40 by way of each wireless communication path, by a using sequence number (SN) of RTP (real-time transport protocol) included in the VoIP packet. Further, the switching server 100 has a function of obtaining statistic information of the IP packet which is to be relayed (e.g. packet loss, throughput, under-run count and over-run count of the jitter buffer) and transmitting the obtained information to MN300.

Yet further, the switching server 100 has a function of correlating the home IP address included in the IP packet transmitted by the IP phone terminal 40, with the home IP address registered at a home agent (not shown) accessible by way of the network 20. Accordingly, it is analyzed which communication business provider has allotted the home IP address to MN300.

(MN300)

Figure 4:
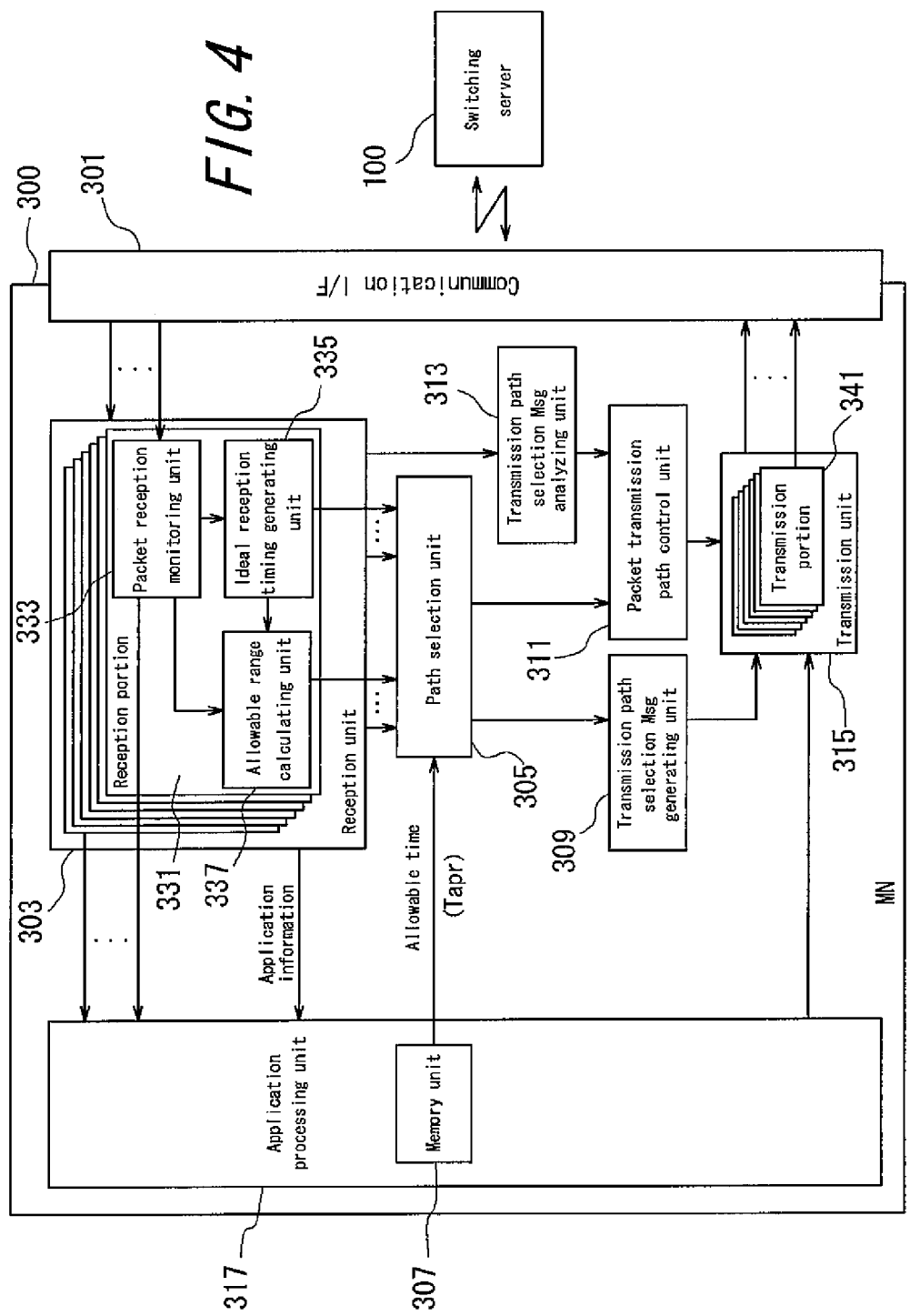
FIG. 4 is a functional block structural view of MN as shown in FIG. 1.

FIG. 4 is a functional block diagram showing a structure of the main portions of MN300. As in the Switching Server 100, the Mn300 can Carry Out Communication by simultaneously using plural (maximum six in the drawing) wireless communication paths. Regarding the functional blocks similar to those of the switching server 100 described above, detailed descriptions thereof will be omitted.

As shown in FIG. 4, MN300 includes communication I/F 301, reception unit 303, path selection unit 305, transmission path selection Msg generating unit 309, packet transmission path control unit 311, transmission path selection Msg analyzing unit 313, transmission unit 315 and application processing unit 317.

The communication I/F 301 transmits/receives an IP packet, based on a corresponding Care of IP Address allotted to MN300 in the plural wireless communication paths available to MN300.

The reception unit 303 includes six reception portions 331 corresponding to six wireless communication paths, and the transmission unit 315 includes six transmission portions 341 corresponding to six wireless communication paths. In FIG. 4, to simplify the drawing, the reception unit 303 is provided with six reception portions 331 and the transmission unit 315 is provided with six transmission portions 341. However, the reception portions 331 and the transmission portions 341 corresponding to each wireless communication paths may be structured as removable wireless communication cards.

In the reception unit 303, each reception portion 331 includes a packet reception monitoring unit 333, ideal reception timing generating unit 335, and allowable range calculating unit 337, such that a packet transmitted by the switching server 100 by way of a corresponding wireless communication path is received by packet reception monitoring unit 333 by way of the communication I/F 301.

The packet reception monitoring unit 333 has a jitter buffer for absorbing jitter of a packet received by the communication I/F 301 and classifies the received packets in accordance with the types of packets. Specifically, in a case in which the received packet is a control message which the switching server 100 has transmitted by starting session from the switching server 100, the packet reception monitoring unit 333 supplies the received packet to ideal reception timing generating unit 335 and allowable range calculating unit 337. Further, in a case in which the received packet is a transmission path selection message (Msg) which the switching server 100 has transmitted by starting session from MN300, the packet reception monitoring unit 333 supplies the transmission path selection message (Msg) to transmission path selection Msg analyzing unit 313. Further, when the received packet is a packet after the application is executed, the received packet is supplied to the application processing unit 317.

The ideal reception timing generation unit 335 generates ideal reception timing in the wireless communication path of the packet transmitted by the switching server 100 in a manner similar to that in the ideal reception timing generation unit 135 of the switching server 100 and supplies the ideal reception timing thus generated to the allowable range calculating unit 337 and the path selection unit 305.

The allowable range calculating unit 337 calculates an allowable range, as an allowable reception timing range of ideal reception timing, at a packet in the wireless communication path in a manner similar to that in the ideal reception timing generation unit 135 of the switching server 100, and supplies the allowable range to the path selection unit 305.

The application processing unit 317 processes the packet received from the reception unit 303 in accordance with the application, generates a packet (a VoIP packet, for example) according to the application and transmits the packet thus generated to the transmission unit 315. The application processing unit 317 is provided with a memory unit 307 to memorize the home IP address of MN300 corresponding to the Care of IP Address at each wireless communication path available to MN300 and the allowable time (Tapr) of jitter buffer as variation absorbing time of the received packet corresponding to the application.

The path selecting unit 305 calculates allowable limit timing on the basis of the ideal reception timing and the allowable range obtained from the reception portion 331 corresponding to each wireless communication path and selects, on the basis of the allowable limit timing of each wireless communication path thus calculated and the allowable time (Tapr) in the application to be executed, which allowable time is stored in the memory unit 307, plural communication paths which are the most suitable for the application, in which communication paths the accumulation request time (Tjit) of jitter buffer does not exceed allowable time (Tapr), in a manner similar to that in the ideal reception timing generation unit 135 of the switching server 100, and supplies the result to transmission path selection Msg generating unit 309 and packet transmission path control unit 311.

Accordingly, in the present embodiment, as is the case with the switching server 100 described above, the ideal reception timing generating unit 335, the allowable range calculating unit 337 and the path selection unit 305 of each wireless communication path constitute a calculation unit for calculating ideal reception timing and allowable limit timing of packet reception at each wireless communication path, and the path selection unit 305 constitutes a selection unit for selecting plural wireless communication paths such that the accumulation request time (Tjit) of jitter buffer does not exceed allowable time (Tapr) of the application.

The transmission path selection Msg generating unit 109 generates a transmission path selection message (Msg) including allowable band information of each wireless communication path thus selected, on the basis of information of the wireless communication path selected by the path selection unit 305, in a manner similar to that in the transmission path selection Msg generating unit 109 of the switching server 100. The transmission path selection Msg generating unit 109 then transmits the transmission path selection message (Msg) from the transmission unit 315 to the switching server 100 by way of the communication I/F 301 by using an access control packet as shown in FIG. 3(b) under the control of the packet transmission path control unit 311.

The transmission path selection Msg analyzing unit 313, by the session start from MN300, analyzes the wireless communication paths selected by the switching server 100 and the allowable band of each of the wireless communication paths, on the basis of transmission path selection message (Msg) from the switching server 100, which Msg is supplied from the packet reception monitoring unit 333, and supplies such information to the packet transmission path control unit 311.

The packet transmission path control unit 311 effects control, when a session is established from MN300 with respect to the switching server 100, such that control message is sent from the application processing unit 317 to the switching server 100 by way of all available transmission portions 341 of the transmission unit 315, prior to actual execution of the application. To a control message transmitted from at least one of the transmission portions 341, application information including allowable time (Tapr) of a jitter buffer, as variation absorbing time of a received packet in the application memorized in the memory unit 309 of the application processing unit 317, is inserted.

Further, when the application is actually executed, packet transmission path control unit 311 controls a transmission portion 341 corresponding to the transmission unit 315, on the basis of information of the plural wireless communication paths selected by the path selection unit 305 or information of the plural wireless communication paths selected by the switching server 100 and analyzed by the transmission path selection Msg analyzing unit 313, and transmits the VoIP packet from the application processing unit 317, to the switching server 100 by way of the communication I/F 301, with using the selected plural wireless communication paths or more specifically, allotting the selected communication paths in accordance with the allowable band of each wireless communication path or complementing the insufficient band by the selected communication path.

Specifically, each transmission portion 341 thus selected adds, to an IP packet including a home IP address received from the application processing unit 317, a corresponding Care of IP Address and transmits the IP packet having a Care of IP Address added thereto from the communication I/F 301 to the corresponding radio IP network.

The MN300 of the present embodiment has, as in the switching server 100, a function to check the order of the IP packets transmitted to/received from the IP phone terminal 40 by a using sequence number (SN) of RTP included in the VoIP packet.

(Method of Generating Ideal Reception Timing and Method of Calculating an Allowable Range)

Next, a method of generating ideal reception timing and a method of calculating an allowable range on the switching server 100 side and the MN300 side mentioned above will be described. Since the method of generating ideal reception timing and the method of calculating an allowable range are similar on the switching server 100 side and the MN300 side, the case where the methods are carried out on the switching server 100 side will be representatively described below.

Figure 5:
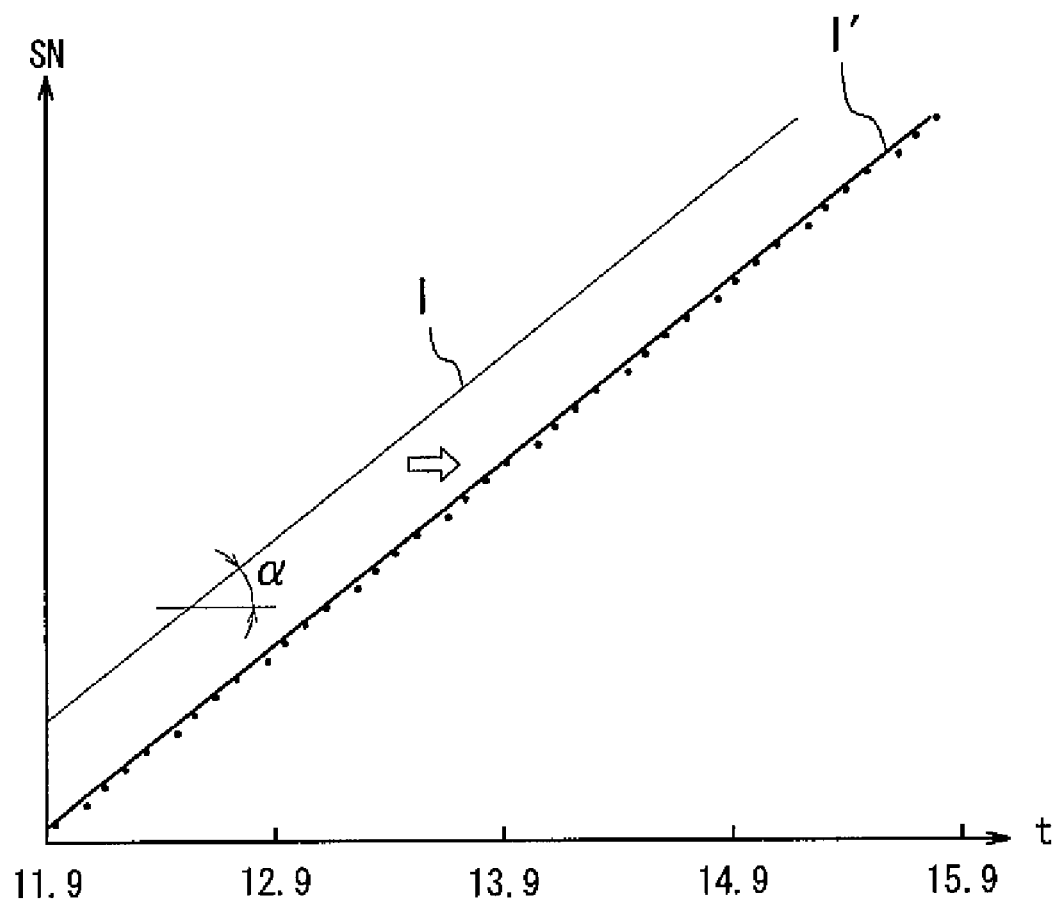
FIG. 5 is a view for explaining a method of generating ideal reception timing.

First, in generating an ideal reception timing, as shown in FIG. 5, a line I having an inclination angle α representing the relationship (t–SN) between the transmission time (t) when MN300 transmits a packet and the sequence number (SN) is obtained. For example, when the transmission interval of packets is 20 ms, a line I where α=50 (SN/s) is obtained. Next, regarding the received packet, an ideal reception timing is generated by: assuming the ideal reception timing is shifted in the direction of delay with respect to the line I; and moving, in a case in which the packet reception is plotted in the graph of (SN–t), the line I from left to right to a line I' located at a rightmost position where no plots of received packets exist on the left side thereof.

A specific example of calculating an ideal reception timing in this case will be described below. First, the standard line (SN–tstd) corresponding to the line I of FIG. 5 is assumed as shown in the formula below.

$$SN = \alpha std \cdot tstd, \ tstd = SN/\alpha std$$

Here, α std represents the inclination determined by transmission interval of packets. For example, when the transmission interval of packets is 20 ms, a std is 1 SN/20 ms (50 SN/s).

Next, difference in time (Tstdsub(s)) between the reference line and the received packets is calculated by the formula below.

$$Tstdsub(s) = t(s) - tstd(s)$$

For example, given that the sequence number of the packet received at s-th order, $$Tstdsub(s) = t(s) - \{SN(s)/\alpha std\}$$

Then, regarding the received packet (s), the minimum value (Tsubmin) of the difference in time (Tstdsub) is obtained.

$$Tsub\min = \min_{s}^{ALL}(Tstdsub(s))$$

Given that the line according to Tsubmin is the ideal reception timing (SN–tass)

$$Tass = (SN/\alpha std) + Tsubmin$$

That is, regarding the received packets, a line according to the packets where (reception time–transmission time) is the smallest, i.e. a line corresponding to the line I' of FIG. 5, is made to be the ideal reception timing.

It is possible to inevitably obtain the allowable range by calculating allowable limit timing from the ideal reception timing, depending on the communication method in the corresponding wireless communication path or the modification method or the transmission band in use. However, in the present embodiment, an allowable range is calculated as below, for example, on the basis of the ideal reception timing thus generated and the reception timing of the actual packets.

Specifically, when the ideal reception timing is generated, within a predetermined period, difference in time Tsub between the reception time "trec" of a received packet and a reception time "tide" at the ideal reception timing is calculated according to the formula below.

$$Tsub(s) = trec(s) - tide(s)$$

Next, by the formula below, an allowable range Tp is calculated on the basis of the average value of the difference in time Tsub, i.e. the average value of expansion in time in delay of a received packet (the average reception timing). In the formula below, s represents a reception number allotted to a packet received within a predetermined period, β represents a coefficient, and means represents an averaging process.

$$Tp = \beta \times \operatorname*{mean}_{s} Tsub(s)$$

When the ideal reception timing and the allowable range are obtained as described above, the allowable range is added to the ideal reception timing, whereby the allowable limit timing of the wireless communication path is calculated.

Figure 6:
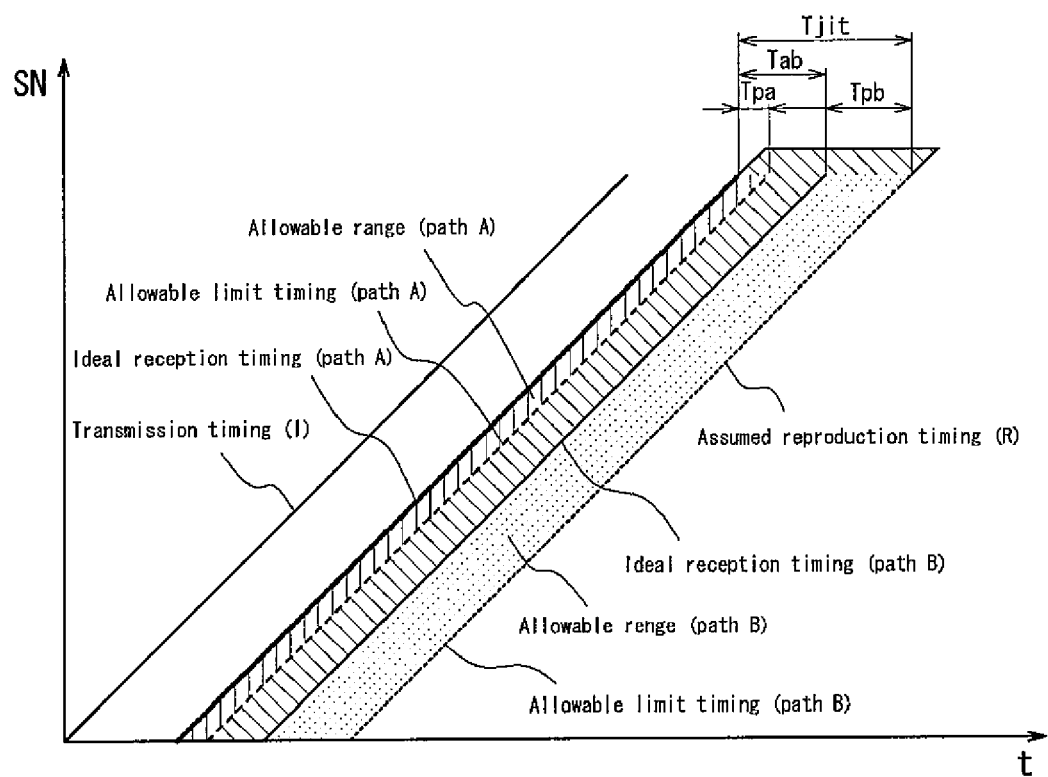
FIG. 6 is a view showing one example of a generation result of ideal reception timing and a calculation result of allowable range.

FIG. 6 shows an example of a generation result of ideal reception timing and a calculation result of an allowable range. The X-axis represents time(t) and the Y-axis represents sequence number (SN). In this example, a generation result of ideal reception timing and a calculation result of an allowable range in two wireless communication paths, path A and path B, are shown.

In FIG. 6, line I represents transmission timing, line R represents assumed reproduction timing, respectively. Further, Tpa represents an allowable range (period) of path A and Tpb represents an allowable range (period) of path B, respectively. The allowable limit timing of path A is the lower limit of the allowable range Tpa, and the allowable limit timing of path B is the lower limit of the allowable range Tpb. Tab represents difference in delay between path A and path B, and Tjit represents accumulation request time of jitter buffer by path A and path B, respectively.

In calculating the accumulation request time Tjit of jitter buffer, first of all, the latest allowable limit timing among the allowable limit timings of the respective wireless communication paths is obtained as "assumed reproduction timing R". In FIG. 6, the assumed reproduction timing R coincides with the allowable limit timing of path B. Next, the accumulation request time Tjit is calculated by subtracting the earliest (i.e. the smallest in delay with respect to transmission timing) ideal reception timing from the assumed reproduction timing R of the ideal reception timings of the respective wireless communication paths. In FIG. 6, the accumulation request time Tjit overlaps the allowable range Tpa of path A and the allowable range Tpb of path B.

In the example, when the accumulation request time Tjit thus calculated is no longer than the allowable time Tapr of jitter buffer in the application, assuming that reproduction by the application is carried out within the assumed reproduction timing R, all of the packets received within the allowable range Tpa of path A and the allowable range Tpb of path B, respectively, are used for reproducing the application without being discarded.

Figure 7:
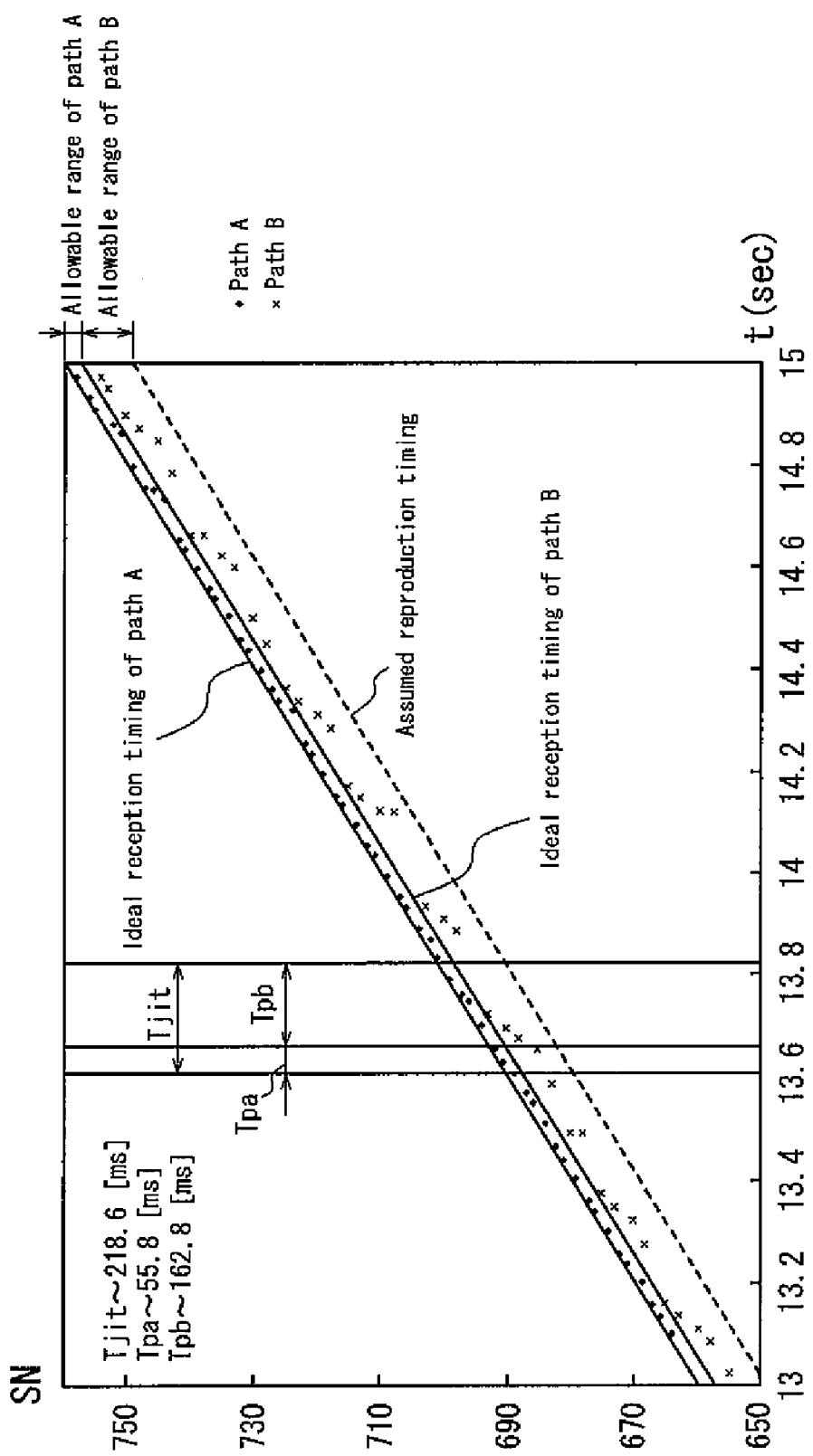
FIG. 7 is a view showing one example of ideal reception timing and a simulation result of allowable range.

FIG. 7 shows an example of a simulation result of ideal reception timing and an allowable range. In the example, the allowable limit timing of path A substantially coincides with the ideal reception time of path B. The accumulation request time Tjit by path A and path B is approximately 218.6 [ms] (measured from the graph). Accordingly, in this case, when the allowable time Tapr of jitter buffer of the application is no shorter than 218.6 [ms], the packets received within the allowable range Tpa of path A and the allowable range Tpb of path B, respectively, are reproduced without being discarded by carrying out communication with complementing insufficient band by the two paths A, B.

(Path Selection Operation)

Next, a selection operation at a wireless communication path according to the present embodiment will be described with reference to a flow chart in FIG. 8. Since this path selection operation is similar between on the switching server 100 side and the MN300 side, the case in which the operation is carried out on the switching server 100 side will be representatively described.

First, the switching server 100, by starting a session from MN300, sets an allowable time (Tapr) in the application included in a control message transmitted from MN300 in the memory unit 107 (Step S1). Next, for each of all available wireless communication paths (L), ideal reception timing is calculated by the ideal reception timing generating unit 135 (Step S2). Further, an allowable range is calculated by the allowable range calculating unit 137 (Step S3). Thereafter, the allowable limit timing is calculated by adding the allowable range to the ideal reception timing by the path selection unit 105 (Step S4).

When calculation of the allowable limit timing is completed in each wireless communication path, next, in the path selection unit 105, as described in FIG. 6, the accumulation request time Tjit of jitter buffer is calculated by setting the latest allowable limit timing of the allowable limit timings of the respective wireless communication paths as the assumed reproduction timing and subtracting the earliest ideal reception timing from the assumed reproduction timing (Step S5). A specific method of calculating the accumulation request time (Tjit) will be described hereinafter.

Next, the accumulation request time (Tjit) thus calculated is compared with the allowable time (Tapr) of the application set in Step S1 (Step S6). When Tjit≦Tapr, all of the wireless communication paths used in calculation of the accumulation request time (Tjit) are selected as available paths and these wireless communication paths are sorted in the order of lateness of the allowable limit timing, i.e. by putting the higher priority on the wireless communication path having the larger magnitude of delay (Step S7).

When Tjit>Tapr in Step S6, accumulation request time (Tjit (List)) is calculated from a population of the wireless communication paths where the wireless communication path (List) having the latest or slowest allowable limit timing has been excluded (Step S8), accumulation request time (Tjit (Lfst)) is calculated from a population of the wireless communication paths where the wireless communication path (Lfst) having the earliest or fastest ideal reception timing has been excluded (Step S9), and Tjit (List) and Tjit (List) are compared with each other (Step S10).

As a result, when Tjit (List)≦Tjit (Lfst), the accumulation request time Tjit (List), which is calculated in a condition where the wireless communication path having the latest allowable limit timing (List) has been excluded from the population of the wireless communication paths, is Tjit=Tjit (List) (Step S11). Otherwise, the accumulation request time Tjit (Lfst), which is calculated in a condition where the wireless communication path having the fastest ideal reception timing (Lfst) has been excluded from the population of the wireless communication paths, is Tjit=Tjit (Lfst) (Step S12). Then the operation proceeds to Step 6 and makes comparison of the accumulation time (Tjit) with the allowable time (Tapr).

Accordingly, by selecting a population of the wireless communication paths satisfying the accumulation request time (Tjit) which is no longer than the allowable time of the application in Step S6, complementary communication can be carried out with a relatively larger number of wireless communication paths to be selected, whereby the number of discarded packets can be efficiently reduced.

Figure 8:
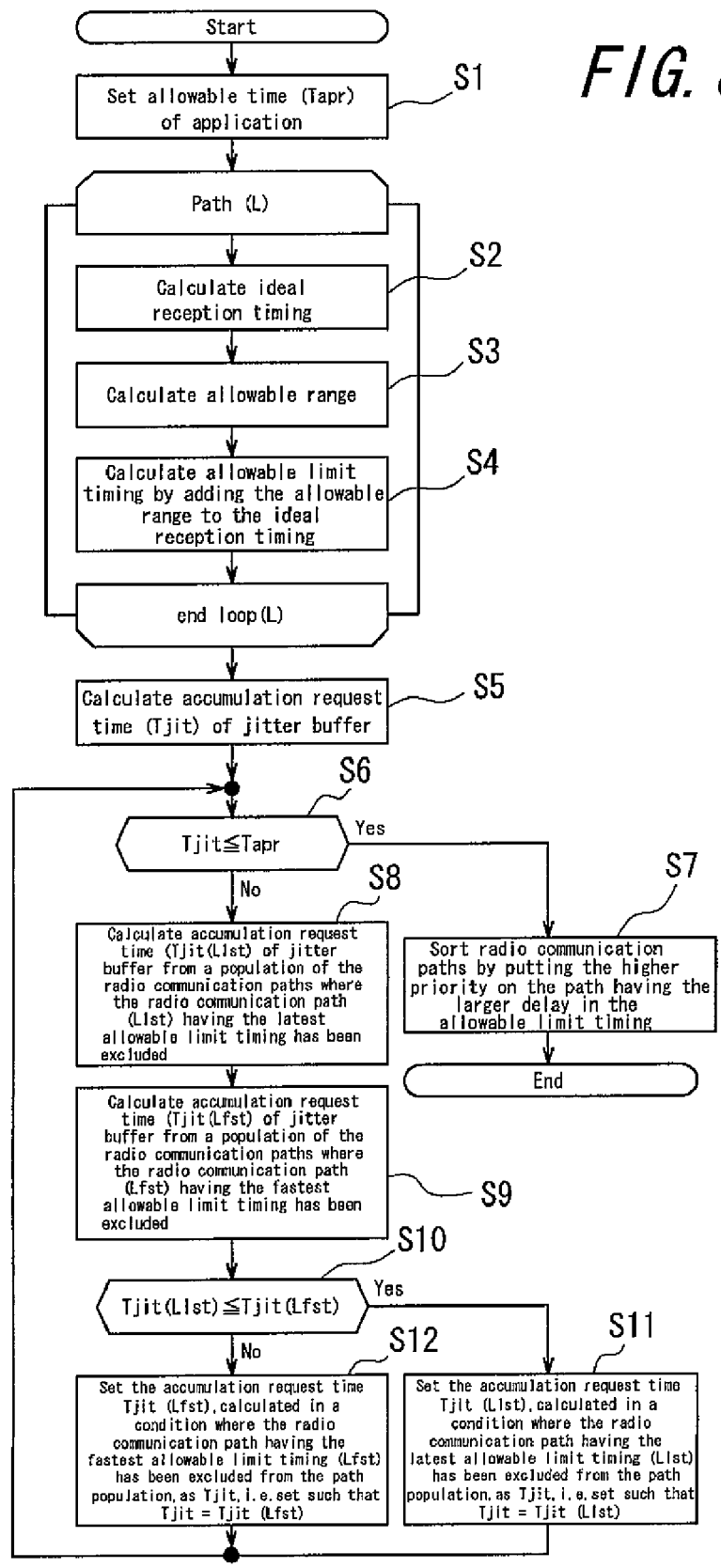
FIG. 8 is a flow chart showing a selection operation of a wireless communication path according to the embodiment as shown in FIG. 1.
Figure 9:
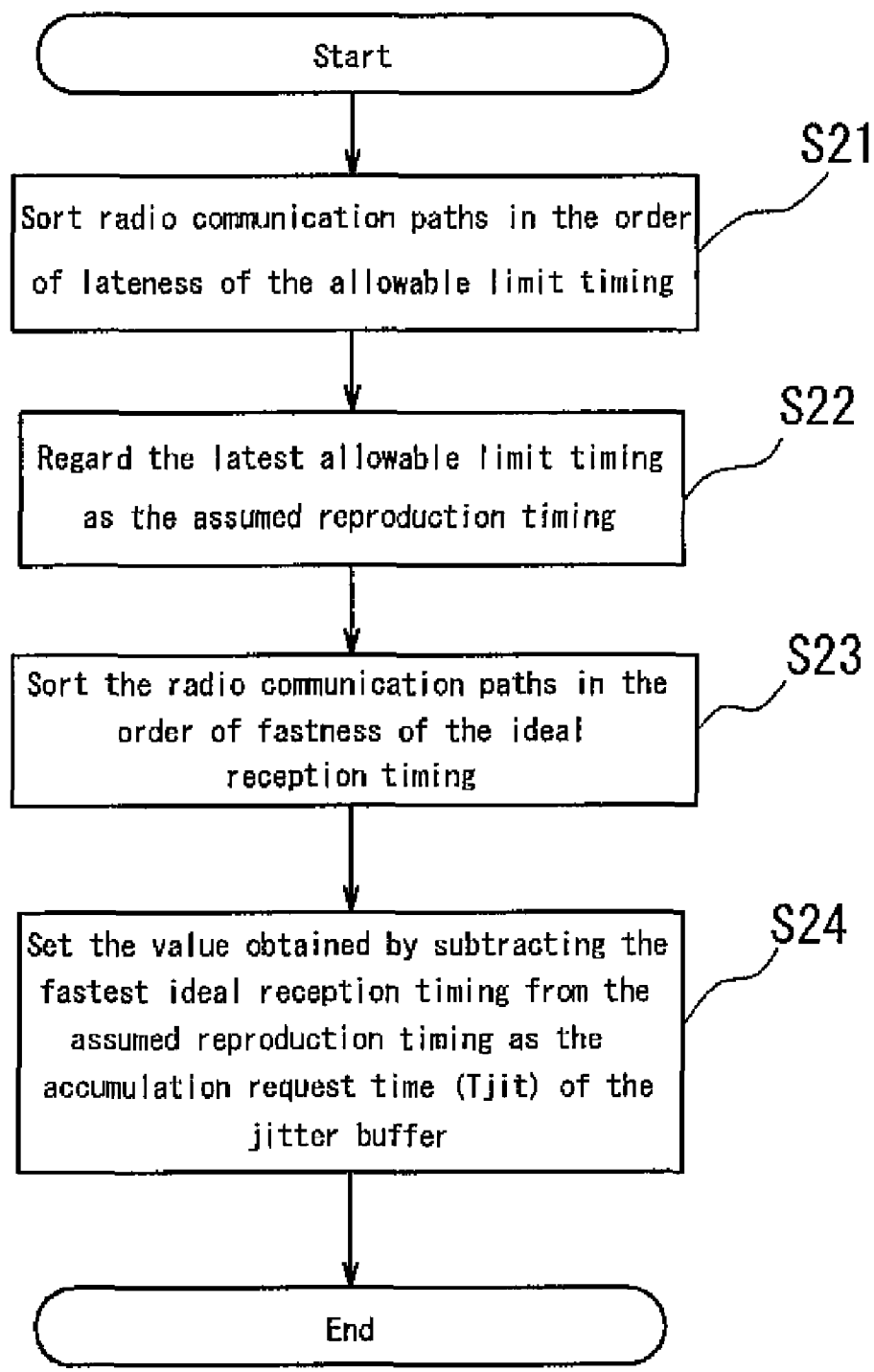
FIG. 9 is a flow chart showing a specific calculation method of accumulation request time (Tjit) calculated at Step 5 of FIG. 8.

FIG. 9 is a flow chart showing a specific method of calculating accumulation request time (Tjit) calculated in Step S5 of FIG. 8. First, regarding the targeted population of wireless communication paths, the wireless communication paths are sorted in the order of lateness of the allowable limit timing (Step S21), and the latest allowable limit timing is regarded as the assumed reproduction timing in the application (Step S22).

Next, regarding the targeted population of wireless communication paths, the wireless communication paths are sorted in the order of fastness of the ideal reception timing (Step S23), and the value obtained by subtracting the fastest ideal reception timing from the assumed reproduction timing is calculated as the accumulation request time (Tjit) of the jitter buffer (Step S24).

When plural wireless communication paths have been selected as described above, information of the selected wireless communication paths, as well as information of the allowable range, is transmitted to MN300 as a transmission path selection message (Msg). Accordingly, in the switching server 100 and MN300, by simultaneously using the plural wireless communication paths thus selected and setting the wireless communication path having the largest delay in the allowable limit timing (i.e. the wireless communication path having the highest priority) as the main path or "one wireless communication path", the application is executed by allotting a request band of the application in accordance with the allowable band such that a band insufficient in the main path is complemented by another wireless communication path.

According to the present embodiment, allowable limit timing of a received packet in each wireless communication path is calculated on the basis of a packet of a control message received by way of available plural wireless communication paths. Then, on the basis of the allowable limit timing in each wireless communication path thus calculated and the allowable time (Tapr) of jitter buffer as the variation absorbing time of the received packet in the application, the plural wireless communication paths, where the accumulation request time (Tjit) of jitter buffer as the variation request time does not exceed the allowable time (Tapr), are selected from the plural available wireless communication paths. Therefore, it is possible to select plural wireless communication paths which are the most suitable for the application in consideration of the radio transmission environment at the time when the communication is started and carry out complementary communication, thereby efficiently reduce the number of packets which are discarded after arrival.

In the first embodiment described above, a control message is sent to the corresponding party when a session is established and the corresponding party is made to carry out the selecting operation of the path by the control message, whereby the transmitting side receives the results. However, in a manner opposite thereto, it is possible to carry out the path-selecting operation on the transmitting side by a control message received from the corresponding party when a session is established, whereby the transmitting side transmits the result to the corresponding party.

Further, in the first embodiment described above, the selecting operation of wireless communication paths can be carried out not only when a session is established but also during execution of the application. In this case, regarding the wireless communication paths which are being selected, ideal reception timing and an allowable range are calculated on the basis of a received packet of the application to calculate the allowable limit timing. Regarding the wireless communication paths which are not being selected, a control message is transmitted/received in an appropriate cycle according to necessity and ideal reception timing and an allowable range are calculated on the basis of a received packet to calculate the allowable limit timing, whereby the plural wireless communication paths which are the most suitable for the application are dynamically selected and complementary communication is executed in accordance with the allowable band at that time.

As a result, if the transmission environment is changed during communication and an allowable band of the wireless communication path which is being selected varies, the problem can be addressed substantially in real time and thus reliability of the communication is improved. When plural wireless communication paths are dynamically selected, a session can be disconnected with respect to the wireless communication paths which have not been selected. However, in this case, it is preferable to effect control to stop transmission of packets until the next selecting operation, in a state in which the session is maintained. By doing this, the next selecting operation can be carried out swiftly.

Second Embodiment (Overall Schematic Structure of Communication System)

Figure 10:
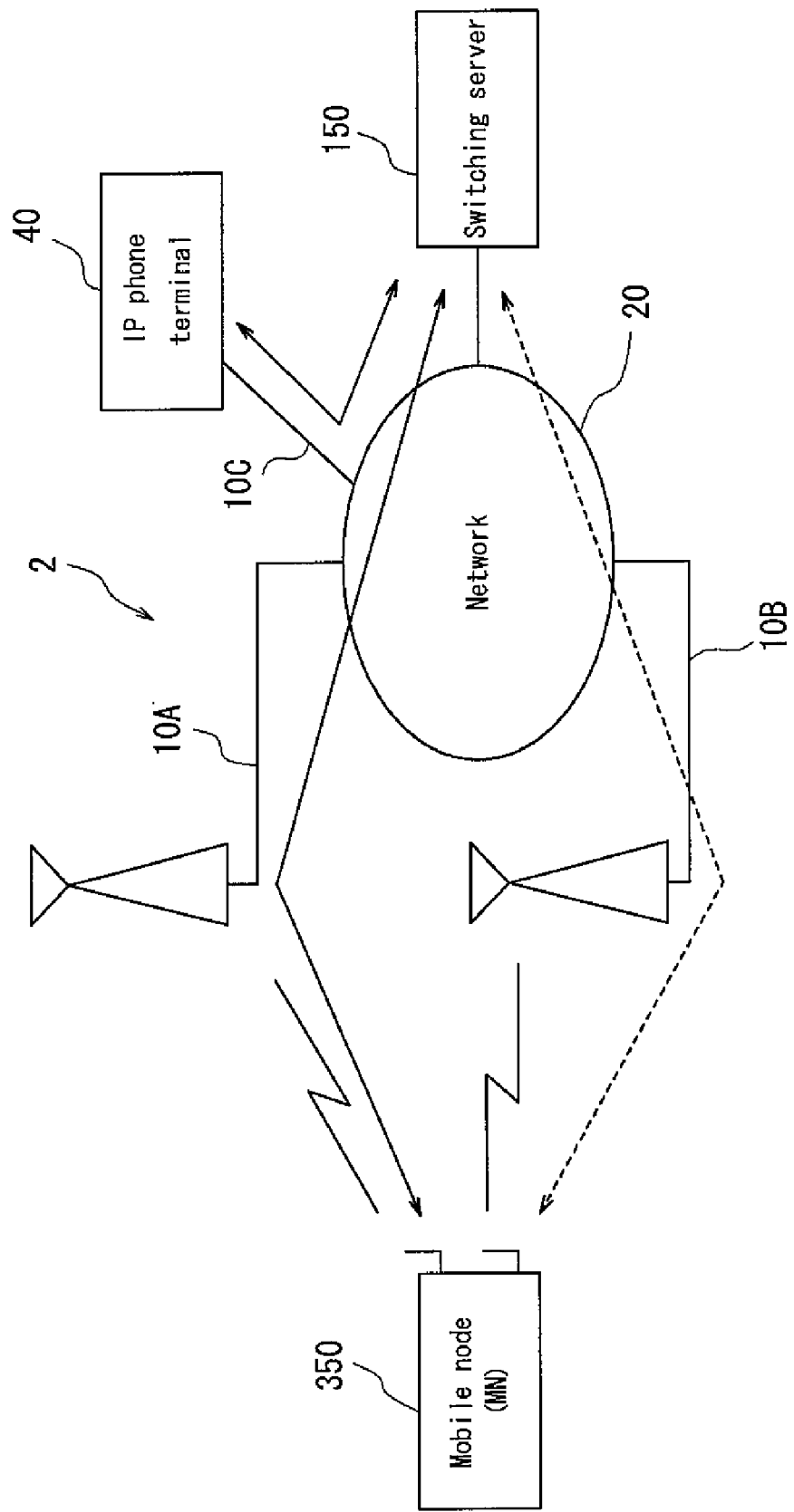
FIG. 10 is an overall schematic structural view of a communication system of another embodiment of the present invention

FIG. 10 is an overall schematic structural view of a communication system 2 according to a second embodiment of the present invention. As shown in FIG. 10, the communication system 2 includes a radio IP network 10A and a radio IP network 10B as plural different wireless communication paths available to MN350 which is a wireless communication apparatus. The radio IP network 10A and the radio IP network 10B, which are similar to those of the first embodiment, are connected to the network 20.

In FIG. 10, in order to simplify the drawing, two radio IP networks 10A and 10B are shown. However, different wireless communication paths where MN350 can be used are not restricted to these radio IP network 10A and radio IP network 10B and a larger number of radio IP networks may be used.

To the network 20, a switching server 150, constituting a communication control apparatus for controlling the wireless communication paths with MN300, is connected.

The switching server 150, as in the first embodiment, has VPN router function for implementing a routing process of an IP packet and ensures IP mobility of MN350 by establishing a tunnel of VPN (IPSec) between MN350 and the switching server 150 to realize virtualization of OSI layer 3.

In the present embodiment, different from the case of mobile IP (for example, RFC2002), MN350 selects, for example, the radio IP network 10A as the master path and other radio IP network(s) 10B as the slave paths, and simultaneously uses these plural radio IP networks, with complementing a band insufficient in the master path with respect to the request band of the application by the slave path(s), to implement communication with a communication counterpart (specifically, an IP phone terminal 40).

The switching server 150 is connected with the IP phone terminal 40 by way of a communication network 10C connected with the network 20, as in the first embodiment. The IP phone terminal 40 converts phonetic signals and VoIP packets with each other and/or transmits/receives IP packets.

Specifically, the switching server 150 (communication apparatus) receives an IP packet (VoIP packet) which MN350 (wireless communication apparatus) has transmitted to the IP phone terminal 40 (the communication counterpart) by using the selected plural different radio IP networks, with complementing insufficient band by a predetermined cycle (20 ms). The switching server 150 relays the IP packet to the IP phone terminal 40. Further, the switching server 150 receives an IP packet (VoIP packet) which the IP phone terminal 40 has transmitted to MN300 in a predetermined cycle (20 ms) and relays the IP packet to MN350, with complementing insufficient band by using the selected plural different radio IP networks.

In the present embodiment, during a period in which communication is carried out by using the radio IP network 10A and the radio IP network 10B simultaneously by way of the switching server 150 between MN350 and the IP phone terminal 40, the band state is analyzed in each of MN350 and the switching server 150 on the basis of received packets from the radio IP network 10A and the radio IP network 10B. Based on the result of the analysis, a transmission band control Msg (message) as transmission control information for controlling a transmission band of a packet to the radio IP network 10A and the radio IP network 10B is transmitted to the packet transmitting side, to facilitate changes in the transmission band.

For example, in a case in which a state of upstream band of the radio IP network 10A as the transmission path from MN350 to the switching sever 150 is to be analyzed, MN350 changes transmission timing of a packet and effects transmission, without changing the proportion (the allotment ratio) of packets transmitted to the radio IP network 10A. Specifically, MN350 does not change the number of transmission packets allotted to the radio IP network 10A and the radio IP network 10B but changes the interval between the sequence numbers of the allotted transmission packets and transmits the packets at a timing other than the predetermined timing.

The switch server 150 analyzes the state of upstream band at the radio IP network 10A on the basis of the comparison of the reception timing of packets received at timing other than the predetermined timing with the allowable range as the allowable reception timing range from the ideal reception timing in the preset radio IP network 10A. The analysis result is sent to MN350 by way of the radio IP network 10A or the radio IP network 10B, as a transmission band control Msg for controlling the transmission band of a packet which MN350 transmits to the radio IP network 10A, thereby facilitating change in transmission band of the radio IP network 10A as the upstream transmission path from MN350 to the switching server 150. For example, when the allowable upstream band of the radio IP network 10A is analyzed to be broader than the transmission band, there is sent to MN350 a transmission band control Msg for controllably expanding the upstream transmission band of the radio IP network 10A A band state of the radio IP network 10B as the transmission path from MN350 to the switching server 150 is analyzed in a manner similar to that described above. The state of downstream band of the radio IP network 10A or the radio IP network 10B as the transmission path from the switching server 150 to MN350 is analyzed in a manner similar to that described above, to facilitate change in the transmission band. It should be noted that, in the descriptions below, the transmission path from MN350 to the switching server 150 in the radio IP network 10A will occasionally be referred to as a "first upstream"; the transmission path from the switching server 150 to MN350 in the radio IP network 10A as a "first downstream"; the transmission path from MN350 to the switching server 150 in the radio IP network 10B as a "second upstream"; and the transmission path from the switching server 150 to MN350 in the radio IP network 108 as a "second downstream".

Next, the functional block structure of the communication system 2 will be described. Specifically, the functional block structures of the switching server 150 and MN350 included in the communication system 2 will be described with reference to FIG. 11, and portions thereof which are relevant to the present embodiment will mainly be described below. It should be noted that the switching server 150 and MN350 may be provided with logic block (power source portion) or the like, which is not either illustrated in the drawings or described below but essentially required to realize the functions of the apparatus.

(Switching Server 150)

Figure 11:
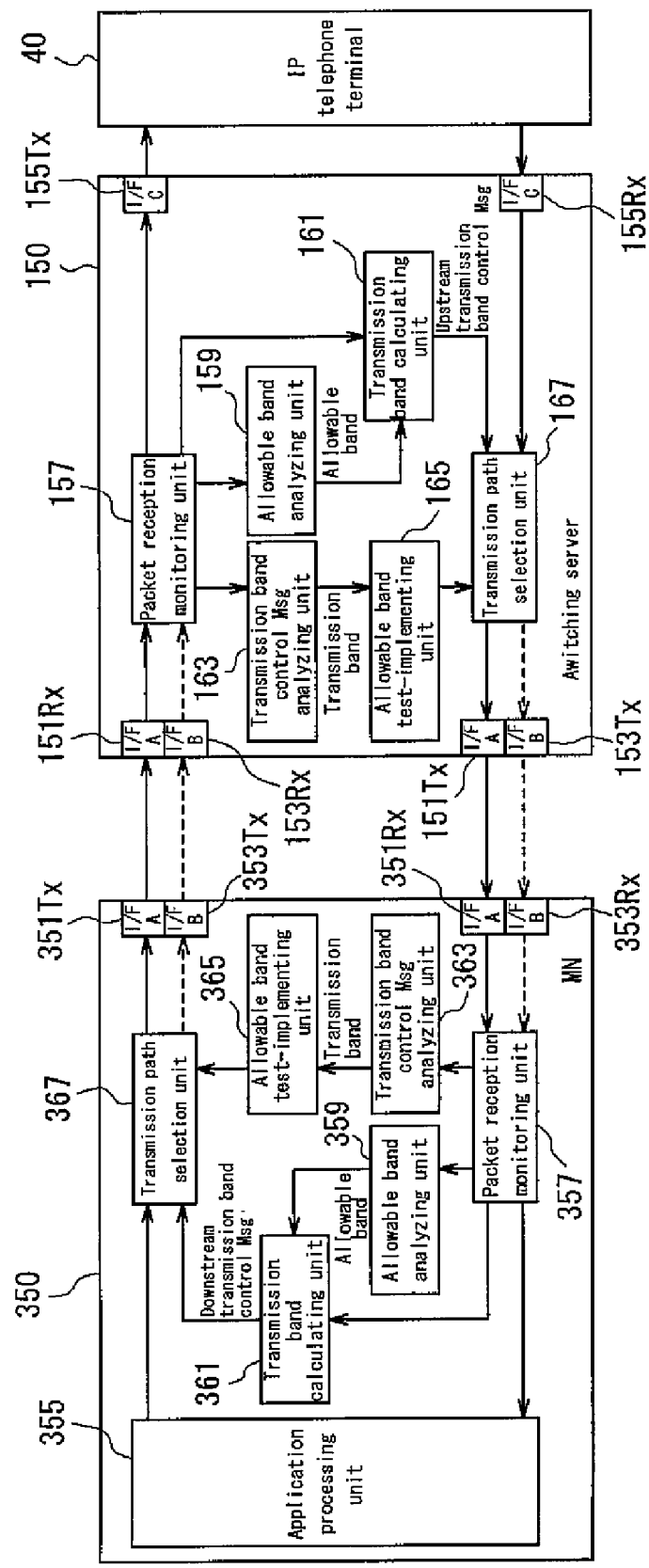
FIG. 11 is a functional block structural view of a switching server and MN as shown in FIG. 10.

As shown in FIG. 11, the switching server 150 includes reception interface unit (I/F A) 151Rx, reception interface unit (I/F B) 153Rx, reception interface unit (I/F C) 155Rx, transmission interface unit (I/F A) 151Tx, transmission interface unit (I/F B) 153Tx, transmission interface unit (I/F C) 155Tx, packet reception monitoring unit 157, allowable band analyzing unit 159, transmission band calculating unit 161, transmission band control Msg analyzing unit 163, allowable band test implementing unit 165, and transmission path selecting unit 167.

The reception interface unit 151Rx and the transmission interface unit 151Tx structure a communication interface unit corresponding to the radio IP network 10A and is constituted of, for example, 1000BASE-T prescribed by IEEE802.3ab, being connected to the radio IP network 10A by way of the network 20.

Similarly, the reception interface unit 153Rx and the transmission interface unit 153Tx structure a communication interface unit corresponding to the radio IP network 10B and is constituted of, for example, 1000BASE-T prescribed by IEEE802.3ab, being connected to the radio IP network 10B by way of the network 20.

In the present embodiment, as in the first embodiment, since VPN by IPSec is set, IP packets transmitted/received by the communication interface units respectively corresponding to the radio IP network 10A and the radio IP network 10B, specifically, the VoIP packets transmitted/received between the switching server 150 and MN350 (more specifically, VoIP packet transmitted by MN350) has a structure as shown in FIG. 3(a). That is, In the VOID packet, home IP header (home IP address), TCP/UDP header and payload are encapsulated and Care of IP Address is added.

An access control packet transmitted/received between the switching server 150 and MN350 has a structure as shown in FIG. 3(b). Specifically, the access control packet is constituted of data-link layer header, Care of IP Address, TCP header and a control code.

The reception interface unit 155Rx and the transmission interface unit 155Tx structure a communication interface unit corresponding to the communication network 10C and is connected to the network 20 to be used for in implementing communication with the IP phone terminal 40.

The packet reception monitoring unit 157 has a jitter buffer for absorbing jitter of an IP packet received by the reception interface unit 151Rx and the reception interface unit 153Rx and transmits the received IP packet to the IP phone terminal 40 by way of the transmission interface unit 155Tx. Further, the packet reception monitoring unit 157 supplies: the IP packet received by the reception interface unit 151Rx and the reception interface unit 153Tx to the allowable band analyzing unit 159 and the transmission band calculating unit 161; receives a first downstream transmission band control Msg and a second downstream transmission band control Msg described below transmitted by MN350; and supplies the messages to the transmission band control Msg analyzing unit 163.

The allowable band analyzing unit 159 analyzes an allowable band showing a band state for each path on the basis of comparison of the sequence number and the reception time representing the reception timing of received packets for each path received by the packet reception monitoring unit 157 with the allowable range, from the ideal reception timing, of packets for each path preset in the transmission band calculating unit 161, and supplies the result to the transmission band calculating unit 161.

The transmission band calculating unit 161 calculates the first upstream transmission band of IP packets which MN350 is transmitting to the radio IP network 10A, on the basis of the packets received from the packet reception monitoring unit 157 by way of the radio IP network 10A, and calculates the allowable range, from the ideal reception timing, of packets which MN350 has transmitted to the radio IP network 10A.

The transmission band calculating unit 161 calculates the second upstream transmission band of IP packets which MN350 is transmitting to the radio IP network 10B, on the basis of the packets received from the packet reception monitoring unit 157 by way of the radio IP network 10B, and calculates the allowable range, from the ideal reception timing, of packets which MN350 has transmitted to the radio IP network 10B.

The first upstream transmission band and the second upstream transmission band calculated by the transmission band calculating unit 161 are transmitted, as the first upstream transmission band control Msg and the second upstream transmission band control Msg, from the transmission path selection unit 167 to MN350 by way of the radio IP network 10A or the radio IP network 10B. The first upstream transmission band control Msg and the second upstream transmission band control Msg are transmitted by using the access control packet shown in FIG. 3(b).

In the transmission band calculating unit 161, when a transmission band is calculated based on the received packet, for example, the number of received packets within a monitoring period Tchk is measured with respect to each path of the radio IP network 10A and the radio IP network 10B and the transmission band is calculated based on the number of the received packets (the reception rate). In this case, the monitoring period Tchk may be constant (e.g. 500 ms) or the shorter monitoring period Tchk may correspond to the larger transmission band, in accordance with the calculated transmission band.

When a band needs to be strengthened by complementing it and the like or when variation occurred in the calculated transmission band, the transmission band calculating unit 161 sets a transmission band (an allotment ratio) required for each path on the basis of the allowable band for each path analyzed by the allowable band analyzing unit 159 and transmits the first upstream transmission band control Msg and the second upstream transmission band control Msg, representing the allotment ratio, from the transmission path selecting unit 167 to MN350 by way of the radio IP network 10A and the radio IP network 10B, whereby change in transmission band from MN350 to the switching server 150 in the first upstream direction and the second upstream direction is facilitated.

Accordingly, in the present embodiment, the transmission band calculating unit 161 constitutes the calculation unit for calculating an allowable range as an allowable reception timing range and the transmission control unit for controlling transmission control information, and the allowable band analyzing unit 159 constitutes the band-state analyzing unit. Regarding the method of calculating an allowable range, since the method is the same as that as described in the fist embodiment, explanation thereof will be omitted. The method of analyzing an allowable band will be described later.

The transmission band control Msg analyzing unit 163 analyzes the transmission bands in the first and second downstream directions from the switching server 150 to MN350, on the basis of the first downstream transmission band control Msg and the second downstream transmission band control Msg from MN350, and supplies the result to the allowable band test-implementing unit 165.

The allowable band test-implementing unit 165 controls the transmission path selection unit 167, on the basis of the allotment ratio of the transmission bands in the first and second downstream directions analyzed by the transmission band control Msg analyzing unit 163, such that, in the transmission path selection unit 167, packets which the IP phone terminal 40 has transmitted are allotted to the first downstream direction and the second downstream direction at a predetermined timing for transmission.

Further, the allowable band test-implementing unit 165, in order to analyze the allowable band in the first downstream direction and the second downstream direction in use, controls the transmission path selection unit 167 such that packets which the IP phone terminal 40 has transmitted are transmitted in the first downstream direction and the second downstream direction at timing other than the predetermined timing, by changing an interval of the sequence numbers of transmission packets to be allotted to the first downstream direction and the second downstream direction, without changing the number of packets allotted to the first downstream direction and the second downstream direction, in the transmission path selection unit 167.

The transmission path selection unit 167 allots the VoIP packets from the IP phone terminal 40 received by way of the reception interface unit 155Rx, to the transmission interface unit 151Tx and the transmission interface unit 153Tx, under the control of the allowable band test-implementing unit 165 and transmits the packets to MN350 by way of the radio IP network 10A and the radio IP network 10B. Further, the transmission path selection unit 167 transmits the first upstream transmission band control Msg and the second upstream transmission band control Msg from the transmission band calculating unit 161, from the transmission interface unit 151Tx or the transmission interface unit 153Tx to MN350 by way of the radio IP network 10A or the radio IP network 10B. The transmission path selection unit 167 has a jitter buffer for absorbing jitter of an IP packet received by the reception interface unit 155Rx.

Specifically, the transmission path selection unit 167 adds, to an IP packet including a home IP address received from the IP phone terminal 40, a Care of IP Address corresponding to the transmission path under the control of the allowable band test-implementing unit 165 and transmits the IP packet having a Care of IP Address added thereto from the corresponding transmission interface unit 151Tx or the transmission interface unit 153Tx to the radio IP network 10A or the radio IP network 10B.

The switching sever 150 of the present embodiment has, in addition to the aforementioned functions, as is the case with the switching server 100 of the first embodiment, a function of checking the order of the IP packets transmitted/received between MN350 and the IP phone terminal 40 by way of the radio IP network 10A and the radio IP network 10B, by a using sequence number (SN) of RTP (real-time transport protocol) included in the VoIP packet. Further, the switching server 150 has a function of obtaining statistic information of the IP packet which is to be relayed (e.g. packet loss, throughput, under-run count and over-run count of the jitter buffer) and transmitting the obtained information to MN300.

Yet further, the switching server 150 has a function of correlating the home IP address included in the IP packet transmitted by the IP phone terminal 40, with the home IP address registered at a home agent (not shown) accessible by way of the network 20. Accordingly, it is judged which communication business provider has allotted the home IP address to MN300.

(MN350)

As in the Switching Server 150, the Mn350 Carries Out Communication by simultaneously using the radio IP network 10A and the radio IP network 10B. Regarding the functional blocks similar to those of the switching server 150 described above, detailed descriptions thereof will be omitted.

As shown in FIG. 11, MN350 includes reception interface unit (11F A) 351Rx, reception interface unit (I/F B) 353Rx, transmission interface unit (I/F A) 351Tx, transmission interface unit (11F B) 353Tx, application processing unit 355, packet reception monitoring unit 357, allowable band analyzing unit 359, transmission band calculating unit 361, transmission band control Msg analyzing unit 363, allowable band test implementing unit 365, and transmission path selecting unit 367.

The reception interface unit 351Rx and the transmission interface unit 351Tx carry out wireless communication according to a wireless communication method (HRPD as a standard of 3GPP2) used in the radio IP network 10A. In the present embodiment, IP packets (VoIP packets) are transmitted/received at a predetermined cycle (e.g. 20 ms) between MN350 and the IP phone terminal 40 by way of the radio IP network 10A. The reception interface unit 351Rx and the transmission interface unit 351Tx are installed within MN350 or structured as a wireless communication card.

The reception interface unit 353Rx and the transmission interface unit 353Tx carry out wireless communication according to a wireless communication method (mobile WiMAX) used in the radio IP network 10B. The reception interface unit 353Rx and the transmission interface unit 353Tx are installed within MN350 or structured as a wireless communication card.

The reception interface unit 351Rx and the transmission interface unit 351Tx, as well as the reception interface unit 353Rx and the transmission interface unit 353Tx, transmit/receive an IP packet, based on a Care of IP Address allotted to MN350 in each of the radio IP network 10A and the radio IP network 10B.

The packet reception monitoring unit 357 has a jitter buffer for absorbing jitter of an IP packet received by the reception interface unit 351Rx and the reception interface unit 353Rx and supplies the received IP packet to the application process control unit 355. Further, the packet reception monitoring unit 357 supplies the IP packet received by the reception interface unit 351Rx and the reception interface unit 353Rx to the allowable band analyzing unit 359 and the transmission band calculating unit 361, receives the first upstream transmission band control Msg and the second upstream transmission band control Msg transmitted by the switching server 150 as described above and supplies the messages to the transmission band control Msg analyzing unit 363.

The application processing unit 355 processes the IP packet received from the packet reception monitoring unit 357 in accordance with the application, generates an IP packet (a VoIP packet, for example) according to the application and transmits the IP packet thus generated to the transmission path selection unit 367. The application processing unit 355 memorizes the home IP address of MN350 corresponding to the Care of IP Address at each of the radio IP network 10A and the radio IP network 10B.

The allowable band analyzing unit 359, as is the case with the allowable band analyzing unit 159 of the switching server 150, analyzes an allowable band showing a band state for each path on the basis of comparison of the sequence number and the reception time representing the reception timing of received packets for each path received by the packet reception monitoring unit 357 with the allowable range, from the ideal reception timing, of packets for each path preset in the transmission band calculating unit 361, and supplies the result to the transmission band calculating unit 361.

The transmission band calculating unit 361, as is the case with the transmission band calculating unit 161 of the switching server 150, calculates the first downstream transmission band of IP packets which the switching server 150 is transmitting to the radio IP network 10A, on the basis of the packets received from the packet reception monitoring unit 357 by way of the radio IP network 10A, and calculates the allowable range, from the ideal reception timing, of packets which the switching server 150 has transmitted to the radio IP network 10A.

The transmission band calculating unit 361 calculates the second downstream transmission band of IP packets which the switching server 150 is transmitting to the radio IP network 10B, on the basis of the packets received from the packet reception monitoring unit 357 by way of the radio IP network 10B, and calculates the allowable range, from the ideal reception timing, of packets which the switching server 150 has transmitted to the radio IP network 10B.

The first downstream transmission band and the second downstream transmission band calculated by the transmission band calculating unit 361 are transmitted, as the first downstream transmission band control Msg and the second downstream transmission band control Msg, from the transmission path selection unit 367 to the switching server 150 by way of the radio IP network 10A or the radio IP network 10B by using the access control packet as shown in FIG. 3(*b*).

When a band needs to be strengthened by complementing it and the like or when variation occurred in the calculated transmission band, the transmission band calculating unit 361 sets a transmission band (an allotment ratio) required for each path on the basis of the allowable band for each path analyzed by the allowable band analyzing unit 359 and transmits the first downstream transmission band control Msg and the second downstream transmission band control Msg, representing the allotment ratio, from the transmission path selecting unit 367 to the switching server 150 by way of the radio IP network 10A and the radio IP network 10B, whereby change in transmission band from the switching server 150 to MN350 in the first downstream direction and the second downstream direction is facilitated.

Accordingly, in the present embodiment, the transmission band calculating unit 361 constitutes the calculation unit for calculating an allowable range as an allowable reception timing range and the transmission control unit for controlling transmission control information, and the allowable band analyzing unit 359 constitutes the band-state analyzing unit. Regarding the method of calculating an allowable range, since the method is the same as that as described in the fist embodiment, explanation thereof will be omitted. The method of analyzing an allowable band will be described later.

The transmission band control Msg analyzing unit 363 analyzes the transmission bands in the first and second upstream directions from MN350 to the switching server 150, on the basis of the first upstream transmission band control Msg and the second upstream transmission band control Msg from the switching server 150, and supplies the result to the allowable band test-implementing unit 365.

The allowable band test-implementing unit 365 controls the transmission path selection unit 367, on the basis of the transmission bands in the first and second upstream directions analyzed by the transmission band control Msg analyzing unit 363, such that, in the transmission path selection unit 367, packets which the application process unit 355 has transmitted are allotted to the first upstream direction and the second upstream direction at a predetermined timing for transmission.

Further, the allowable band test-implementing unit 365, in order to analyze the allowable band in the first upstream direction and the second upstream direction in use, controls the transmission path selection unit 367 such that packets which the application process unit 355 has outputted are transmitted in the first upstream direction and the second upstream direction at timing other than the predetermined timing by changing an interval of the sequence numbers of transmission packets to be allotted to the first upstream direction and the second upstream direction for transmission, without changing the number of packets allotted to the first upstream direction and the second upstream direction, in the transmission path selection unit 367.

The transmission path selection unit 367 allots the packets outputted from the application process unit 355, to the transmission interface unit 351Tx and the transmission interface unit 353Tx, under the control of the allowable band test-implementing unit 365 and transmits the packets to the switching server 150 by way of the radio IP network 10A and the radio IP network 10B. Further, the transmission path selection unit 367 transmits the first downstream transmission band control Msg and the second downstream transmission band control Msg from the transmission band calculating unit 361, from the transmission interface unit 351Tx or the transmission interface unit 353Tx to the switching server 150 by way of the radio IP network 10A or the radio IP network 10B.

Specifically, the transmission path selection unit 367 adds, to an IP packet including a home IP address received from the application process unit 355, a Care of IP Address corresponding to the transmission path under the control of the allowable band test-implementing unit 365 and transmits the IP packet having a Care of IP Address added thereto from the corresponding transmission interface unit 351Tx or the transmission interface unit 353Tx to the radio IP network 10A or the radio IP network 10B.

The MN 350 of the present embodiment, as is the case with the switching server 150, has a function of checking the order of the IP packets transmitted/received between MN350 and the IP phone terminal 40, by a using sequence number (SN) of RTP included in the VoIP packet.

The switching server 150 and MN350 obtain ideal reception timing and an allowable range, respectively, as in the first embodiment and add the allowable range to the ideal reception timing, whereby the allowable limit timing of the wireless communication path is calculated.

Figure 12:
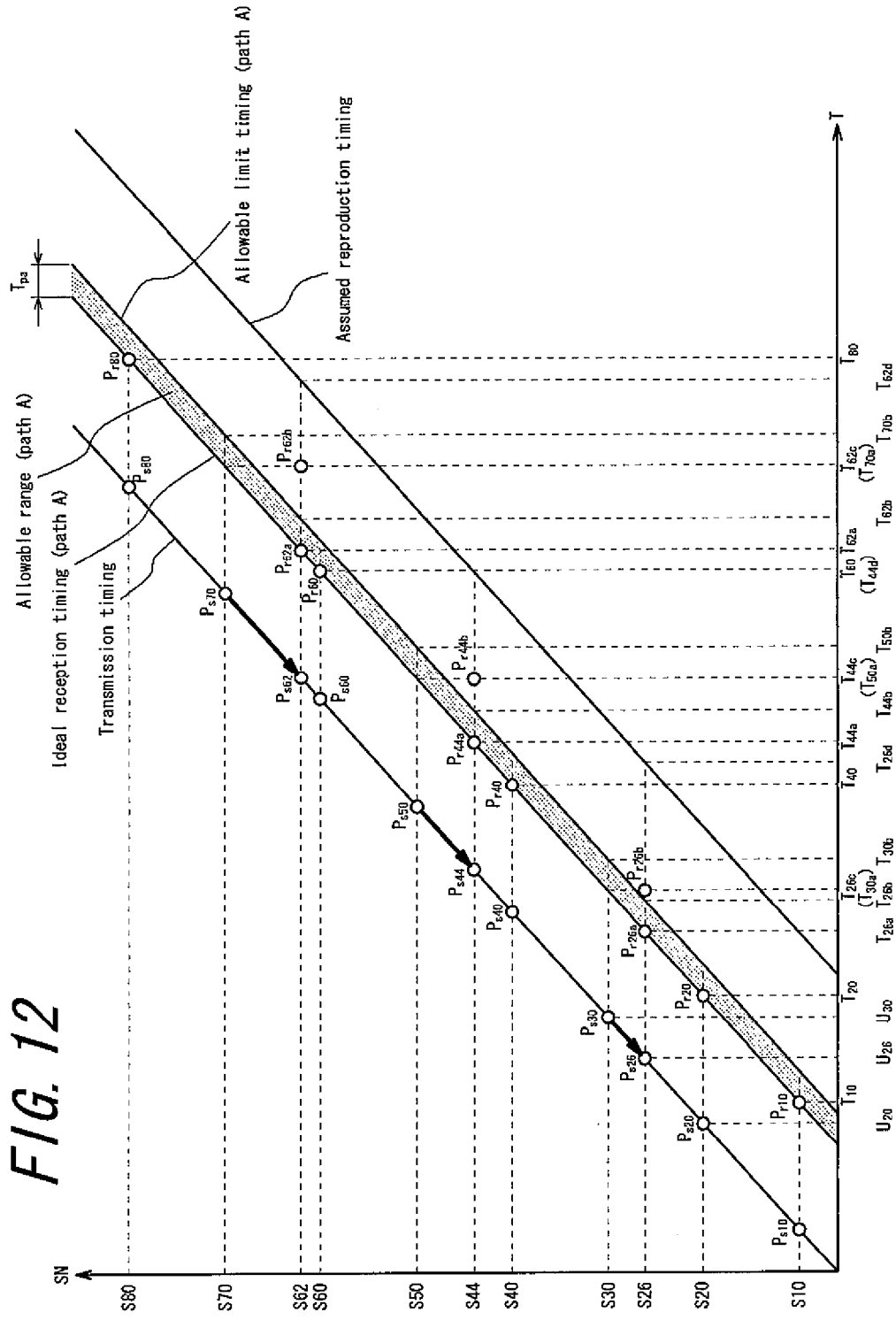
FIG. 12 is a view for explaining a method of analyzing allowable band.

FIG. 12 shows an example of calculation results of ideal reception timing and an allowable range. The X-axis represents time(T) and the Y-axis represents sequence number (SN), respectively. In this example, calculation results of ideal reception timing and an allowable range in the upstream direction of the radio IP network 10A (path A) are shown.

In FIG. 12, Tpa represents an allowable range (period) of path A. The lower limit of the allowable range Tpa is the allowable limit timing of path A. The latest allowable limit timing of the allowable limit timings of the respective wireless communication paths is the assumed reproduction timing. In the wireless communication paths which are simultaneously in use, the difference value (jitter buffer accumulation request time) between the ideal reception timing which is the closest to the transmission timing (i.e. the ideal reception timing having the smallest delay) and the assumed reproduction timing is no larger than the allowable time allowed by the application.

(Method of Analyzing an Allowable Band)

Next, the method of analyzing an allowable band on the switching 150 side and the MN350 side mentioned above will be described with reference to FIG. 12. Since the method of analyzing an allowable band is similar between on the switching server 150 side and the MN350 side, the method of analyzing an allowable band in the first upstream direction on the switching sever 150 side will be representatively described.

The switching server 150, in order to analyze the allowable band in the first upstream direction, controls the transmission path selection unit 367 by the allowable band test-implementing unit 365 of MN350 such that packets which the application process unit 355 has outputted are transmitted in the first upstream direction and the second upstream direction at timing other than the predetermined timing based on the transmission band by changing intervals of the sequence numbers of transmission packets to be allotted to the first upstream direction and the second upstream direction, without changing the number of packets allotted to the first upstream direction and the second upstream direction.

For example, as shown in FIG. 12, in the first upstream direction, there are executed: the normal transmission mode for transmitting packets at equal intervals based on the transmission band according to the first upstream transmission band control Msg and the second upstream transmission band control Msg transmitted by the switching server 150; and the test-implementing transmission mode for changing the intervals between the sequence numbers of packets to be transmitted, without changing the overall number of packets transmitted in the first upstream direction and the second upstream direction, i.e. shifting the sequence numbers of packets to be transmitted between the first upstream direction and the second upstream direction, prior to transmitting the packets.

FIG. 12 shows a case, in the normal transmission mode, where every tenth packet based on the transmission band, e.g. transmission packets Ps10, Ps20, Ps30, Ps40, Ps50, Ps60, Ps70, Ps80 of the sequence numbers S10, S20, S30, S40, S50, S60, S70, S80, of the packets outputted from the application process unit 355, are allotted in the first upstream direction and transmitted. FIG. 12 further shows a case, in the test-implementing transmission mode, where the transmission packets Ps30, Ps50, Ps70 of the sequence numbers S30, S50, S70 transmitted in the first upstream direction are swapped with the transmission packets Ps26, Ps44, Ps62 of the sequence numbers S26, S44, S62 transmitted in the second upstream direction, prior to transmission of the packets. In FIG. 12, the packets of the respective sequence numbers received on the switching server 150 side are shown with prefixes "Pr" thereon.

In FIG. 12, the packets transmitted in the normal transmission mode are received within the allowable range of path 1 when the band has not been narrowed in the first upstream direction. For example, the packet Psi 0 of the sequence number S10 is received within the allowable range of time [T10, T10+Tpa].

In contrast, in the test-implementing transmission mode, the sequence numbers of packets to be transmitted are shifted without changing the overall number of transmitted packets. In FIG. 12, the transmission packets Ps30, Ps50, Ps70 of the sequence numbers S30, S50, S70 are swapped with the transmission packets Ps26, Ps44, Ps62 of the sequence numbers S26, S44, S62, prior to transmission of the packets.

Accordingly, the resulting transmission interval (i.e. time (U26–U20)) between the transmission packet Ps20 and the transmission packet Ps26 is 40% shorter than time (U30–U20) in the normal transmission mode. Similarly, the transmission interval between the transmission packet Ps40 and the transmission packet Ps44 is 60% shorter than time in the normal transmission mode, and the transmission interval between the transmission packet Ps60 and the transmission packet Ps62 is 80% shorter than time in the normal transmission mode. In other words, the transmission interval between the transmission packet Ps26 and the transmission packet Ps40 is 40% longer than time in the normal transmission mode, the transmission interval between the transmission packet Ps44 and the transmission packet Ps60 is 60% longer than time in the normal transmission mode, and the transmission interval between the transmission packet Ps62 and the transmission packet Ps80 is 80% longer than time in the normal transmission mode.

In this test-implementing transmission mode, when the reception timing on the reception side of the transmitted packet Ps26 is within the allowable range (period[T26a, T26b]) as shown by the received packet Pr26a, this means that the allowable band of the path A may have a band which is 10/6 of the transmission band at present. In contrast, when the reception timing on the reception side of the transmitted packet Ps26 is not within the allowable range as shown by the received packet Pr26b, this means that the allowable band of the path A does not have a band which is 10/6 of the transmission band at present.

Similarly, when the reception timing on the reception side of the transmitted packet Ps44 is within the allowable range (period[T44a, T44b]) as shown by the received packet Pr44a, this means that the allowable band of the path A may have a band which is 10/4 of the transmission band at present. Further, when the reception timing on the reception side of the transmitted packet Ps62 is within the allowable range (period [T62a, T62b]) as shown by the received packet Pr62a, this means that the allowable band of the path A may have a band which is 10/2 of the transmission band at present.

In contrast, when the allowable band coincides with the transmission band, the reception timing of the transmitted packet Ps26 is within the allowable range ([T26c(T30a), T30b]) of the received packet Pr30 with respect to the transmitted packet Ps30 in the normal transmission mode, as shown in the received packet Pr26b, and the reception timing of the transmitted packet Ps44 is within the allowable range ([T44c(T50a), T50b]) of the received packet Pr50 with respect to the transmitted packet Ps50 in the normal transmission mode, as shown in the received packet Pr44b, and the reception timing of the transmitted packet Ps62 is within the allowable range ([T62c(T70a), T70b]) of the received packet Pr70 with respect to the transmitted packet Ps70 in the normal transmission mode, as shown in the received packet Pr62*b*.

Further, in a case in which the reception timing of a transmitted packet which has been shifted exceeds the allowable range of the received packet with respect to the transmitted packet subjected to shifting in the normal transmission mode, it is analyzed that the allowable band of the path A has been narrowed.

Accordingly, in MN350, it is possible to analyze on the switching server 150 side the band state in the upstream direction of the path A, i.e. an allowable band including band-narrowing, by repeatedly testing packet shift at different timing prior to transmitting packets. The band state in the upstream direction of the path B can be analyzed likewise. Further, regarding the band states in the downstream direction of the path A or the path B, it is possible to analyze on the MN350 side the band state in the downstream in the corresponding path by repeatedly testing packet shift at different timing prior to transmitting packets in the switching server 150.

When the sequence number of a packet to be transmitted is shifted in the test-implementing transmission mode, shifting is set such that the reception timing at the sequence number after being shifted does not exceed the assumed reproduction timing at the sequence number before being shifted. By this setting, for example, in FIG. 12, in a case in which the allowable band of the path A coincides with the transmission band, the reception timing of the transmitted packet Ps62 is within the allowable range ([T62*c*(T70*a*), T70*b*]) of the received packet Pr70 with respect to the transmitted packet Ps70 in the normal transmission mode, as described above. In this example, the received packet Pr62*b* is significantly delayed with respect to the received packet Pr62*a* within the allowable range. However, in terms of the application being executed for communication, the reception timing of the received packet Pr62*b* is within the assumed reproduction timing T62*d* and does not affect reproduction of the application.

Further, it is preferable that the normal transmission mode and the test-implementing transmission mode are alternately executed in an appropriate cycle. By doing this, if the allowable band coincides with the transmission band, the consequence is simply the packet of which sequence number has been shifted being received at the reception timing which the packet would have if the sequence number thereof had not been shifted, whereby the packet does not affect the next packet by causing accumulation of packets on the path.

According to the present embodiment, in the path being used for communication, transmission is made from the packet transmitting side such that the intervals between the sequence numbers of packets to be transmitted are changed, i.e. the sequence numbers are shifted, to the degree which does not affect the application in use for communication, without changing the overall number of packets to be transmitted. On the reception side, the band state including an allowable band of the transmission path is analyzed on the basis of comparison of the reception timing of the transmitted packets which have been shifted, with the allowable reception timing range as the allowable range calculated in advance, and the analysis result is transmitted as a transmission band control Msg to the packet transmission side. Consequently, for example, when a broader transmission band is required and/or band-narrowing has occurred, the allotment ratio of other transmission bands in the plural paths in use can be changed (i.e. the transmission band can be broadened) to the extent that no accumulation occurs in the path or none of the transmitted packets are discarded with respect to the application. In short, the transmission band can be controlled accurately or correctly.

In the second embodiment, an insufficient transmission band is complemented in both of the upstream direction and the downstream direction. However, the transmission band may be complemented in only one of the upstream direction and the downstream direction. Further, in the second embodiment, if any unused wireless communication path is available, this path may be used as a path for transmitting a transmission band control Msg.

Further, regarding control of a transmission band by a transmission band control Msg, the control is not restricted to the corresponding radio path and may be made to other radio paths such that the corresponding radio path and other radio paths complement each other or, if yet another radio path is present, band-narrowing can be complemented by newly using the yet another radio path. For example, in the switching server 150, when the transmission band of packets to be transmitted to the radio IP network 10B is narrowed on the basis of the second downstream transmission band control Msg transmitted by MN350, the transmission band is controlled by increasing the band (broadening the transmission band) of packets to be transmitted to the radio IP network 10A so as to complement the narrowed range of the band or by further complementing the narrowed range of the band with yet another radio path.

Third Embodiment (Overall Schematic Structure of Communication System)

Figure 13:
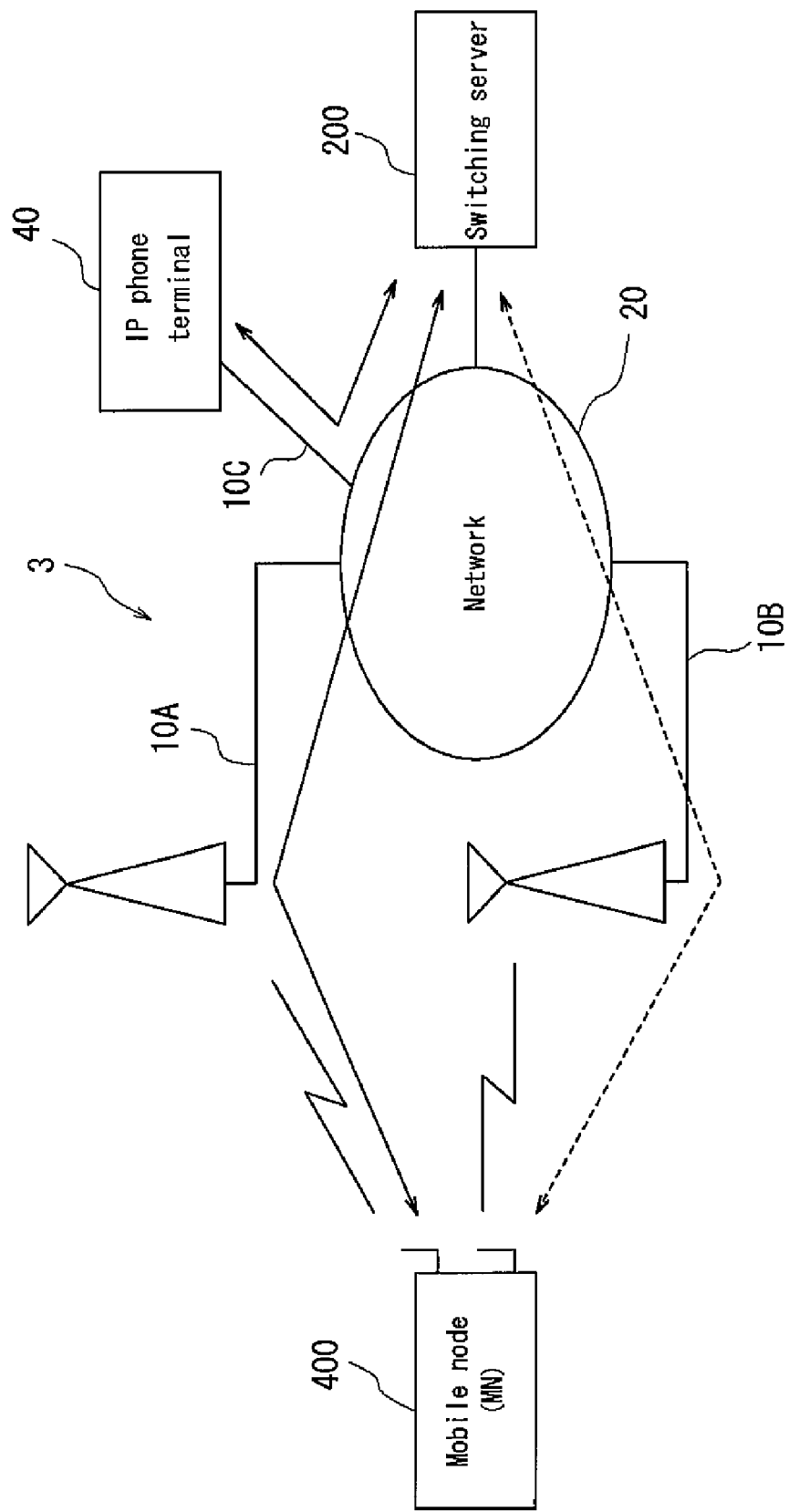
FIG. 13 is an overall schematic structural view of a communication system of yet another embodiment of the present invention

FIG. 13 is an overall schematic structural view of a communication system 3 according to a third embodiment of the present invention. As shown in FIG. 13, the communication system 3 includes a radio IP network 10A and a radio IP network 10B as plural different wireless communication paths available to MN400 which is a wireless communication apparatus. The radio IP network 10A and the radio IP network 10B, which are similar to those of the foregoing embodiments, are connected to the network 20.

In FIG. 13, in order to simplify the drawing, two radio IP networks 10A and 10B are shown. However, different wireless communication paths where MN400 can be used are not restricted to these radio IP network 10A and radio IP network 10B and a larger number of radio IP networks may be used.

To the network 20, a switching server 200, constituting a communication control apparatus for controlling the wireless communication paths with respect to MN400, is connected.

The switching server 200, as in the foregoing embodiments, has VPN router function for implementing a routing process of an IP packet and ensures IP mobility of MN400 by establishing a tunnel of VPN (IPSec) between MN400 and the switching server 200 to realize virtualization of OSI layer 3.

In the present embodiment, different from the case of mobile IP (for example, RFC2002), MN400 selects as in the second embodiment the radio IP network 10A as the master path and other radio IP network(s) 10B as the slave paths, for example, and simultaneously uses these plural radio IP networks, with complementing a band insufficient in the master path with respect to the request band of the application by the slave path(s), to implement communication with a communication counterpart (specifically, an IP phone terminal 40).

The switching server 200 is connected with the IP phone terminal 40 by way of a communication network 10C connected with the network 20, as in the foregoing embodiments. The IP phone terminal 40 converts phonetic signals and VoIP packets with each other and/or transmits/receives IP packets.

Specifically, the switching server 200 (communication apparatus) receives an IP packet (VoIP packet) which MN400 (wireless communication apparatus) has transmitted to the IP phone terminal 40 (the communication counterpart) by using the selected plural different radio IP networks, with complementing insufficient band by a predetermined cycle (20 ms). The switching server 200 relays the IP packet to the IP phone terminal 40. Further, the switching server 200 receives an IP packet (VoIP packet) which the IP phone terminal 40 has transmitted to MN400 in a predetermined cycle (20 ms) and relays the IP packet to MN400, with complementing insufficient band by using the selected plural different radio IP networks.

In the present embodiment, during a period in which communication is carried out by using the radio IP network 10A and the radio IP network 10B simultaneously by way of the switching server 200 between MN400 and the IP phone terminal 40, the band state is monitored in each of MN400 and the switching server 200 on the basis of received packets from the radio IP network 10A and the radio IP network 10B. As a result, when band-narrowing is detected, a transmission band limit Msg (transmission band limit information) for restricting a transmission band of a packet with respect to the radio IP network is transmitted to the packet transmitting side, a predicted allowable band of a radio IP network other than the radio IP network having a narrowed band is analyzed on the basis of the packet received by way of the radio IP network, and a transmission band control Msg (transmission band control information) for broadening a transmission band of a packet with respect to a radio IP network where the transmission band of packets can be made a broadband is transmitted to the packet transmitting side.

For example, in the switching server 200, when it has been detected that the upstream band of the radio IP network 10A as the transmission path from MN400 has been narrowed, a transmission band limit Msg (message) for restricting the upstream transmission band of the radio IP network 10A to e.g. zero is transmitted from the switching server 200 to MN400. Further, the switching server 200 analyzes a predicted allowable band of a radio IP network other than the radio IP network having a narrowed band based on the packets received by way of the radio IP network.

As a result, when there is available a radio IP network of which transmission band can be made a broadband or broadened, a transmission band control Msg (message) for broadening the transmission band of packets with respect to the radio IP network is transmitted to MN400. This process is carried out according to a predetermined order for each radio IP network where band-broadening is possible, until the total transmission band from MN400 becomes the request band required by the application (the application requested band), whereby the upstream transmission band allotted to the radio LP network 10A having a restricted transmission band is complemented by another radio IP network.

In a case in which there is no radio IP network of which transmission band can be made a broadband or a case in which such a radio IP network exists but the transmission band corresponding to a band range restricted by band-narrowing cannot be ensured as a whole, i.e. when the application requested band cannot be ensured as the entire transmission band, the state of upstream band of the radio IP network 10A as the subject to which the transmission band control Msg has been transmitted is analyzed. As a result, when the band-narrowing has been resolved or the accumulation of packets has been resolved, a transmission band control Msg, having the reception band at the time when the accumulation has been resolved as the upstream transmission band of the radio IP network 10A, is transmitted to MN400.

When MN400 receives the transmission band limit Msg transmitted by the switching server 200, MN400 restricts the transmission band of a packet to be transmitted to the corresponding radio IP network to zero in accordance with the received information. Further, when MN400 receives the transmission band control Msg, MN400 changes the allotment ratio of packets to be transmitted to the corresponding radio IP network, i.e. the allotment ratio of the transmission band, in accordance with the received information and then transmits the packets to be transmitted.

When other upstream transmission path from MN400 to the switching server 200, e.g. the radio IP network 10B, has been subjected to band-narrowing, processing similar to that described above is carried out. Or, when the downstream transmission path from the switching server 200 to MN400, e.g. the radio IP network 10A or the radio IP network 10B, has been subjected to band-narrowing, processing similar to that described above is carried out.

As described above, in the present embodiment, the band state of each radio IP network is monitored on the packet reception side on the basis of the received packets in complementary communication in which communication is carried out with complementing an insufficient band by using plural radio IP networks of different wireless communication methods. When a radio IP network having a narrowed band is detected, a transmission band limit Msg for limiting the transmission band in the band-narrowed radio IP network is transmitted to the packet transmission side; predicted allowable bands of the radio IP networks in use other than the band-narrowed radio IP network are analyzed on the basis of packets received by way of the wireless communication paths; and a transmission band control Msg for broadening a transmission band of packets with respect to a radio IP network where the transmission band of packets can be made a broadband is transmitted to the packet transmitting side. Further, on the packet transmitting side, the transmission band of the corresponding radio IP network is limited or the transmission band is changed based on a transmission band limit Msg or a transmission band control Msg from the packet reception side. Due to this, the number of discarded packets when band-narrowing of a communication path has occurred can be effectively reduced.

Next, the functional block structure of the communication system 3 will be described. Specifically, the functional block structures of the switching server 200 and MN400 included in the communication system 3 will be described with reference to FIG. 14, and portions thereof which are relevant to the present embodiment will mainly be described below. Accordingly, it should be noted that the switching server 200 and MN400 may be provided with a logic block (power source portion) or the like, which is not either illustrated in the drawings or described below but essentially required to realize the functions of the apparatus.

(Switching Server 200)

Figure 14:
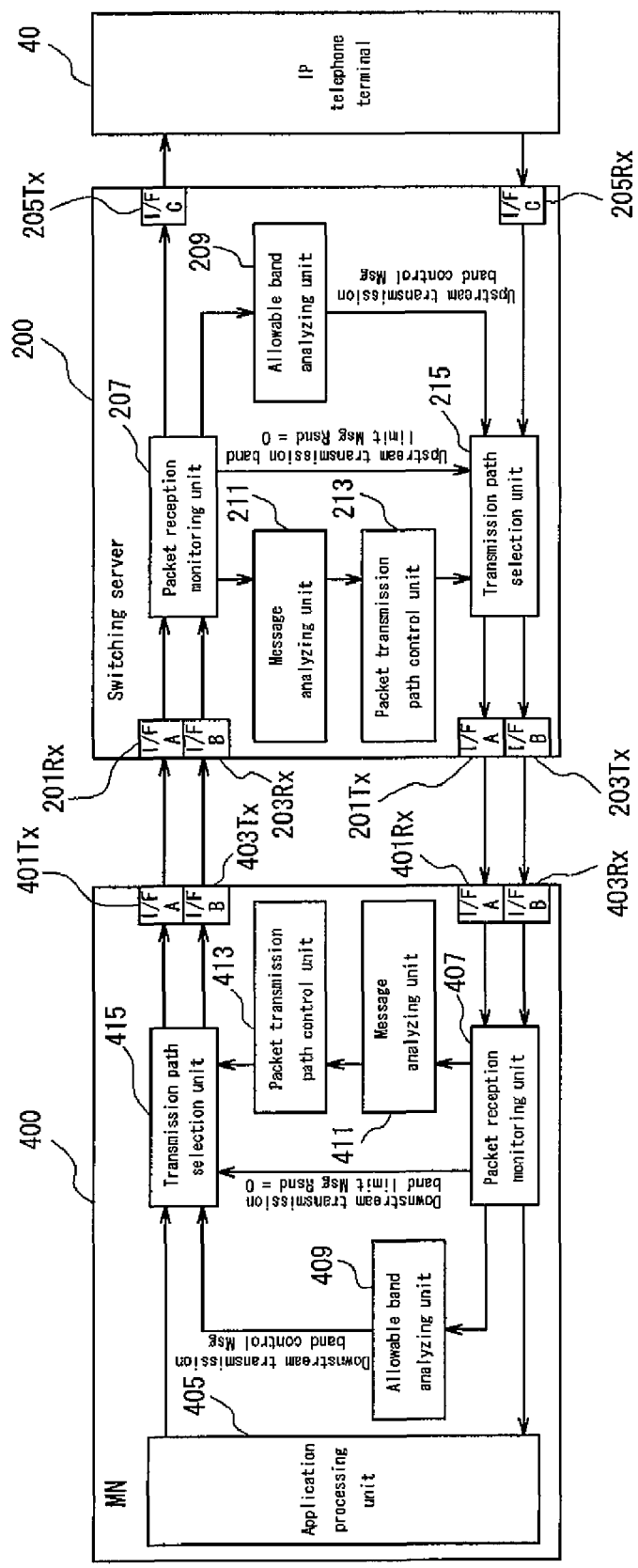
FIG. 14 is a functional block structural view of a switching server and MN as shown in FIG. 13.

As shown in FIG. 14, the switching server 200 includes reception interface unit (I/F A) 201Rx, reception interface unit (I/F B) 203Rx, reception interface unit (I/F C) 205Rx, transmission interface unit (I/F A) 201Tx, transmission interface unit (I/F B) 203Tx, transmission interface unit (I/F C) 205Tx, packet reception monitoring unit 207, allowable band analyzing unit 209, message analyzing unit 211, packet transmission path control unit 213, and transmission path selecting unit 215.

The reception interface unit 201Rx and the transmission interface unit 201Tx structure a communication interface unit corresponding to the radio IP network 10A and is constituted of, for example, 1000BASE-T prescribed by IEEE802.3ab, being connected to the radio IP network 10A by way of the network 20.

Similarly, the reception interface unit 203Rx and the transmission interface unit 203Tx, structure a communication interface unit corresponding to the radio IP network 10B and is constituted of, for example, 1000BASE-T prescribed by IEEE802.3ab, being connected to the radio IP network 10B by way of the network 20.

In the present embodiment, as in the foregoing embodiments, since VPN by IPSec is set, IP packets transmitted/received by the communication interface units respectively corresponding to the radio IP network 10A and the radio IP network 10B, specifically, the VoIP packets transmitted/received between the switching server 200 and MN400 (more specifically, VoIP packet transmitted by MN400) has a structure as shown in FIG. 3(*a*). That is, In the VoIP packet, home IP header (home IP address), TCP/UDP header and payload are encapsulated and Care of IP Address corresponding to the radio IP network is added.

An access control packet transmitted/received between the switching server 200 and MN400 has a structure as shown in FIG. 3(*b*). Specifically, the access control packet is constituted of data-link layer header, Care of IP Address, TCP header and a control code.

The reception interface unit 205Rx and the transmission interface unit 205Tx structure a communication interface unit corresponding to the communication network 10C and is connected to the network 20 to be used for implementing communication with the IP phone terminal 40.

The packet reception monitoring unit 207 has a jitter buffer for absorbing jitter of IP packets received by the reception interface unit 201Rx and the reception interface unit 203Rx and transmits the received IP packets to the IP phone terminal 40 by way of the transmission interface unit 205Tx.

Further, the packet reception monitoring unit 207 supplies: the IP packet received by the reception interface unit 201Rx and the reception interface unit 203Rx to the allowable band analyzing unit 209; receives a downstream transmission band limit Msg and a downstream transmission band control Msg described below transmitted by MN400; and supplies the messages to the message analyzing unit 211.

The packet reception monitoring unit 207 monitors the band states of the radio IP network 10A and the radio IP network 10B, respectively, on the basis of the packets received via these respective radio IP networks. As a result of this monitoring, when a radio IP network having a narrowed band is detected, an upstream transmission band limit Msg for limiting the transmission band in the band-narrowed radio IP network is outputted to the transmission path selection unit 215. The upstream transmission band limit Msg is set, for example, such that the upstream transmission band (Rsnd) in the band-narrowed radio IP network is restricted to zero, i.e. Rsnd 0. The method of monitoring a band state including detection of band-narrowing by the packet reception monitoring unit 207 will be described later.

On the basis of the monitoring result by the packet reception monitoring unit 207, the allowable band analyzing unit 209 analyzes a predicted allowable band of the radio IP network other than the band-narrowed radio IP network on the basis of the packets received by the packet reception monitoring unit 207 by way of the radio IP network. When there exists a radio IP network where the transmission band of packets can be made a broadband, an upstream transmission band control Msg for broadening the transmission band of the packet with respect to the radio IP network is outputted to the transmission path selection unit 215.

The process of analyzing the predicted allowable band is carried out according to a predetermined order for each radio IP network where band-broadening is possible, until the total transmission band of the transmitted packets from MN400 received by the packet reception monitoring unit 207 becomes the application requested band, whereby the upstream transmission band allotted to the radio IP network having a limited transmission band is complemented by another radio IP network.

In a case in which there is no radio IP network of which transmission band can be made a broadband or a case in which such a radio IP network exists but the application requested band cannot be ensured as the entire transmission band, the allowable band analyzing unit 209 analyzes the state of upstream band of the radio IF network as the subject to which the transmission band limit Msg has been transmitted. As a result of the analysis, when packet accumulation has been resolved, a transmission band control Msg, having the reception band at the time when the accumulation has been resolved as the upstream transmission band of the radio IP network 10A, is transmitted to the transmission path selection unit 215.

The method of analyzing a predicted allowable band by the allowable band analyzing unit 209 will be described later.

The message analyzing unit 211 analyzes the downstream transmission band limit Msg and the downstream transmission band control Msg from MN400 received by the packet reception monitoring unit 207 and supplies the result to the packet transmission path control unit 213.

The packet transmission path control unit 213 controls the transmission path selection unit 215 on the basis of the downstream transmission band limit Msg and the downstream transmission band control Msg analyzed by the message analyzing unit 211.

The transmission path selection unit 215 allots the VoIP packets from the IP phone terminal 40 received by way of the reception interface unit 205Rx, to the transmission interface unit 201Tx and the transmission interface unit 203Tx, under the control of the packet transmission path control unit 213, thereby controlling the transmission band of the radio IP network 10A and the radio IP network 10B.

Specifically, under the control of the packet transmission path control unit 213, a Care of IP Address corresponding to the transmission path is added to an IP packet including a home IP address received from the IP phone terminal 40, and the IP packet having a Care of IP Address added thereto is transmitted from the corresponding transmission interface unit 201Tx or the transmission interface unit 203Tx to the radio IP network 10A or the radio IP network 10B. The transmission path selection unit 215 has a jitter buffer for absorbing jitter of the IP packet received by the reception interface unit 205Rx.

Further, the transmission path selection unit 215 transmits an upstream transmission band limit Msg from the packet reception monitoring unit 207 and an upstream transmission band control Msg from the allowable band analyzing unit 209, from the transmission interface unit 201Tx or the transmission interface unit 203Tx to MN400 by way of the radio IP network 10A or the radio IP network 10B. The upstream transmission band limit Msg and the upstream transmission band control Msg are transmitted by using the access control packet as shown in FIG. 3(*b*).

As is the case with the switching servers the foregoing embodiments, the switching sever 200 of the present embodiment has, in addition to the aforementioned functions, a function of checking the order of the IP packets transmitted/received between MN400 and the IP phone terminal 40 by way of the radio IP network 10A and the radio IP network 10B, by a using sequence number (SN) of RTP (real-time transport protocol) included in the VoIP packet. Further, the switching server 200 has a function of obtaining statistic information of the IP packet which is to be relayed (e.g. packet loss, throughput, under-run count and over-run count of the jitter buffer) and transmitting the obtained information to MN400.

Yet further, the switching server 200 has a function of correlating the home IP address included in the IP packet transmitted by the IP phone terminal 40, with the home IP address registered at a home agent (not shown) accessible by way of the network 20. Accordingly, it is analyzed which communication business provider has allotted the home IP address to MN400.

(MN400)

As in the Switching Server 200, the Mn400 Carries Out Communication by simultaneously using the radio IP network 10A and the radio IP network 10B. Regarding the functional blocks similar to those of the switching server 200 described above, detailed descriptions thereof will be omitted.

As shown in FIG. 14, MN400 includes reception interface unit (I/F A) 401Rx, reception interface unit (I/F B) 403Rx, transmission interface unit (I/F A) 401Tx, transmission interface unit (I/F B) 403Tx, application processing unit 405, packet reception monitoring unit 407, allowable band analyzing unit 409, message analyzing unit 411, packet transmission path control unit 413, and transmission path selection unit 415.

The reception interface unit 401Rx and the transmission interface unit 401Tx carry out wireless communication according to a wireless communication method (HRPD as a standard of 3GPP2) used in the radio IP network 10A. In the present embodiment, IP packets (VoIP packets) are transmitted/received at a predetermined cycle (e.g. 20 ms) between MN400 and the IP phone terminal 40 by way of the radio IP network 10A. The reception interface unit 401Rx and the transmission interface unit 401Tx are installed within MN400 or structured as a wireless communication card.

The reception interface unit 403Rx and the transmission interface unit 403Tx carry out wireless communication according to a wireless communication method (mobile WiMAX) used in the radio IP network 10B. The reception interface unit 403Rx and the transmission interface unit 403Tx are installed within MN400 or structured as a wireless communication card.

The reception interface unit 401Rx and the transmission interface unit 401Tx, as well as the reception interface unit 403Rx and the transmission interface unit 403Tx, transmit/receive an IP packet, based on a Care of IP Address allotted to MN400 in each of the radio IP network 10A and the radio IP network 10B.

The packet reception monitoring unit 407 has a jitter buffer for absorbing jitter of an IP packet received by the reception interface unit 401Rx and the reception interface unit 403Rx and supplies the received IP packet to the application process control unit 405.

Further, the packet reception monitoring unit 407 supplies the IP packet received by the reception interface unit 401Rx and the reception interface unit 403Rx to the allowable band analyzing unit 409, receives the upstream transmission band limit Msg and/or the upstream transmission band control Msg transmitted by the switching server 200 described below, and supplies the messages to the message analyzing unit 411.

Further, as in the packet reception monitoring unit 207 of the switching server 200, the packet reception monitoring unit 407 monitors the band states of the radio IP network 10A and the radio IP network 10B, respectively, on the basis of the packets received via these respective radio IP networks. As a result of this monitoring, when a radio IP network having a narrowed band is detected, a downstream transmission band limit Msg for limiting the transmission band in the band-narrowed radio IP network is outputted to the transmission path selection unit 415. The downstream transmission band limit Msg is set, as in the aforementioned upstream transmission band limit Msg, such that the downstream transmission band (Rsnd) in the band-narrowed radio IP network is restricted to zero, i.e. Rsnd=0. The method of monitoring a band state including detection of band-narrowing by the packet reception monitoring unit 207 will be described later.

The application processing unit 405 processes the IP packet received from the packet reception monitoring unit 407 in accordance with the application, generates an IP packet (a VoIP packet, for example) according to the application and transmits the IP packet thus generated to the transmission path selection unit 415. The application processing unit 405 memorizes the home IP address of MN400 corresponding to the Care of IP Address at each of the radio IP network 10A and the radio IP network 10B.

On the basis of the monitoring result from the packet reception monitoring unit 407, the allowable band analyzing unit 409, as is the case with the allowable band analyzing unit 209 of the switching server 200, analyzes a predicted allowable band of the radio IP network other than the band-narrowed radio IP network on the basis of the packets received by the packet reception monitoring unit 407 by way of the radio IP network. When there exists a radio IP network where the transmission band of packets can be made a broadband, a downstream transmission band control Msg for broadening the transmission band of the packet with respect to the radio IP network is outputted to the transmission path selection unit 415.

The process of analyzing the predicted allowable band is carried out according to a predetermined order for each radio IP network where band-broadening is possible, until the total transmission band of the transmitted packets from the switching server 200 received by the packet reception monitoring unit 407 becomes the application requested band, whereby the downstream transmission band allotted to the radio IP network having a limited transmission band is complemented by another radio IP network.

In a case in which there is no radio IP network of which transmission band can be made a broadband or a case in which such a radio IP network exists but the application requested band cannot be ensured as the entire transmission band, the allowable band analyzing unit 409 analyzes the state of downstream band of the radio IP network as the subject to which the transmission band limit Msg has been transmitted. As a result of the analysis, when packet accumulation has been resolved, a transmission band control Msg, having the reception band at the time when the accumulation has been resolved as the downstream transmission band of the radio IP network, is transmitted to the transmission path selection unit 215.

The method of analyzing a predicted allowable band by the allowable band analyzing unit 409 will be described later.

The message analyzing unit 411, as is the case with the message analyzing unit 211 of the switching server 200, analyzes the upstream transmission band limit Msg and the upstream transmission band control Msg from the switching server 200 received by the packet reception monitoring unit 407 and supplies the result to the packet transmission path control unit 413.

The packet transmission path control unit 413, as is the case with the packet transmission path control unit 213 of the switching server 200, controls the transmission path selection unit 415 on the basis of the upstream transmission band limit Msg and the upstream transmission band control Msg analyzed by the message analyzing unit 411.

The transmission path selection unit 415, as is the case with the transmission path selection unit 215 of the switching server 200, allots the packets outputted from the application processing unit 405 to the transmission interface unit 401Tx and the transmission interface unit 403Tx, under the control of the packet transmission path control unit 413, thereby controlling the transmission band of the radio IP network 10A and the radio IP network 10B.

Specifically, under the control of the packet transmission path control unit 413, the transmission path selection unit 415 adds a Care of IP Address corresponding to the transmission path to an IP packet including a home IP address received from the application processing unit 405, and transmits the IP packet having a Care of IP Address added thereto from the corresponding transmission interface unit 401Tx or the transmission interface unit 403Tx to the radio IP network 10A or the radio IP network 10B.

Further, the transmission path selection unit 415 transmits a downstream transmission band limit Msg from the packet reception monitoring unit 407 and a downstream transmission band control Msg from the allowable band analyzing unit 409, from the transmission interface unit 401Tx or the transmission interface unit 403Tx to the switching server 200 by way of the radio IP network 10A or the radio IP network 10B. The downstream transmission band limit Msg and the downstream transmission band control Msg are, as with the case with the upstream transmission band limit Msg and the upstream transmission band control Msg described above, transmitted by using the access control packet as shown in FIG. 3(*b*).

As is the case with the switching server 200, MN400 of the present embodiment also has a function of checking the order of the IP packets transmitted/received between MN400 and the IP phone terminal 40 by a using sequence number (SN) of RTP included in the VoIP packet.

(Method of Monitoring a Band State)

Next, the method of monitoring a band state for detecting band-narrowing of each radio IP network will be described. Since the method of monitoring a band state is similar between on the switching server 200 side and the MN400 side, the case in which the method is carried out by the packet reception monitoring unit 207 of the switching server 200 will be representatively described.

Examples of the method of detecting band-narrowing by monitoring a band state includes: (1) a method of detecting band-narrowing, based on comparison of the allowable range showing the allowable reception timing range of packets received via each radio IP network with the reception timing of the packets received via the radio IP network (a detection method based on the allowable range); and (2) a method of detecting band-narrowing, based on packets received via each radio IP network within a monitoring period in accordance with a transmission band allotted to the radio IP network (a band allotment ratio) (a detection method based on the band allotment ratio).

(1) Detection Method Based on an Allowable Range

To detect band-narrowing, based on an allowable range, an allowable range is calculated at first. This allowable range is set, as in the foregoing embodiments, as an allowable reception timing range from the ideal reception timing with respect to the transmission timing of a packet.

When the ideal reception timing and the allowable range are obtained, the allowable limit timing of the wireless communication path is calculated by adding the allowable range to the ideal reception timing.

Figure 15:
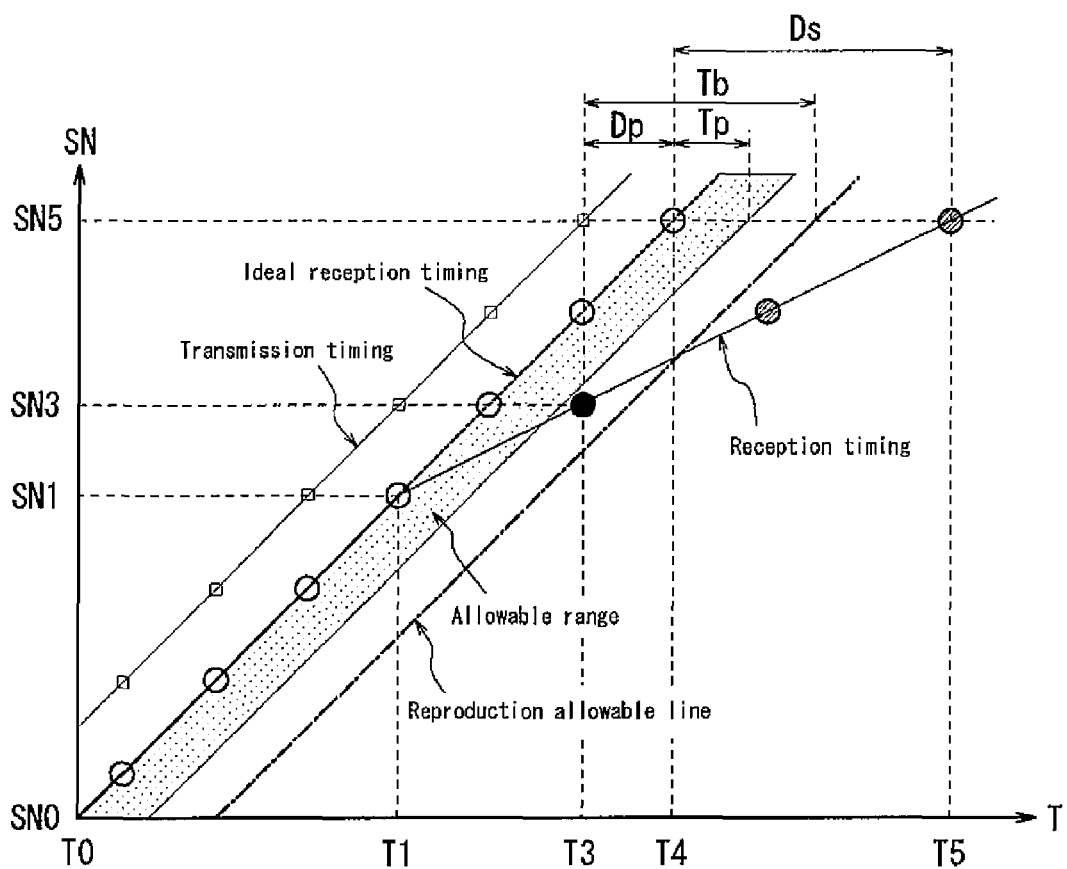
FIG. 15 is a view showing an example of detecting band-narrowing when the band allotment ratio is 25% according to a detection method based on an allowable band.
Figure 16:
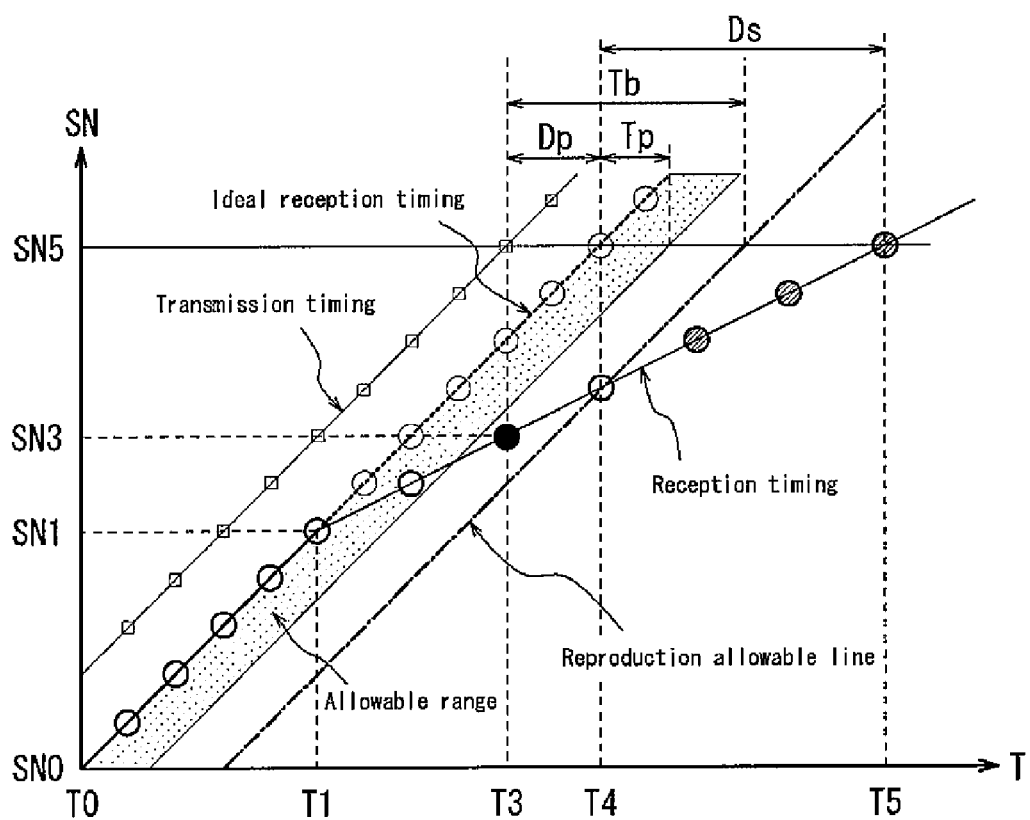
FIG. 16 is a view showing an example of detecting band-narrowing when the band allotment ratio is 50% according to the detection method based on an allowable band.

FIG. 15 and FIG. 16 show examples of detecting band-narrowing according to the detection method based on an allowable range. These examples show cases of receiving VoIP packets transmitted at 20 ms interval. FIG. 15 shows a case where the band allotment ratio is 25% and FIG. 16 shows a case where the band allotment ratio is 50%. In FIGS. 15 and 16, the X-axis represents time T and the Y-axis represents the sequence numbers (SN) of packets. Tp represents an allowable range (60 ms in these examples) from the ideal reception timing of packets in the radio IP network. Dp represents potential delay in time (80 ms in these examples) from the transmission timing of VoIP packets to the ideal reception timing in the radio IP network. Tb represents reproduction allowable time (200 ms in these examples) from the transmission timing of VoIP packets, and Ds represents accumulation delay in time.

In FIG. 15 and FIG. 16, it is assumed that the allowable band of the radio IP network is 50% narrowed from time T1 when packet SN1 is received. In this case, since the reception timing of the next packet SN3 (shown as a black circle) goes beyond the allowable range Tp at time T3 when packet SN3 is received at the band allotment ratio 25% as shown in FIG. 15, it is possible to detect, at time T3, that the radio IP network has been band-narrowed. In this case, the accumulation delay in time Ds generated by the packets transmitted up to time T3 is 240 and thus the number of discarded packets exceeding the reproduction allowable line (the hashed circles in the graph) is only two packets.

In the case of FIG. 16 where the band allotment ratio is 50%, after packet SN1 is received at time T1, the reception timing of the second packet SN3 (shown as a black circle) goes beyond the allowable range Tp at time T3 when packet SN3 is received, whereby it is possible to detect, at time T3, that the radio IP network has been band-narrowed. In this case, the accumulation delay in time Ds generated by the packets transmitted up to time T3 is 240 and thus the number of discarded packets exceeding the reproduction allowable line (the hashed circles in the graph) is only three packets.

As described above, by setting an allowable range Tp for each of the upstream and downstream directions of each radio IP network and detecting, based on comparison of the allowable range Tp with the reception timing of a packet, that the allowable band of the radio IP network has been narrowed when the reception timing goes beyond the allowable range Tp, it is possible to detect, in substantially real-time, variation in an allowable band due to changes in the propagation environment such as fading.

(2) Detection Method Based on a Band Allotment Ratio

When band-narrowing is detected based on a band allotment ratio, the allotment ratio at each radio IP network is determined, for example, on the basis of the packet transmission interval and the number of received packets within a predetermined time in the application, and band-narrowing of the allowable band in the radio IP network is detected on the basis of the reception timing of packets subsequently received vie the corresponding radio IP network within the monitoring period, which period is inversely proportional to the determined band allotment ratio.

Figure 17:
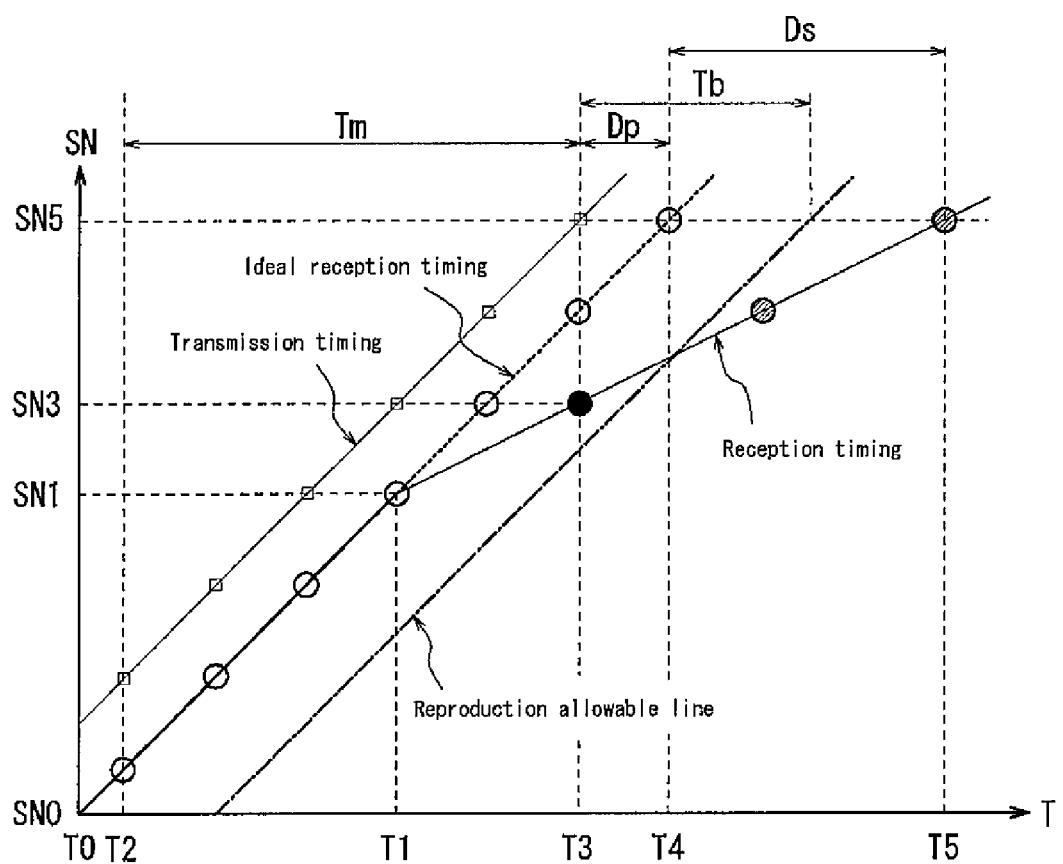
FIG. 17 is a view showing an example of detecting band-narrowing when the band allotment ratio is 25% according to a detection method based on a band allotment ratio.
Figure 18:
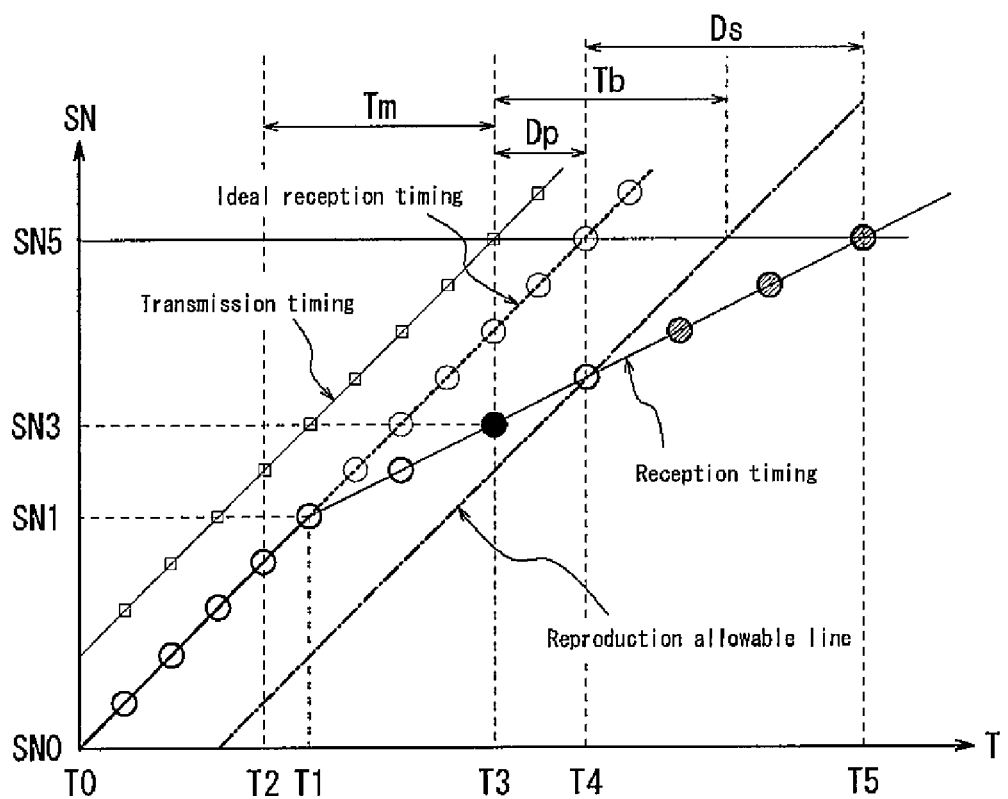
FIG. 18 is a view showing an example of detecting band-narrowing when the band allotment ratio is 50% according to the detection method based on a band allotment ratio.

FIG. 17 and FIG. 18 show examples of detecting band-narrowing according to the detection method based on an allotment ratio. As in FIGS. 15 and 16, these examples show cases of receiving VoIP packets transmitted at 20 ms interval. FIG. 17 shows a case where the band allotment ratio is 25% and FIG. 18 shows a case where the band allotment ratio is 50%. In FIGS. 17 and 18, Tm represents a monitoring period based on the band allotment ratio of the radio IP network. Other symbols are similar to those in FIGS. 15 and 16.

According to the detection method, the monitoring period Tm, which is inversely proportional to the band allotment ratio, is set as the transmission packet period corresponding to five packets according to the band allotment ratio; the degree of displacement γ of reception timing of an IP packet received within the monitoring period Tm is calculated according to the formula below; and on the basis of comparison of the degree of displacement γ thus calculated with the threshold value γth corresponding to the band allotment ratio determined with respect to the radio IP network, when γ≦γth, it is detected that the allowable band of the radio IP network has been narrowed. In the formula below, "s" represents the reception number allotted to a packet received within the monitoring period Tm, "mean" represents an averaging process, "SN" represents the sequence number of an IP packet, and "Trec" represents the reception time.

$$\gamma = \operatorname*{mean}_{s}\left(\frac{SN(s + \Delta s) - SN(s)}{Trec(s + \Delta s) - Trec(s)}\right)$$

With these definitions, Tm=400 ms in FIG. 17 where the band allotment ratio is 25%, while Tm=200 ms in FIG. 18 where the band allotment ratio is 50%. That is, the higher band distribution rate (the higher transmission rate) results in the shorter Tm. Accordingly, when an allowable band of a radio IP network having a relatively high band allotment ratio has been narrowed, the band-narrowing can be quickly detected, while band-narrowing of an allowable band in a radio IP network having a relatively low band allotment ratio can also be detected accurately.

For example, in FIGS. 17 and 18, it is assumed that the allowable band of the radio IP network is 50% narrowed from time T1 when packet SN1 is received. In this case, in the example of FIG. 17 where the band allotment ratio is 25%, at time T3 when the next packet SN3 (shown in a black circle) is received, i.e. after the monitoring period Tm (T2–T3), it is detected that the radio IP network has been band-narrowed. In this case, the accumulation delay in time Ds generated by the packets transmitted up to time T3 is 240 and thus the number of discarded packets exceeding the reproduction allowable line (the hashed circles in the graph) is only two packets.

In the example of FIG. 18 where the band allotment ratio is 50%, after packet SN1 is received at time T1, it is possible to detect that the radio IP network has been band-narrowed in the monitoring period Tm (T2–T3) up to time T3 when the second packet SN3 (shown in a black circle) is received. In this case, the accumulation delay in time Ds generated by the packets transmitted up to time T3 is 240 and thus the number of discarded packets exceeding the reproduction allowable line (the hashed circles in the graph) is only three packets.

As described above, by setting the monitoring period Tm, which is inversely proportional to the band allotment ratio, for each of the upstream and downstream directions of each radio IP network; calculating the degree of displacement γ of reception timing of an IP packet received within the monitoring period Tm; and detecting, when the degree of displacement γ thus calculated is no larger than the threshold value γth corresponding to the band allotment ratio of the radio IP network, that the allowable band of the radio IP network has been narrowed, it is possible to detect in substantially real-time variation in an allowable band due to changes in the propagation environment such as fading, as in the aforementioned detection method based on an allowable range.

When band-narrowing of the allowable band is detected by the packet reception monitoring unit 207, an upstream transmission band limit Msg for limiting the transmission band in the band-narrowed radio IP network is outputted to the transmission path selection unit 215 and the information of the band-narrowed radio IP network is notified to the allowable band analyzing unit 209.

(Method of Analyzing a Predicted Allowable Band)

Next, a method of analyzing a predicted allowable band on the switching server 200 side and the MN400 side will be described with reference to FIG. 12. Since the method of analyzing a predicted allowable band is similar on the switching server 200 side and the MN400 side, respectively, the method of analyzing a predicted allowable upstream band of the radio IP network 10A carried out on the switching server 200 side will be representatively described.

A predicted allowable band of a radio IP network is analyzed, based on comparison of reception timing of a packet transmitted at timing other than a predetermined timing with an allowable range as the aforementioned allowable reception timing range corresponding to the radio IP network. Accordingly, in a case in which band-narrowing of an allowable band is to be detected on the basis of a band allotment ratio in the packet reception monitoring unit 207, it is necessary to calculate the allowable range as described above in the allowable band analyzing unit 209 or the packet reception monitoring unit 207.

In the switching server 200, a predict allowable band is analyzed in a manner similar to the method of analyzing an allowable band in the second embodiment. Accordingly, the packet transmission path control unit 413 of MN400 controls the transmission path selection unit 415 such that the packets which the application process unit 405 has outputted are transmitted to plural radio IP networks at timing other than the predetermined timing based on the transmission band, by changing intervals of the sequence numbers of transmission packets to be allotted and without changing the number of packets allotted to the plural radio IP networks.

For example, as shown in FIG. 12, there are executed: the normal transmission mode for transmitting packets at equal intervals based on the transmission band; and the test-implementing transmission mode for changing the intervals between the sequence numbers of packets to be transmitted (i.e. shifting the sequence numbers of packets to be transmitted between plural radio IP networks, prior to transmitting the packets) without changing the overall number of transmitted packets.

In this test-implementing transmission mode, as shown in FIG. 12, when the reception timing on the reception side of the transmitted packet Ps26 is within the allowable range (period[T26a, T26b]) as shown by the received packet Pr26a, this means that the predicted allowable band of the path A may have a band which is 10/6 of the transmission band at present. In contrast, when the reception timing on the reception side of the transmitted packet Ps26 is not within the allowable range as shown by the received packet Pr26b, this means that the allowable band of the path A does not have a band which is 10/6 of the transmission band at present.

Similarly, when the reception timing on the reception side of the transmitted packet Ps44 is within the allowable range (period[T44a, T44b]) as shown by the received packet Pr44a, this means that the predicted allowable band of the path A may have a band which is 10/4 of the transmission band at present. Further, when the reception timing on the reception side of the transmitted packet Ps62 is within the allowable range (period[T62a, T62b]) as shown by the received packet Pr62a, this means that the predicted allowable band of the path A may have a band which is 10/2 of the transmission band at present.

In contrast, when the predicted allowable band coincides with the transmission band, the reception timing of the transmitted packet Ps26 is within the allowable range ([T26e (T30a), T30b]) of the received packet Pr30 with respect to the transmitted packet Ps30 in the normal transmission mode, as shown by the received packet Pr26b, and the reception timing of the transmitted packet Ps44 is within the allowable range ([T44c(T50a), T50b]) of the received packet Pr50 with respect to the transmitted packet Ps50 in the normal transmission mode, as shown by the received packet Pr44b, and the reception timing of the transmitted packet Ps62 is within the allowable range ([T62c(T70a), T70b]) of the received packet Pr70 with respect to the transmitted packet Ps70 in the normal transmission mode, as shown by the received packet Pr62b.

Accordingly, it is possible to analyze on the switching server 200 side the predicted allowable band in the upstream direction of the path A, by repeatedly testing packet shift at different timing prior to transmitting packets in MN400. The predicted allowable bands in the upstream direction of other paths can also be analyzed in a similar manner. Further, regarding the predicted allowable band in the downstream direction of each path, it is possible to analyze on the MN400 side the predicted allowable band in the corresponding path by repeatedly testing packet shift at different timing prior to transmitting packets in the switching server 200.

When the sequence number of a packet to be transmitted is shifted in the test-implementing transmission mode, shifting is set such that the reception timing at the sequence number after being shifted does not exceed at least the assumed reproduction timing at the sequence number before being shifted, whereby a process for limiting increase in band is added. By this setting, for example, in FIG. 12, in a case in which the predicted allowable band of the path A coincides with the transmission band, the reception timing of the transmitted packet Ps62 is within the allowable range ([T62c(T70a), T70b]) of the received packet Pr70 with respect to the transmitted packet Ps70 in the normal transmission mode, as described above. In this example, the received packet Pr62b is significantly delayed with respect to the received packet Pr62a within the allowable range. However, in terms of the application being executed for communication, the reception timing of the received packet Pr62b is within the assumed reproduction timing T62d and does not affect reproduction of the application.

Further, it is preferable that the normal transmission mode and the test-implementing transmission mode are alternately executed in an appropriate cycle. By doing this, if the predicted allowable band coincides with the transmission band, the consequence is simply the packet of which sequence number has been shifted being received at the reception timing which the packet would have if the sequence number thereof had not been shifted, whereby the packet does not affect the next packet by causing accumulation of packets on the path.

The process of analyzing a predicted allowable band on the switching server 200 side is carried out by implementing the aforementioned test-implementing transmission mode with respect to the required path(s), synchronous with MN400 receiving from the switching server 200 a transmission band limit Msg based on band-narrowing detection. Alternatively, it is acceptable that the process is carried out by: transmitting packets appropriately in the aforementioned test-implementing transmission mode from MN400, regardless of reception of a transmission band limit Msg from the switching server 200; analyzing a predicted allowable band of each path in the switching server 200 and storing the result in a memory (not shown) with renewal; and, when a band-narrowed path is detected by the packet reception monitoring unit 207, reading out a predicted allowable band of the path(s) other than the band-narrowed path.

(Operation of Communication System)

Next, an operation of a process for addressing band-narrowing by the communication system 3 of the present embodiment will schematically be described with reference to a flow chart shown in FIG. 19. Since the process for addressing band-narrowing is substantially the same on the switching server 200 side and the MN400 side, the case where the process is carried out on the switching server 200 side will be representatively described below.

During a period in which complementary communication is carried out between Mn400 and the IP phone terminal 40 by way of the switching server 200 by simultaneously using plural wireless communication paths including the radio IP network 10A and the radio IP network 10B, a band state of each path is monitored in MN400 and the switching server 200 on the basis of packets received from each path.

In the present embodiment, complementary communication using plural wireless communication paths is started, for example, as described below. For example, when a session is established with respect to the switching server 200 from the MN400 side, as described in the first embodiment, prior to actual implementation of the application, a control message is transmitted from MN400 to the switching server 200 by way of every available radio IP network. To a control message transmitted to at least one of the available radio IP networks, e.g. a radio IP network which has been preset in accordance with the application, application information including allowable time (Tapr) of a jitter buffer, as variation absorbing time of a received packet in the application, is inserted.

Further, the switching server 200 receives the control message transmitted by MN400, memorizes the allowable time (Tapr) included in the application information, and calculates ideal reception timing and allowable limit timing of packet reception at each radio IP network on the basis of the received packets of the control message. Then, on the basis of the ideal reception timing and the allowable limit timing at each radio IP network thus calculated and the allowable time (Tapr), there are selected plural radio IP networks which are the most suitable for the application, in which networks variation request time, i.e. accumulation request time (Tjit)° flitter buffer in which no packet arriving from any radio IP network is discarded, does not exceed allowable time (Tapr). The switching server 200 transmits to MN400 information of the selected radio IP network and the allowable band (range), as a transmission path selection message (Msg). Accordingly, in the switch server 200 and MN400, the application is implemented with complementing the band requested by the application at a ratio, for example, in accordance with the allowable band, by simultaneously using the selected plural radio IP networks.

On the other hand, when a session is established from the switching server 200 side to MN400, similarly, prior to actual implementation of the application, a control message is transmitted from the switching server 200 to MN400 by way of every available radio IP network.

Allowable time (Tapr) for each application is stored in advance at MN400, so that allowable time (Tapr) corresponding to the application which is to be executed is read out when MN400 receives a control message transmitted by the switching server 200. Accordingly, in this case, it is not necessary that the application information of a control message transmitted from the switching server 200 includes allowable time (Tapr). Further, MN400 calculates, based on the packets of the control message received by way of each radio IP network, ideal reception timing and allowable limit timing of packet reception at each radio IP network and selects, based on the ideal reception timing and allowable limit timing at each radio IP network thus calculated and the allowable time (Tapr) thus read out, plural radio IP networks which are the most suitable for the application, in which networks accumulation request time (Tjit) of jitter buffer as variation request time does not exceed allowable time (Tapr). MN400 transmits to the switching server 200 the information of the selected radio IP networks and the allowable band, as a transmission path selection message (Msg). Accordingly, in the switch server 200 and MN400, the application is implemented with complementing the band requested by the application at a ratio, for example, in accordance with the allowable band, by simultaneously using the selected plural radio IP networks.

During the period in which complementary communication is carried out by simultaneously using plural wireless communication paths, when band-narrowing (accumulation) of path A is detected in the packet reception monitoring unit 207 of the switching server 200, the transmission path selection unit 215 is requested to transmit a transmission band limit Msg for urging MN400 to set the transmission band of path A, which has been judged that accumulation has occurred therein, at zero (Step S31). Further, synchronous with the request for transmission of this transmission band limit Msg, the allowable band analyzing unit 209 is requested to analyze a predicted allowable band for each path other than path A (Step S32).

Regarding the transmission band limit Msg for setting the transmission band of path A at zero, it is possible to suppress delay in transmission at the minimum by writing an identifier of the path of which transmission band should be made zero to packets being accumulated in a transmission buffer for transmission to MN400. For example, between MN400 and the switching server 200, when a packet has a specific port number, then the transmission band of the corresponding path is set at zero and all of the paths in use are used for transmission. Regarding the port number, port numbers to be associated between MN400 and the switching server 200 are exchanged when a path is newly connected, and these port numbers are registered in a path-port number table, respectively. These port numbers are set such that a port number of one path does not coincide with a port number of another path.

The allowable band analyzing unit 209, upon receiving the request from the packet reception monitoring unit 207 for analyzing a predicted allowable band, analyzes the predicted allowable band for each path other than path A according to a predetermined preference order. Specifically, the preference order is set such that, for example, when predicted allowable bands which have already been analyzed are stored in a memory, the increasable band range values, obtained by subtracting the respective transmission bands from the corresponding predicted allowable bands, are sorted in the descending order from the largest thereof being the first. When the predicted allowable bands have not been analyzed yet, the preference order is set such that delays in the allowable limit timing with respect to the packet transmission timing are sorted in the descending order from the largest thereof being the first.

In the analyzing process of a predicted allowable band described above, at first it is confirmed that the path N of which predicted allowable band is to be analyzed is not a band-narrowed path A (Step S33), and a predicted allowable band of the path N is analyzed (Step S34). In analyzing a predicted allowable band, the aforementioned process for limiting increase is added on the basis of the allowable band of the path. Further, when radio information such as RSSI can be obtained, the predicted allowable band is calculated in consideration of the radio information, as well. Accordingly, an attempt to precisely analyze the predicted allowable band so as not to cause a path collapse (accumulation) due to increase in the transmission band will inevitably increase the amount of calculation (calculation time).

When the predicted allowable band has been analyzed, the predicted allowable band thus analyzed is compared with the transmission band allotted to the path N (Step S35). In a case in which the predicted allowable band which has already been analyzed is stored in the memory, the predicted allowable band thus stored is read out to be compared with the transmission band.

As a result, when the predicted allowable band is equal to the transmission band, the band in the path N cannot be broadened to exceed the transmission band at present. Therefore, the operation proceeds to analysis of a predicted allowable band of the next path.

In contrast, when the predicted allowable band is different from the transmission band, the path N has not been band-narrowed and it is assumed that the predicted allowable band is broader than the transmission band. Accordingly, in this case, the transmission path selection unit 215 is requested to transmit a transmission band control Msg for urging MN400 to regard the transmission band of path N as the predicted allowable band (Step S36).

Further, the allowable band analyzing unit 209 determines whether or not the total transmission bands in all of the paths in use, including the increase in band ranges which has been made in Step 16, satisfy the application requested band (Step S37). If the application requested band is satisfied, the process for addressing band-narrowing is completed, while if not, the operation proceeds to analysis of a predicted allowable band of the next path.

A predicted allowable band is analyzed for every path in use other than the band-narrowed path A. Regarding a path which can be made a broadband, if the total transmission band does not satisfy the application requested band after being made a broadband, the allowable band of path A is analyzed (Step S38).

In analyzing the allowable band of path A, first of all, it is determined whether or not the accumulation in path A has been resolved. In this determination, a transmission band control Msg for slightly increasing the transmission band of path A is transmitted. Then, given that no band-narrowing has occurred in other paths, only the sequence numbers of packets via path A will fail to arrive or arrive with increased delay. Failure in arrival of a packet results in disappearance of the sequence number thereof. Accordingly, when any disappearance of the sequence number or failure in arrival of a packet is observed, it is judged that the accumulation in path A has not been resolved. In contrast, when all of the sequence numbers somehow arrive with increased delay, it is judged that disappearance of the sequence number has been overcome and thus the accumulation in path A has been resolved, whereby the predicted allowable band in path A is analyzed.

A predicted allowable band of path A can be regarded, for example, as the reception band at the time when accumulation has been resolved. Therefore, it is judged whether the predicted allowable band exceeds zero or not (Step S39), and if the predicted allowable band does not exceed zero, the process for addressing band-narrowing is completed. In contrast, if the predicted allowable band exceeds zero, the transmission path selection unit 215 is requested to transmit a transmission band control Msg for urging use of the predicted allowable band as the transmission band of path A (Step S40) and the process is completed. When the total of the transmission bands in all of the paths does not satisfy the application requested band, the packets corresponding thereto is discarded on the transmission side, without being transmitted.

Figure 19:
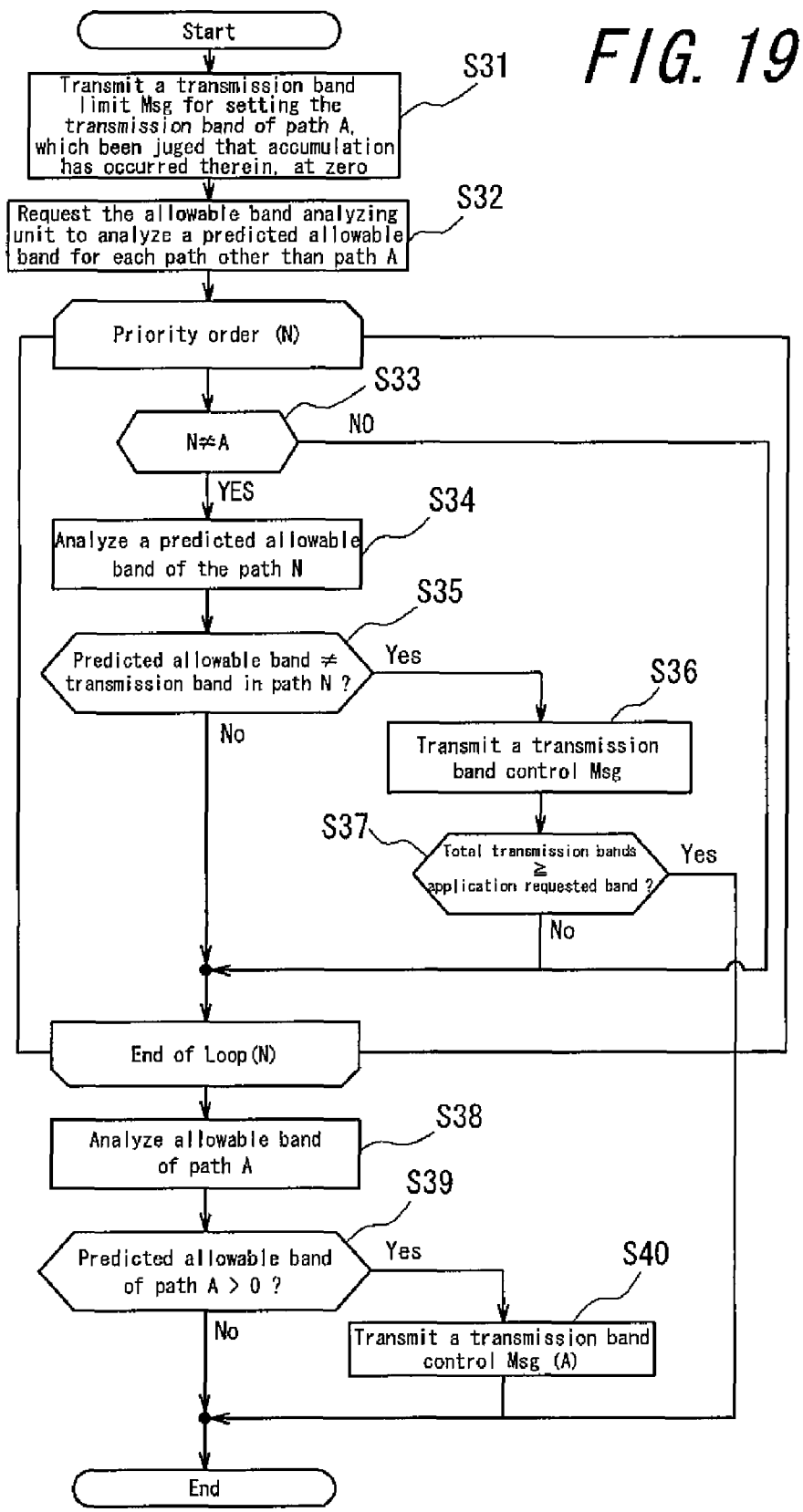
FIG. 19 is a flow chart for schematically explaining operations of a process addressing band narrowing by the communication system as shown in FIG. 13.
Figure 20:
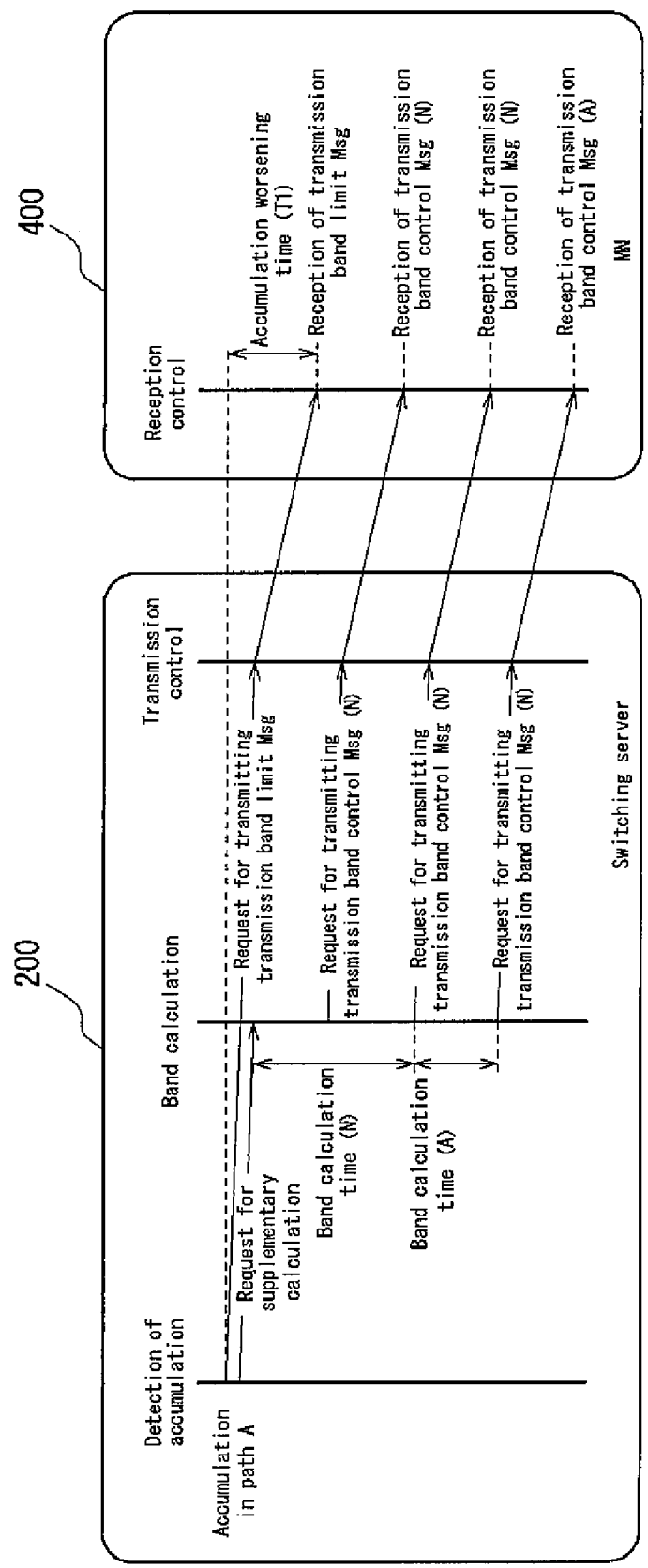
FIG. 20 is a sequence view showing operations corresponding to the flow chart shown in FIG. 19.

FIG. 20 is a sequence diagram showing an operation corresponding to the flow chart shown in FIG. 19. Since the process for addressing band-narrowing is substantially the same on the switching server 200 side and the MN400 side, the case where the process is carried out on the switching server 200 side will be representatively described below. In FIG. 20, detection of accumulation on the switching server 200 is carried out in the packet reception monitoring unit 207, the band calculation is carried out in the allowable band analyzing unit 209, and the transmission control is carried out in the transmission path selection unit 215. The reception control of MN400 is carried out in the packet reception monitoring unit 407.

As is obvious from FIG. 20, when the switching server 200 detects accumulation in path A by the packet reception monitoring unit 207, the switching server 200 sends to the transmission path selection unit 215 a request for transmitting a transmission band limit Msg, thus transmits to MN400 a transmission band limit Msg to urge MN400 to set the transmission band of path A at zero and makes a request for complementary calculation with respect to the allowable band analyzing unit 209 to carry out band-calculation. Accordingly, period T1, from the time when accumulation in path A is detected up to the time when a transmission band limit Msg resulted from the detection is received by MN400, is the accumulation worsening period during which packets continue to be fed to path A after detection of accumulation in path A.

Thereafter, a predicted allowable band for each path other than path A is calculated by the allowable band analyzing unit 209, and a transmission band control Msg in accordance with the calculation result is transmitted from the transmission path selection unit 215 to MN400. Further, in a case in which the application requested band is not satisfied, the allowable band of path A is calculated by the allowable band analyzing unit 209, whereby a transmission band control Msg in accordance with the calculation result is transmitted from the transmission path selection unit 215 to MN400.

Figure 21:
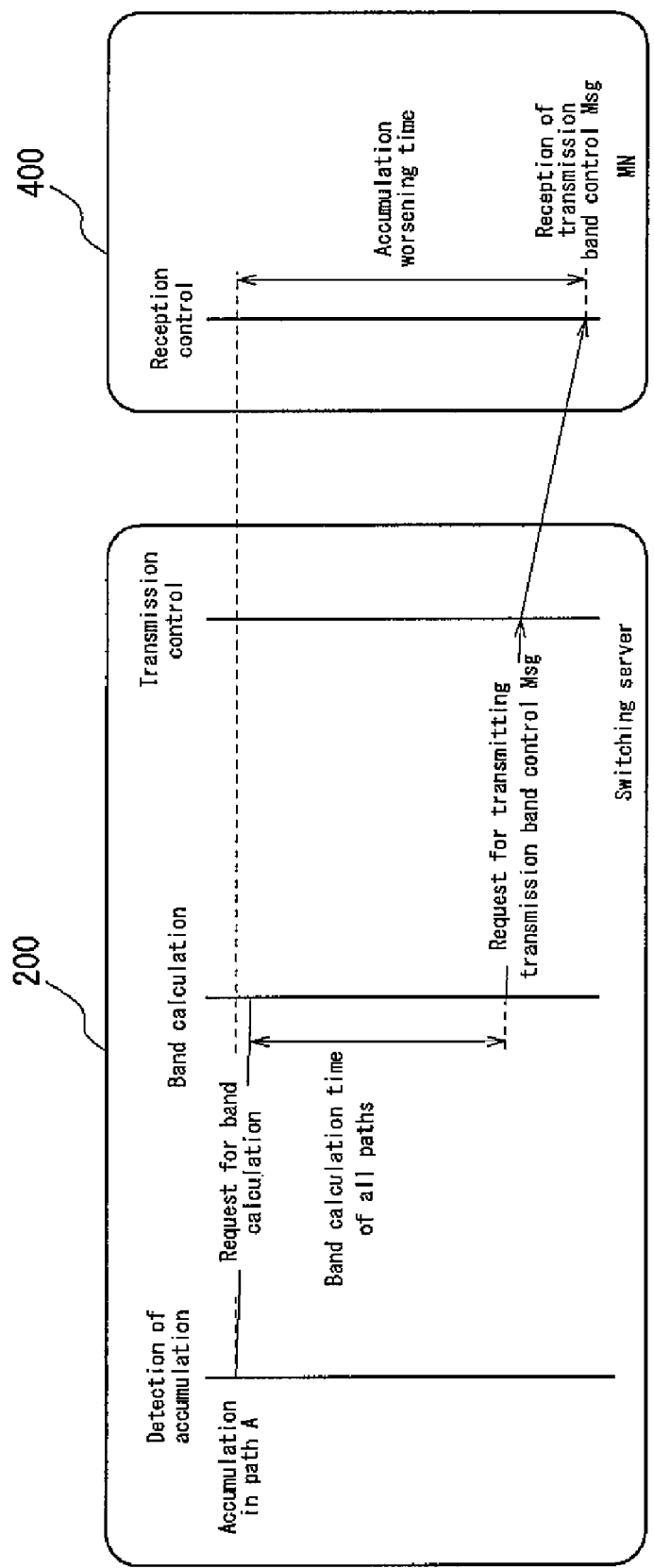
FIG. 21 is a sequence view of a process addressing band-narrowing, shown for comparison with the sequence view of FIG. 20.

FIG. 21 is a sequence diagram of the process for addressing band-narrowing, shown for comparison with the sequence diagram of the present embodiment shown in FIG. 21. FIG. 21 shows a case in which the transmission band is calculated for every available path in use after accumulation in path A is detected and then a transmission band control Msg in accordance with the calculation result is transmitted to MN400. Accordingly, in this case, period T0, from the time when accumulation in path A is detected up to the time when a transmission band control Msg resulted from the detection is received by MN400 and the transmission is controlled, is the accumulation worsening period.

The accumulation worsening period T1 in the present embodiment shown in FIG. 20 is compared with the accumulation worsening period T0 shown in FIG. 21. In FIG. 21, since the transmission band control Msg is not transmitted until the band-calculation of all paths in use is completed after detection of accumulation in path A, the accumulation worsening period T0 is relatively long. As a result, the accumulation in path A is not resolved but rather worsened, whereby delay in time is increased.

In contrast, in the present embodiment as shown in FIG. 20, a transmission band limit Msg for setting the transmission band of path A at zero is transmitted without waiting for the band-calculation of other paths after detection of accumulation in path A, whereby the accumulation worsening period T1 can be made shorter than the accumulation worsening period T0 in the case of FIG. 21. Accordingly, the accumulation in path A can be resolved quickly. Further, in the present embodiment, the predicted allowable band is analyzed sequentially for each path other than path A where accumulation has been detected and, regarding a path of which transmission band can be made a broadband, the path is made to be a broadband by the transmission band control Msg. As a result, accumulation can be resolved quickly and the total of the transmission bands can be made to coincide with the application requested band quickly, whereby the number of discarded packets due to band-narrowing of the path can be effectively reduced.

In the third embodiment, the transmission band of a path where band narrowing has been detected is limited to zero by a transmission band limit Msg. However, the transmission band of a path where band narrowing has been detected may be limited to any transmission band narrower than the transmission band allotted to the path, other than being limited to zero.

Fourth Embodiment (Overall Schematic Structure of Communication System)

Figure 22:
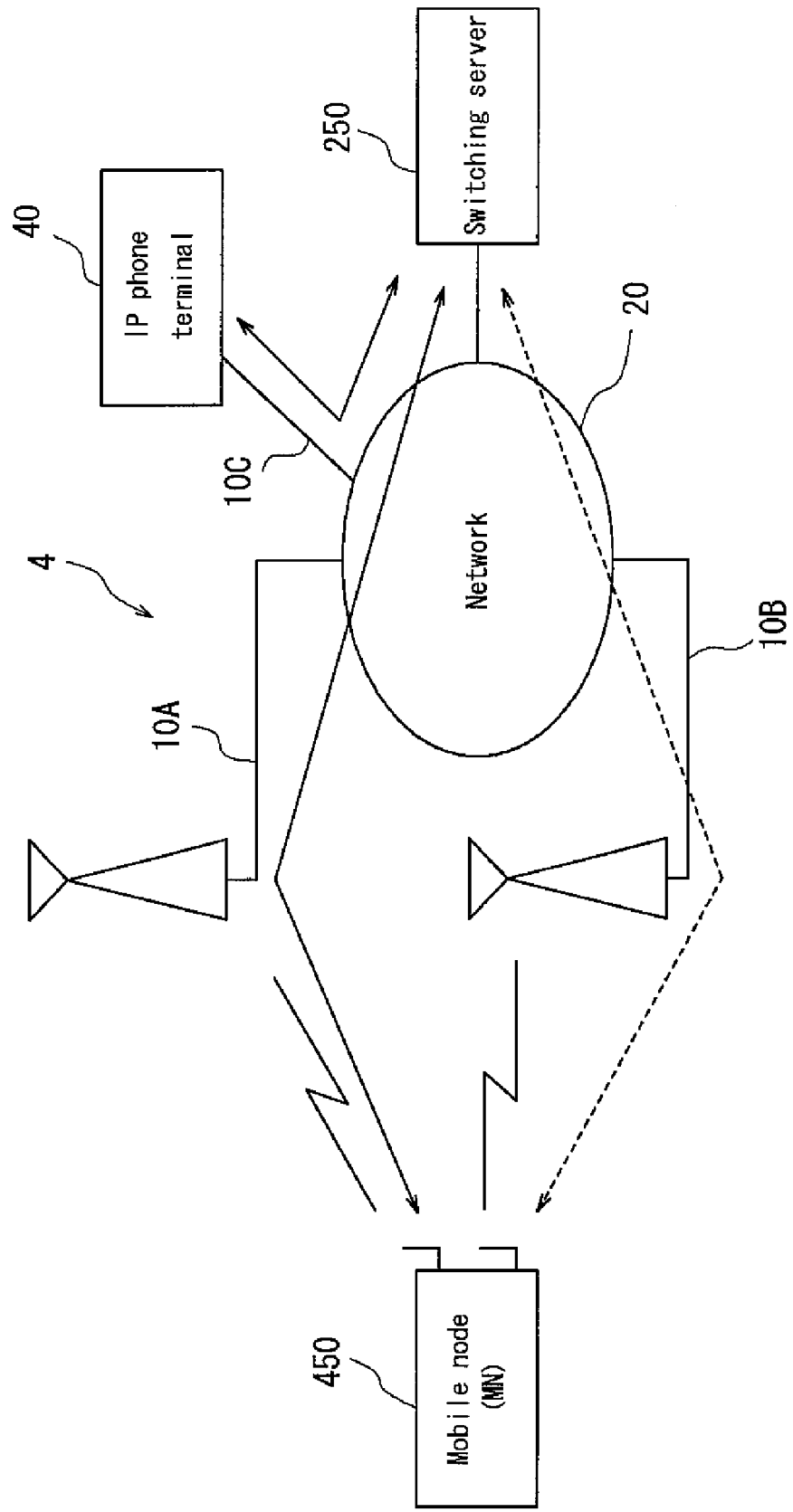
FIG. 22 is an overall schematic structural view of a communication system of yet another embodiment of the present invention.

FIG. 22 is an overall schematic structural view of a communication system 4 according to a fourth embodiment of the present invention. As shown in FIG. 22, the communication system 4 includes a radio IP network 10A and a radio IP network 10B as plural different wireless communication paths available to MN450 which is a wireless communication apparatus. The radio IP network 10A and the radio IP network 10B, which are similar to those of the foregoing embodiments, are connected to the network 20.

In FIG. 22, in order to simplify the drawing, two radio IP networks 10A and 10B are shown. However, different wireless communication paths where MN450 can be used are not restricted to these radio IP network 10A and radio IP network 10B and a larger number of radio IP networks may be used.

To the network 20, a switching server 250, constituting a communication control apparatus for controlling the wireless communication paths with respect to MN450, is connected.

The switching server 250, as in the foregoing embodiments, has VPN router function for implementing a routing process of an IP packet and ensures W mobility of MN450 by establishing a tunnel of VPN (IPSec) between MN450 and the switching server 250 to realize virtualization of OSI layer 3.

In the present embodiment, different from the case of mobile IP (for example, RFC2002), MN450 selects as in the second embodiment the radio IP network 10A as the master path and other radio IP network(s) 10B as the slave paths, for example, and simultaneously uses these plural radio IP networks, with complementing a band insufficient in the master path with respect to the request band of the application by the slave path(s), to implement communication with a communication counterpart (specifically, an IP phone terminal 40).

The switching server 250 is connected with the IP phone terminal 40 by way of a communication network 10C connected with the network 20, as in the foregoing embodiment, The IP phone terminal 40 converts phonetic signals and VoIP packets with each other and/or transmits/receives IP packets.

Specifically, the switching server 250 (communication apparatus) receives an IP packet (VoIP packet) which MN450 (wireless communication apparatus) has transmitted to the IP phone terminal 40 (the communication counterpart) by using the selected plural different radio IP networks, with complementing insufficient band by a predetermined cycle (20 ms). The switching server 250 relays the IP packet to the IP phone terminal 40. Further, the switching server 250 receives an IP packet (VoIP packet) which the IP phone terminal 40 has transmitted to MN450 in a predetermined cycle (20 ms) and relays the IP packet to MN450, with complementing (distributing) insufficient band by using the selected plural different radio IP networks.

In the present embodiment, in each of the switching server 250 and MN450, for each available wireless communication path, a transmission band limit value, as the maximum increase value when the transmission band is increased, is recorded in association with each transmission band in a transmission band increase limit table; and during a period in which communication is carried out by using, for example, the radio IP network 10A between MN450 and the IP phone terminal 40, the band state is analyzed in each of MN450 and the switching server 250 on the basis of received packets from the radio IP network 10A. As a result, when the transmission band is insufficient with respect to the application requested band, other radio IP networks which can complement the insufficient band are extracted on the basis of the transmission band increase limit table, and a transmission band control Msg (message) as transmission control information is transmitted to the corresponding party to urge complementary communication to be done by the other radio IP network thus extracted to an extent that the complemented band should not exceed the transmission band limit value, whereby the insufficient band range is complemented by other radio IP network.

Next, the functional block structure of the communication system 4 will be described. Specifically, the functional block structures of the switching server 250 and MN450 included in the communication system 4 will be described with reference to FIG. 23, and portions thereof which are relevant to the present embodiment will mainly be described below. Accordingly, it should be noted that the switching server 250 and MN450 may be provided with a logic block (power source portion) or the like, which is not either illustrated in the drawings or described below but essentially required to realize the functions of the apparatus.

(Switching Server 250)

Figure 23:
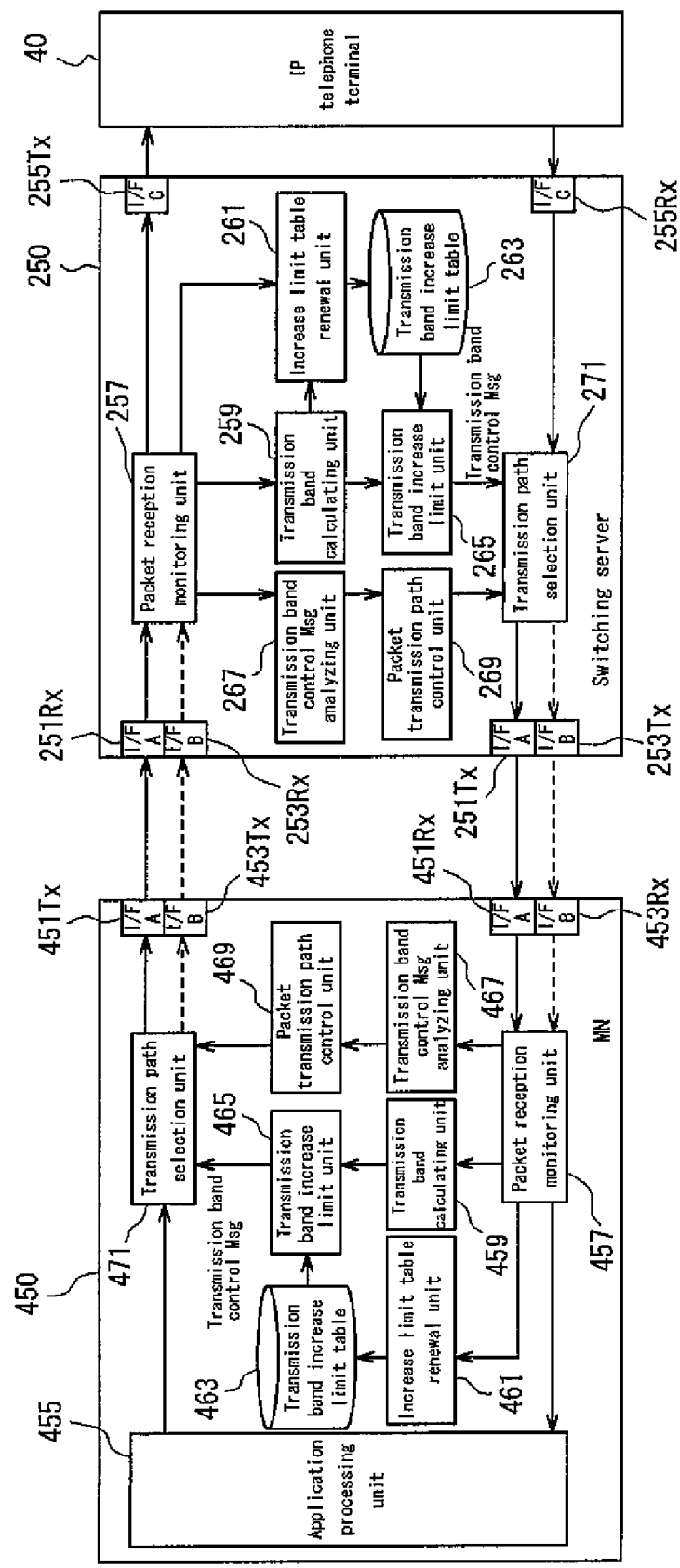
FIG. 23 is a functional block structural view of a switching server and MN as shown in FIG. 22.

As shown in FIG. 23, the switching server 250 includes reception interface unit (I/F A) 251Rx, reception interface unit (I/F B) 253Rx, reception interface unit (I/F C) 255Rx, transmission interface unit (I/F A) 251Tx, transmission interface unit (I/F B) 253Tx, transmission interface unit (I/F C) 255Tx, packet reception monitoring unit 257, transmission band calculating unit 259, increase limit table renewal unit 261, transmission band increase limit table 263, transmission band increase limit unit 265, transmission band control Msg analyzing unit 267, packet transmission path control unit 269, and transmission path selection unit 271.

The reception interface unit 251Rx and the transmission interface unit 251Tx structure a communication interface unit corresponding to the radio IP network 10A and is constituted of, for example, 1000BASE-T prescribed by IEEE802.3ab, being connected to the radio IP network 10A by way of the network 20.

Similarly, the reception interface unit 253Rx and the transmission interface unit 253Tx structure a communication interface unit corresponding to the radio IP network 10B and is constituted of, for example, 1000BASE-T prescribed by IEEE802.3ab, being connected to the radio IP network 10B by way of the network 20.

In the present embodiment, as in the foregoing embodiments, since VPN by IPSec is set, IP packets transmitted/received by the communication interface units respectively corresponding to the radio IP network 10A and the radio IP network 10B, specifically, the VoIP packets transmitted/received between the switching server 250 and MN450 (more specifically, VoIP packet transmitted by MN450) has a structure as shown in FIG. 3(a). That is, In the VoIP packet, home IP header (home IP address), TCP/UDP header and payload are encapsulated and Care of IP Address corresponding to the radio IP network is added.

An access control packet transmitted/received between the switching server 250 and MN450 has a structure as shown in FIG. 3(b). Specifically, the access control packet is constituted of data-link layer header, Care of IP Address, TCP header and a control code.

The reception interface unit 255Rx and the transmission interface unit 255Tx structure a communication interface unit corresponding to the communication network 10C and is connected to the network 20 to be used for implementing communication with the IP phone terminal 40.

The packet reception monitoring unit 257 has a jitter buffer for absorbing jitter of IP packets received by the reception interface unit 251Rx and the reception interface unit 253Rx and transmits the received IP packets to the IP phone terminal 40 by way of the transmission interface unit 255Tx. Further, the packet reception monitoring unit 257 supplies: the IP packet received by the reception interface unit 251Rx and the reception interface unit 253Rx to the transmission band calculating unit 259 and the increase limit table renewal unit 261; receives a downstream transmission band control Msg, described later, transmitted by MN450; and supplies the message to the transmission band control Msg analyzing unit 267. Accordingly, the packet reception monitoring unit 257, the reception interface unit 251Rx and the reception interface unit 253Rx constitute the reception unit.

The transmission band calculating unit 259 acquires the application requested band on the basis of packets received by the packet reception monitoring unit 257, calculates the transmission band for each path, and supplies the calculation result to the increase limit table renewal unit 261 and the transmission band increase limit unit 265. Accordingly, the transmission band calculating unit 259 constitutes the acquisition unit.

The increase limit table renewal unit 261 calculates the reception band on the basis of the received packets for each path received by the packet reception monitoring unit 257 and renews a transmission band increase limit table 263 on the basis of the reception band before the renewal and the reception band after the renewal thus calculated, as well as the transmission band before the renewal and the transmission band after the renewal calculated by the transmission band calculating unit 259.

The transmission band increase limit table 263 constitutes the recording unit and records, for each wireless communication path, a transmission band limit value for each transmission band section. In the transmission band increase limit table 263, for example, as shown in FIG. 24, there are recorded for each section based on the transmission band before renewal (Rprex, Rprex+1): a transmission band limit value (Rlmtx) as the maximum increase value at each section; and an identifier (Typex) for discerning whether the transmission band limit value is a value in the transmission band after being renewed (i.e. the transmission band when the transmission band is narrower than the allowable band) or a value in the reception band after being renewed (i.e. the reception band when the transmission band is broader than the allowable band). In the present embodiment, the transmission band section before renewal (Rprex, Rprex+1), is recorded, for example, like (Rpre0, Rpre1)=(0-38.4 kbps), (Rpre1, Rpre2)=(38.4-78.6 kbps). The transmission band limit value (Rlmtx) is recorded, for example, in a case in which Rlmtx can be increased to 60 kbps when (Rpre0, Rpre1)=(0-38.4 kbps), like Rlmt0=60 kbps.

When the application requested band calculated by the transmission band calculating unit 259 is larger than the transmission band at present, the transmission band increase limit unit 265 extracts other wireless communication path(s) which can complement insufficient band, on the basis of the transmission band increase limit table 263, generates an upstream transmission band control Msg for urging the insufficient band to be complemented by the extracted wireless communication path to an extent not exceeding the transmission band limit value, and transmits the message to MN450 by way of the transmission path selection unit 271. The upstream transmission band control Msg is transmitted by using the access control packet shown in FIG. 3(*b*). Accordingly, the transmission band increase limit unit 265 and the transmission path selection unit 271 constitute the transmission control unit.

On the other hand, the transmission band control Msg analyzing unit 267 analyzes a downstream transmission band control Msg from MN400 received by the packet reception monitoring unit 257 and supplies the analysis result to the packet transmission path control unit 269.

The packet transmission path control unit 269 controls, in the transmission path selection unit 271, the path and the transmission band of packets from the IP phone terminal 40 on the basis of the downstream transmission band control Msg analyzed by the transmission band control Msg analyzing unit 267 and transmits the packets to MN450.

In the structure of FIG. 23, the transmission path selection unit 271 allots the VoIP packets from the IP phone terminal 40 received by way of the reception interface unit 255Rx, to the transmission interface unit 251Tx and the transmission interface unit 253Tx in accordance with the transmission band, under the control of the packet transmission path control unit 269 and transmits the packets to MN450 by way of the radio IP network 10A and the radio IP network 10B. Further, the transmission path selection unit 271 transmits an upstream transmission band control Msg from the transmission band increase limit unit 265, from the transmission interface unit 251Tx or the transmission interface unit 253Tx to MN450 by way of the radio IP network 10A and the radio IP network 10B. The transmission path selection unit 271 has a jitter buffer for absorbing jitter of an IP packet received by the reception interface unit 255Rx.

Specifically, the transmission path selection unit 271 adds, to an IP packet including a home IP address received from the IP phone terminal 40, a Care of IP Address corresponding to the transmission path under the control of the packet transmission path control unit 269 and transmits the IP packet having a Care of IP Address added thereto from the corresponding transmission interface unit 251Tx or the transmission interface unit 253Tx to the radio IP network 10A or the radio IP network 10B in accordance with the transmission band.

The switching sever 250 of the present embodiment has, in addition to the aforementioned functions, as is the case with the switching servers of the foregoing embodiments, a function of checking the order of the IP packets transmitted/received between MN450 and the IP phone terminal 40 by way of the radio IP network 10A and the radio IP network 10B, by a using sequence number (SN) of RTP (real-time transport protocol) included in the VoIP packet. Further, the switching server 250 has a function of obtaining statistic information of the IP packet which is to be relayed (e.g. packet loss, throughput, under-run count and over-run count of the jitter buffer) and transmitting the obtained information to MN450.

Yet further, the switching server 250 has a function of correlating the home IP address included in the IP packet transmitted by the IP phone terminal 40, with the home IP address registered at a home agent (not shown) accessible by way of the network 20. Accordingly, it is analyzed which communication business provider has allotted the home IP address to MN450.

(MN450)

As in the switching server 250, the MN450 carries out communication by complementing a band insufficient in the radio IP network 10A with the radio IP network 10B.

As shown in FIG. 23, MN450 includes reception interface unit (I/F A) 451Rx, reception interface unit (I/F B) 453Rx, transmission interface unit (I/F A) 451Tx, transmission interface unit (I/F B) 453Tx, application processing unit 455, packet reception monitoring unit 457, transmission band calculating unit 459, increase limit table renewal unit 461, transmission band increase limit table 463, transmission band increase limit unit 465, transmission band control Msg analyzing unit 467, the packet transmission path control unit 469, and transmission path selection unit 471.

The reception interface unit 451Rx and the transmission interface unit 451Tx carry out wireless communication according to a wireless communication method (HRPD as a standard of 3GPP2) used in the radio IP network 10A. In the present embodiment, IP packets (VoIP packets) are transmitted/received at a predetermined cycle (e.g. 20 ms) between MN450 and the IP phone terminal 40 by way of the radio IP network 10A. The reception interface unit 451Rx and the transmission interface unit 451Tx are installed within MN450 or structured as a wireless communication card.

The reception interface unit 453Rx and the transmission interface unit 453Tx carry out wireless communication according to a wireless communication method (mobile WiMAX) used in the radio IP network 10B. The reception interface unit 453Rx and the transmission interface unit 453Tx are installed within MN450 or structured as a wireless communication card.

The reception interface unit 451Rx and the transmission interface unit 451Tx, as well as the reception interface unit 453Rx and the transmission interface unit 453Tx, transmit/receive an IP packet, based on a Care of IP Address allotted to MN450 in each of the radio IP network 10A and the radio IP network 10B.

The packet reception monitoring unit 457 has a jitter buffer for absorbing jitter of an IP packet received by the reception interface unit 451Rx and the reception interface unit 453Rx and supplies the received IP packet to the application process control unit 455. Further, the packet reception monitoring unit 457 supplies the FP packet received by the reception interface unit 451Rx and the reception interface unit 453Rx to the transmission band calculating unit 459 and the increase limit table renewal unit 461, receives the upstream transmission band control Msg transmitted by the switching server 250 described above and supplies the message to the transmission band control Msg analyzing unit 467. Accordingly, the packet reception monitoring unit 457, the reception interface unit 451Rx and the reception interface unit 453Rx constitute the reception unit.

The application processing unit 455 processes the IP packet received from the packet reception monitoring unit 457 in accordance with the application, generates an IP packet (a VoIP packet, for example) according to the application and transmits the IP packet thus generated to the transmission path selection unit 471. The application processing unit 455 memorizes the home IP address of MN450 corresponding to the Care of IP Address at each of the radio IP network 10A and the radio IP network 10B.

The transmission band calculating unit 459 acquires the application requested band from the application, calculates the transmission band for each path, and supplies the calculation result to the increase limit table renewal unit 461 and the transmission band increase limit unit 465. Accordingly, the transmission band calculating unit 459 constitutes the acquisition unit.

The increase limit table renewal unit 461, as is the case with the increase limit table renewal unit 261 of the switching server 250, calculates the reception band on the basis of the received packets for each path received by the packet reception monitoring unit 457 and renews a transmission band increase limit table 463 on the basis of the reception band before the renewal and the reception band after the renewal thus calculated, as well as the transmission band before the renewal and the transmission band after the renewal calculated by the transmission band calculating unit 459.

The transmission band increase limit table 463 constitutes the recording unit and records, as in the transmission band increase limit table 263 of the switching server 250 shown in FIG. 24, a transmission band limit value for each transmission band section for each wireless communication path.

As in the transmission band increase limit unit 265 of the switching server 250, when the application requested reception band calculated (acquired) by the transmission band calculating unit 459 is larger than the current transmission band of the switching server 250, the transmission band increase limit unit 465 extracts other wireless communication path(s) which can complement insufficient band, on the basis of the transmission band increase limit table 463, generates a downstream transmission band control Msg for urging the insufficient band to be complemented by the extracted wireless communication path to an extent not exceeding the transmission band limit value, and transmits the downstream transmission band control Msg thus generated to the switching server 250 by way of the transmission path selection unit 471. The downstream transmission band control Msg, as is the case with the upstream transmission band control Msg, is transmitted by using the access control packet shown in FIG. 3(b). Accordingly, the transmission band increase limit unit 465 and the transmission path selection unit 471 constitute the transmission control unit.

On the other hand, the transmission band control Msg analyzing unit 467 analyzes the upstream transmission band control Msg from the switching server 250 received by the packet reception monitoring unit 457 and supplies the analysis result to the packet transmission path control unit 469.

The packet transmission path control unit 469 controls, in the transmission path selection unit 471, the path and the transmission band of packets from the application processing unit 455 on the basis of the upstream transmission band control Msg analyzed by the transmission band control Msg analyzing unit 467 and transmits the packets to the switching server 250.

Specifically, in the structure of FIG. 23, the transmission path selection unit 471 allots packets outputted from the application processing unit 455, to the transmission interface unit 451Tx and the transmission interface unit 453Tx in accordance with the transmission band, under the control of the packet transmission path control unit 469 and transmits the packets to the switching server 250 by way of the radio IP network 10A and the radio IP network 10B. Further, the transmission path selection unit 471 transmits a downstream transmission band control Msg from the transmission band increase limit unit 465, from the transmission interface unit 451Tx or the transmission interface unit 453Tx to the switching server 250 by way of the radio IP network 10A and the radio IP network 10B.

Specifically, the transmission path selection unit 471 adds, to an IP packet including a home IP address received from the application processing unit 455, a Care of IP Address corresponding to the transmission path under the control of the packet transmission path control unit 469 and transmits the IP packet having a Care of IP Address added thereto, from the transmission interface unit 451Tx or the transmission interface unit 453Tx corresponding in accordance with the transmission band, to the radio IP network 10A or the radio IP network 10B.

The MN 450 of the present embodiment, as is the case with the switching sever 250, has a function of checking the order of the IP packets transmitted/received between MN450 and the IP phone terminal 40 by using sequence number (SN) of RTP included in the VoIP packet.

In the present embodiment, in the switching server 250, when the transmission band (upstream) from MN450 is insufficient with respect to the application requested transmission band, other wireless communication path(s), which can complement the insufficient band, is extracted on the basis of the transmission band increase limit table 263 for recording a transmission band limit value for each transmission band section of each wireless communication path, an upstream transmission band control Msg for urging the insufficient band to be complemented by the extracted wireless communication path to an extent not exceeding the transmission band limit value is generated, and the upstream transmission band control Msg thus generated is transmitted to MN450.

Accordingly, in MN450, the paths of the packets transmitted from the application processing unit 455 by the transmission path selection unit 471 is controlled on the basis of the upstream transmission band control Msg received from the switching server 250 such that the insufficient band is complemented by other wireless communication path(s), prior to sending the packets to the switching server 250.

Similarly, in MN450, when the transmission band (downstream) from the switching server 250 is insufficient with respect to the application requested reception band, other wireless communication path(s), which can complement the insufficient band, is extracted on the basis of the transmission band increase limit table 463, a downstream transmission band control Msg for urging the insufficient band to be complemented by the extracted wireless communication path to an extent not exceeding the transmission band limit value is generated, and the downstream transmission band control Msg thus generated is transmitted to the switching server 250.

Accordingly, in the switching server 250, the paths of the packets transmitted from the IP phone terminal 40 by the transmission path selection unit 271 is controlled on the basis of the downstream transmission band control Msg received from MN450 such that the insufficient band is complemented by other wireless communication path(s), prior to sending the packets to MN450.

Next, a renewal process at the transmission band increase limit table and a transmission band increase limit process at the time of complementing an insufficient band will be described.

(The Transmission Band Increase Limit Table Renewal Process)

Figure 25:
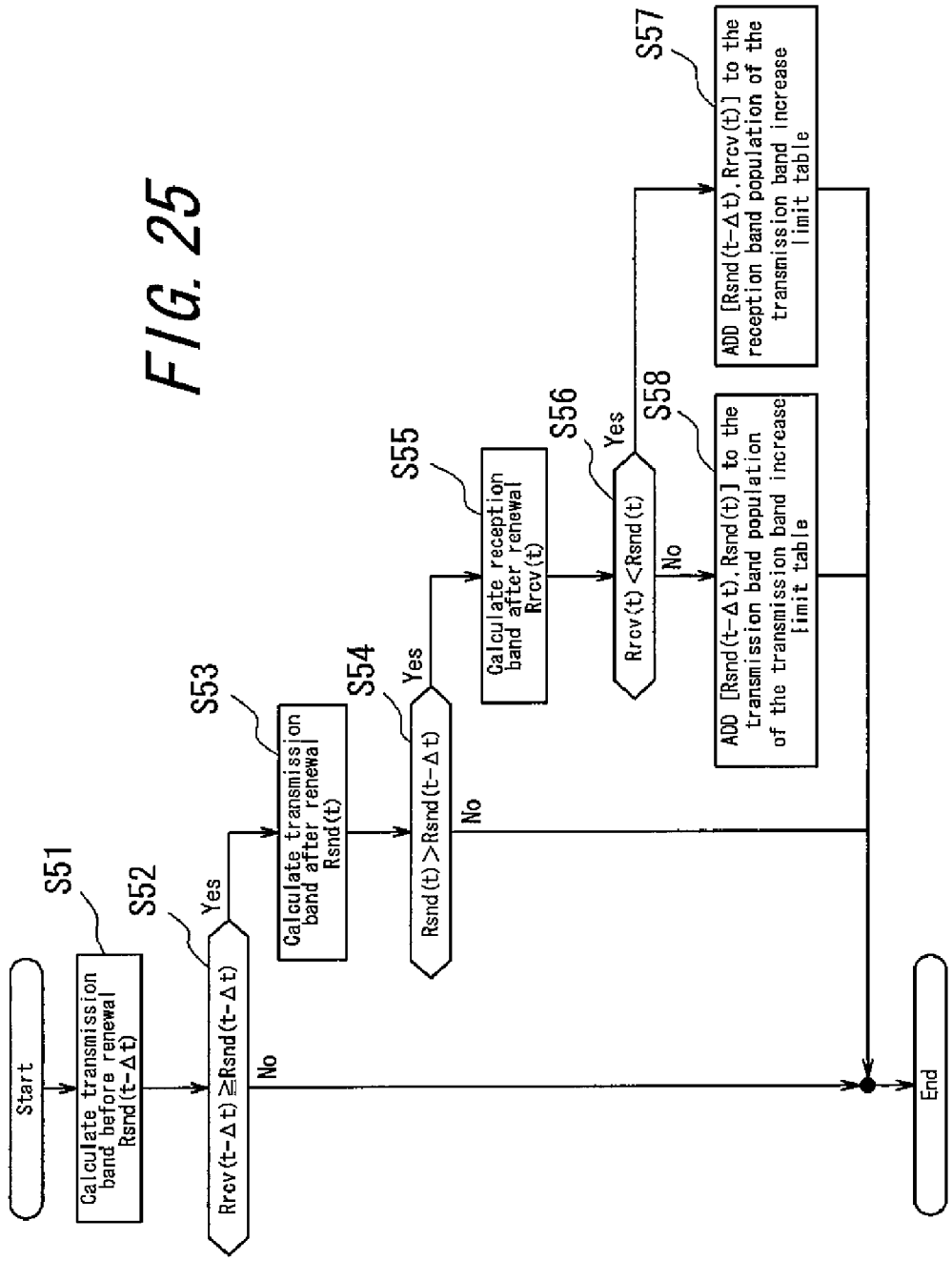
FIG. 25 is a flow chart for explaining a renewal process of the transmission band increase limit table.

FIG. 25 is a flow chart for explaining a renewal process at the transmission band increase limit table. Since the renewal processes of the transmission band increase limit table are similar on the switching server 250 side and the MN450 side, the renewal process by the increase limit table renewal unit 261 of the switching server 250 will be representatively described below.

The transmission band increase limit table 263, which is used as a database, is renewed in an appropriate manner during use thereof for each wireless communication path. Therefore, first, during communication, a transmission band Rsnd (t–Δt) before renewal (t–Δt) is calculated the at transmission band calculating unit 259 on the basis of a received packet received by the packet reception monitoring unit 257 (Step S51), and the transmission band Rsnd (t–Δt) thus calculated is compared with the reception band Rrcv (t–Δt) before renewal calculated by the increase limit table renewal unit 261 (Step S52).

When the transmission band Rsnd (t–Δt) exceeds the reception band Rrcv (t–Δt), since it is not possible to acquire a band which is equal to or beyond the reception band Rrcv (t–Δt), the process is completed without renewing the transmission band increase limit table 263. In contrast, when the reception band Rrcv (t–Δt) is equal to or exceeds the transmission band Rsnd (t–Δt), i.e. when the displacement of SN is the same as the displacement of SN according to the application or within the allowable range in a T–SN curve showing displacement of SN of received packets with respect to time (T), the transmission band limit value may be renewed. Accordingly, in this case, as the next step, a transmission band control Msg for renewing the transmission band is transmitted to the corresponding party side (the MN450 side) and the transmission band after renewal (i.e. the transmission band at present) Rsnd(t) is calculated in the transmission band calculating unit 259 (Step S53), whereby the transmission band after renewal Rsnd(t) is compared with the transmission band prior to renewal Rsnd (t–Δt) (Step S54).

Then, if the transmission band after renewal Rsnd (t) is equal to or below the transmission band prior to renewal Rsnd (t–Δt), since it is not possible to acquire a band which is equal to or beyond the transmission band prior to renewal Rsnd (t–Δt), the process is completed without renewing the transmission band increase limit table 263. In contrast, if the transmission band after renewal Rsnd (t) exceeds the transmission band prior to renewal Rsnd (t–Δt), the reception band at present (i.e. after renewal) Rrcv(t) is calculated in the increase limit table renewal unit 261 (S55), whereby the reception band at present Rrcv(t) is compared with the transmission band after renewal Rsnd(t) (Step S56).

Then, if the reception band after renewal Rrcv(t) is below the transmission band after renewal Rsnd (t), it is judged that the reception band at present Rrcv (t) is within the allowable range of the path and [(Rsnd (t–Δt), Rrcv(t))] is added as an element of the reception band population of the transmission band increase limit table 263 (Step 557).

If the reception band after renewal Rrcv (t) is equal to or beyond the transmission band after renewal Rsnd (t) (normally, Rrcv(t)=Rsnd(t)), it is judged that the wireless communication path has at least the current transmission band Rsnd(t) and [(Rsnd (t–Δt), Rsnd(t))] is added as an element of the transmission band population of the transmission band increase limit table 263 (Step S58).

Figure 26:
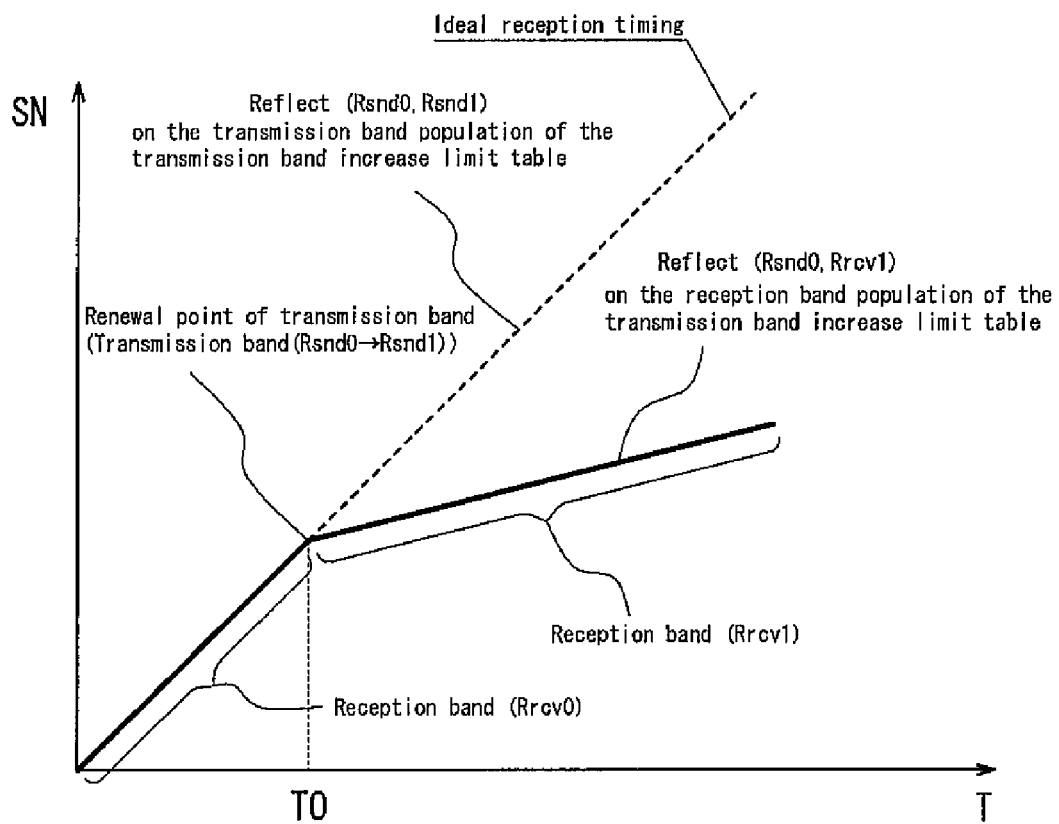
FIG. 26 is a T–SN graph of a path for explaining a specific example of a renewal process of the transmission band increase limit table.

FIG. 26 is a T–SN graph of a path for explaining a specific example of the renewal process of the transmission band increase limit table 263 described above. In FIG. 26, the X-axis represents time (T) and the Y-axis represents the sequence number (SN). Give that the transmission band is renewed from Rsnd0 to Rsnd1 at time T0 (Rsnd1>Rsnd0). If the transmission band exceeds the allowable band of the path at that time, the tangent of T–SN digresses from the tangent of the ideal reception timing according to the application (shown in the broken line) (the tangent of the ideal reception timing coincides with the tangent according to the application). (Rsnd0, Rrcv1) is reflected on the reception band population of the transmission band increase limit table, on the basis of the digression of the T–SN tangent. In contrast, if the T–SN tangent still remains on the ideal reception timing after renewal, (Rsnd0, Rsnd1) is reflected on the transmission band population of the transmission band increase limit table.

When the reception band population and the transmission band population of the transmission band increase limit table are obtained as described above, the maximum value of the reception band after renewal and the maximum value of the transmission band after renewal in a subset (Sn(k)) including the transmission band prior to renewal Rsndn(t) are acquired for the reception band population and the transmission band population, and the larger value thereof is set as the standard value of the limit value Rlmtstd.

The standard value Rlmtstd is acquired, for example, as below by setting a coefficient η (η=ηsnd, η=ηrcv).
Rsndn(t)∈Sn(k)
If max{Sn(k, type(snd))}>max{Sn(k, type(rcv))}
Rlmtstd=max{Sn(k, type(snd))}
η=ηsnd
else
Rlmtstd=max{Sn(k, type(rcv))}
η=ηrcv
end if Sn(k, type(snd)) represents the transmission band population and Sn(k, type(rcv)) represents the reception band population.

Thereafter, a value "rand" allocated from random numbers is added to the standard limit band value Rlmtstd, whereby the limit band value Rlmt is calculated. Specifically, by calculating:

$$Rlmt = Rlmtstd + \gamma(Rpair) \times \eta \times rand(\,),$$

the limit band value Rlmt is obtained. In the formula above, given that γ represents a coefficient and Rpair represents a path with respect to the transmission path of Rsnd (when Rsnd is an upstream transmission band, Rpair is a downstream transmission band), η represents a coefficient depending on the origin of the standard limit band value.

As described above, the limit band value Rlmt is obtained not only by using the maximum value of the population Sn including the transmission band Rsnd(t) but also using a random number component so as to get a value higher than the standard value Rlmtstd in order to avoid getting a too low band due to a coincidentally low value. The range of a value obtained from random numbers is decided by the coefficient γ depending on the direction opposite to the transmission direction of the transmission band Rsnd(t) on the path, i.e. the transmission band Rpair of itself (in this context, the switching server 250) and the coefficient η depending on the origin of the standard limit band value.

That is, when the communication in the opposite direction is in a poor state, it is not assumed that the transmission band is likely to be raised and thus the swinging range or width by random numbers is made relatively small. In contrast, when the communication in the opposite direction is in a good state, it can be assumed that "the propagation environment is in a good state" and the transmission band is likely to be raised, whereby the swinging range or width by random numbers is made relatively large so that a value higher than the standard limit band value Rlmtstd is more likely to be obtained.

Further, the coefficient $\eta$ ($\eta=\eta$snd, $\eta=\eta$rcv) is set such that $\eta$snd$\geq\eta$rcv. Specifically, when the standard limit band value Rlmtstd is obtained from the transmission band population, the allowable band of the path may be equal to or over the transmission band. The means that the transmission band has not reached the limit and thus the transmission band is likely to be raised. On the other hand, in the case of the reception band population, even at that instant, the reception band was within the allowable band. Therefore, in this case, although it is not clear whether or not the reception band can be raised further, at least it is assumed that the reception band is less likely to be raised than an element of the transmission band population is. Accordingly, the respective values of the coefficient $\eta$ is set in the relationship that $\eta$snd$\geq\eta$rcv.

The renewal process of the transmission band increase limit table 263 is constantly carried out, based on the renewal of the transmission band. Further, in order that the transmission band limit value in the transmission band increase limit table 263 is renewed, in accordance with the environment, in the population S as the base of the transmission band increase limit table 263, it is preferable that a registration valid period is set on each element of the population S and, when the registration valid period is expired, the corresponding element is discarded from the population S, so that a transmission band limit value is calculated by always using only new elements in terms of time.

Further, it is preferable to monitor variations in the transmission band Rpair in the opposite direction on the wireless communication path and, when the variations in the transmission band Rpair in a given period is within a threshold value and it is judged upon making an attempt to increase the transmission band Rsnd(t) that accumulation of packets in the path has occurred in view of the received packets, the transmission band prior to renewal Rsnd (t−$\Delta$t), the reception band by the received packet Rrcv (t) or the transmission band Rsnd (t) are added to the transmission band increase limit table 263, i.e. the table is renewed. By doing this, it is possible to further accurately limit an increase in the transmission band.

(Process for Limiting Increase in Transmission Band)

Figure 27:
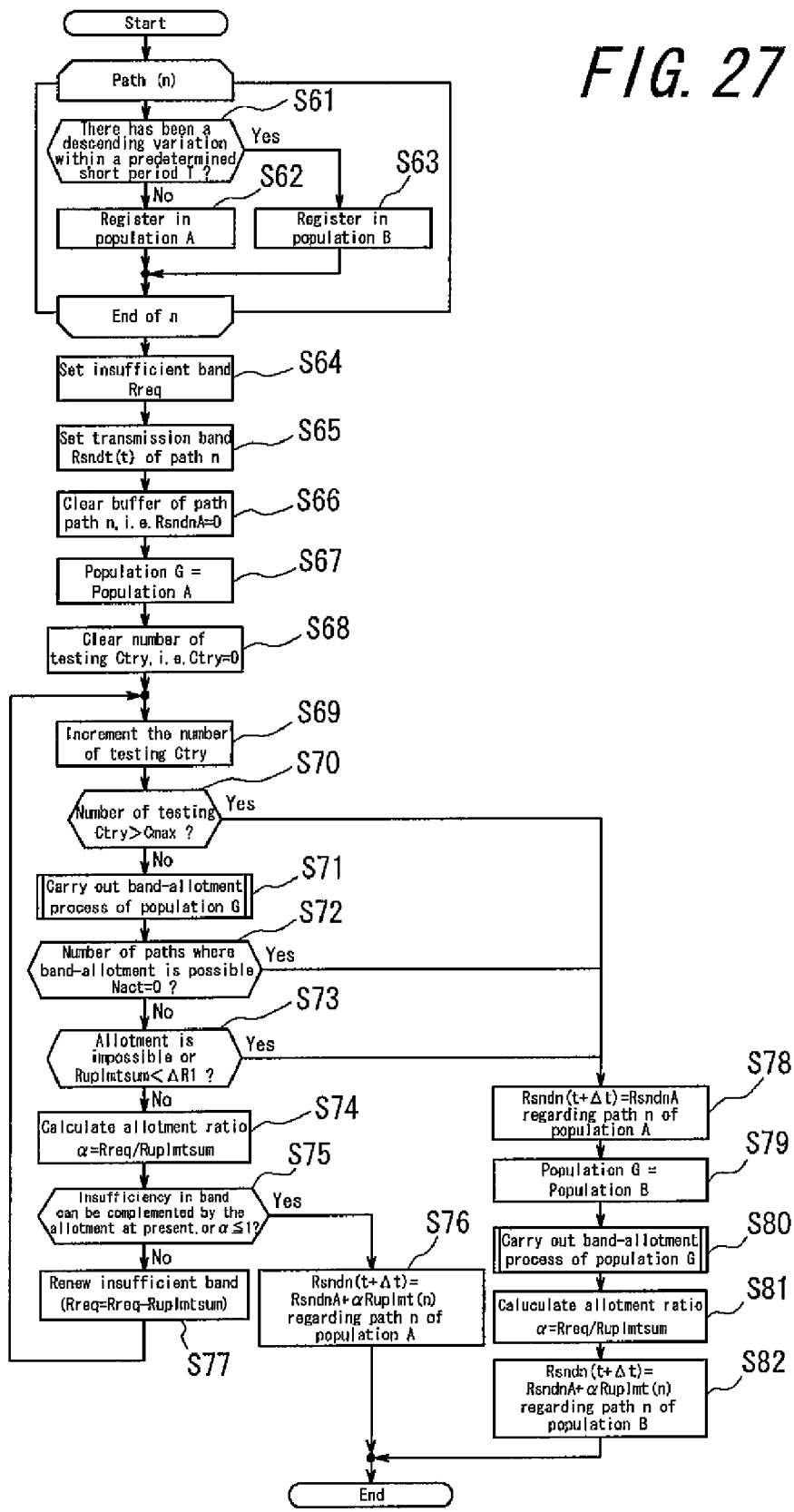
FIG. 27 is a flow chart for explaining a process for restricting transmission band increase by the communication system shown in FIG. 22.

FIG. 27 is a flow chart for explaining a process for liming increase in the transmission band in a slave path upon complementing an insufficient band in the master path by the slave path, during the communication on the master path. Since this process for liming increase in the transmission band is similar on the switching server 250 side and the MN450 side, the following descriptions can apply to both.

First, when there is an insufficient band in the master path, it is determined with respect to a slave path n, with reference to the transmission band increase limit table, whether or not there has been a descending variation in the transmission band within a predetermined short period T immediately before the determination (Step S61), and a path where there has not been such a descending variation is classified to the population A (Step S62), while a path where there has been such a descending variation is classified to the population B (Step S63). That is, it is judged that a path where there has been a descending variation within a short period T immediately before the present is likely to experience a descending variation (deterioration in the radio propagation environment) at present, as well. When the classification is completed for all of the slave paths, allotment of the insufficient band is first carried out for the paths belonging to the population A, which have not experienced variations. In a case in which the insufficient band cannot be complemented by only the population A, then the allotment is carried out for the population B.

Due to this, first of all, an insufficient band to be complemented Rreq is set (Step S64), the transmission band Rsndt(t) of the path n is set (Step S65), and the buffer RsndnA of the path n is cleared (Step S66) for initialization. Thereafter, the population G as the object of calculation is set in the population A (Step S67), the number of testing Ctry is cleared (Step S68), and band-allotment of the path population G is started.

In the band allotment of the path population G, the number of testing Ctry is incremented for each test (Step S69), and the number of testing Ctry is compared with the predetermined maximum number of testing Cmax (Step S70). If the number of testing Ctry does not exceed the maximum number of testing Cmax, the band-allotment process of the population G is carried out (Step S71), whereby the number Nact of paths where band-allotment is possible and the total value Ruplmtsum of the total increase limit are calculated.

Thereafter, it is determined whether the number of paths where band-allotment is possible Nact calculated by Step S71 exists or not (Step S72). When the number exists, then it is determined whether or not the total value Ruplmtsum of the bands newly allotted to the path by the allotment process is equal to or exceeds the predetermined limit value $\Delta$R1 (Step S73). In a case in which there has been allotment which is equal to or exceeds the limit value $\Delta$R1, the allotment ratio $\alpha$ ($\alpha$=insufficient band Rreq/the total value Ruplmtsum of the newly allotted bands) is calculated (Step S74).

Next, it is determined the allotment ratio $\alpha$ thus calculated is equal to 1 or below (Step S75). When $\alpha\leq1$, it is judged that the insufficiency in band can be complemented by the allotment at present, and the transmission band Rsndn(t+$\Delta$t) of each path which can complement an insufficient band, of the population A, is determined by the formula Rsndn(t+$\Delta$t) =RsndnA+$\alpha$Ruplmt(n) (Step S76), whereby the process is completed. In the formula above, RsndnA represents the transmission band before the allotment calculation in the path n, and Ruplmt(n) represents the increase limit band in the path n.

In contrast, when $\alpha$>1 in Step S75, it is judged that the insufficient band Rreq is larger than the total value Ruplmtsum of the newly allotted bands, that is, there has not been obtained a sufficient band. Therefore, the insufficient band is renewed at Step S77 (Rreq=Rreq−Ruplmtsum) and the process proceeds to Step S69, carrying out the band-allotment process again.

When the insufficient band Rreq cannot be complemented only by the paths belonging to the population A which have not experienced variations, that is: when the number of testing Ctry exceeds the maximum number of testing Cmax in Step S70; or when the number of path Nact which can effect band-allotment fails to be calculated in Step S72; or when, although a path which can effect band-allotment is detected, the total value Ruplmtsum of the newly allotted bands does not reach the limit value $\Delta$R1 in Step S73, then the band-allotment process is carried out with respect to the paths belonging to the population B.

First of all, the transmission band Rsndn(t+$\Delta$t) regarding the path n which does not contribute to band-allotment of the population A is set as the transmission band RsndnA prior to band-allotment (Step S78). Next, the population G as the object of calculation is set as the population B (Step S79), and the process for band-allotment of the path population G is carried out as in Step S71 (Step S80). Thereafter, the allotment ratio (a=Rreq/Ruplmtsum) is calculated (Step S81). When the allotment ratio $\alpha>1$, it is assumed that $\alpha=1$ and the transmission band Rsndn(t+$\Delta$t) of each path which can complement an insufficient band, of the population B, is determined by the formula Rsndn(t+$\Delta$t)=RsndnA+$\alpha$Ruplmt (n) (Step S82), whereby the process is completed.

(Band-Allotment Process of the Path Population G)

Figure 28:
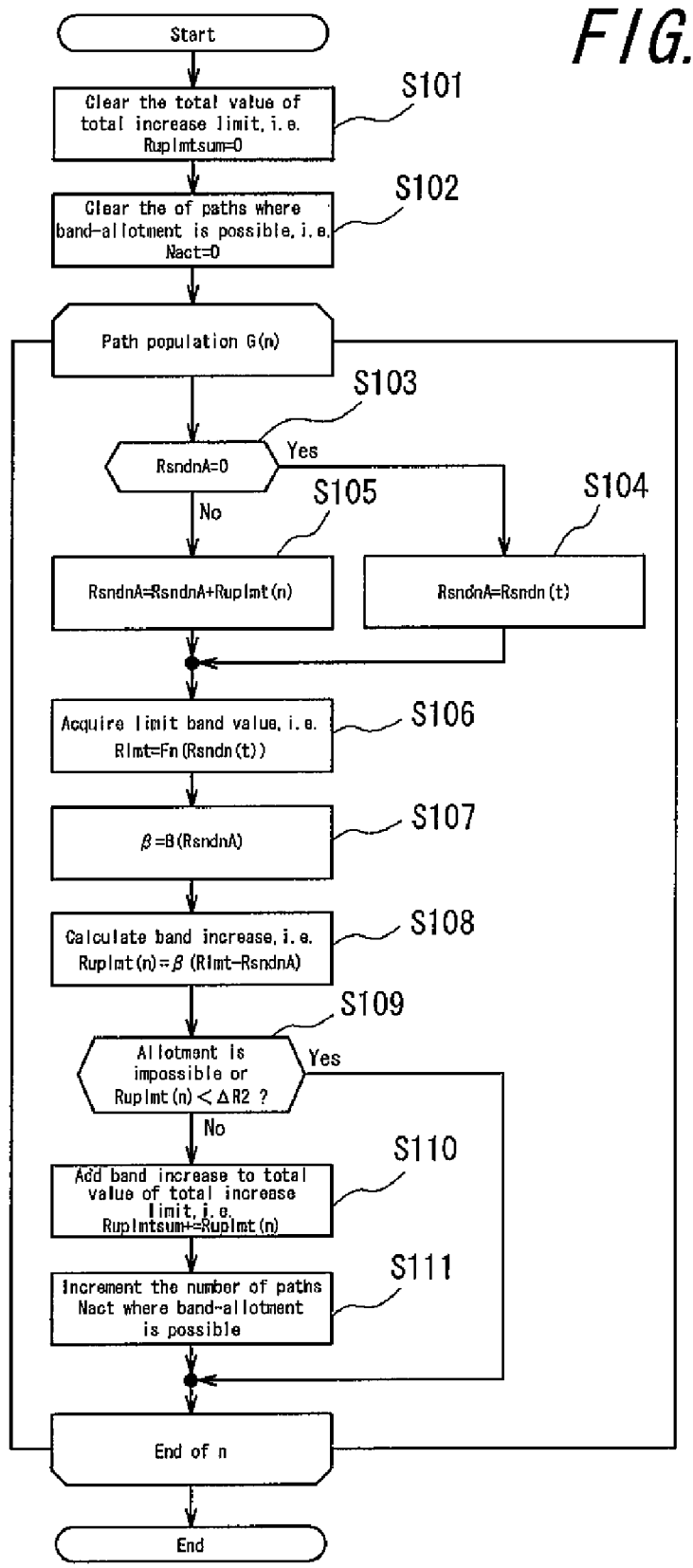
FIG. 28 is a flow chart for explaining a band distributing process of the path population G as shown in FIG. 27.

Next, the band-allotment process of the path population G, carried out in Step S21 and Step S30 in FIG. 27, will be described with reference to the flow chart shown in FIG. 28.

First, the total value Ruplmtsum of the bands which can be newly allotted is cleared (Step S101) and the number of paths Nact where band-allotment is possible is cleared (Step S102) for initialization. Next, it is determined for each path n of the population G whether the transmission band RsndnA prior to renewal (buffer) is zero or not (Step S103). When RsndnA is zero, it is judged that a calculation is to be started, thereby setting RsndnA=Rsndn(t) (Step S104). When RsndnA$\neq$zero, it is judged that a calculation is being continued, thereby setting RsndnA=RsndnA+Ruplmt(n) (Step S105). Ruplmt(n) represents an increased band of the path n calculated in the previous calculation.

Figure 29:
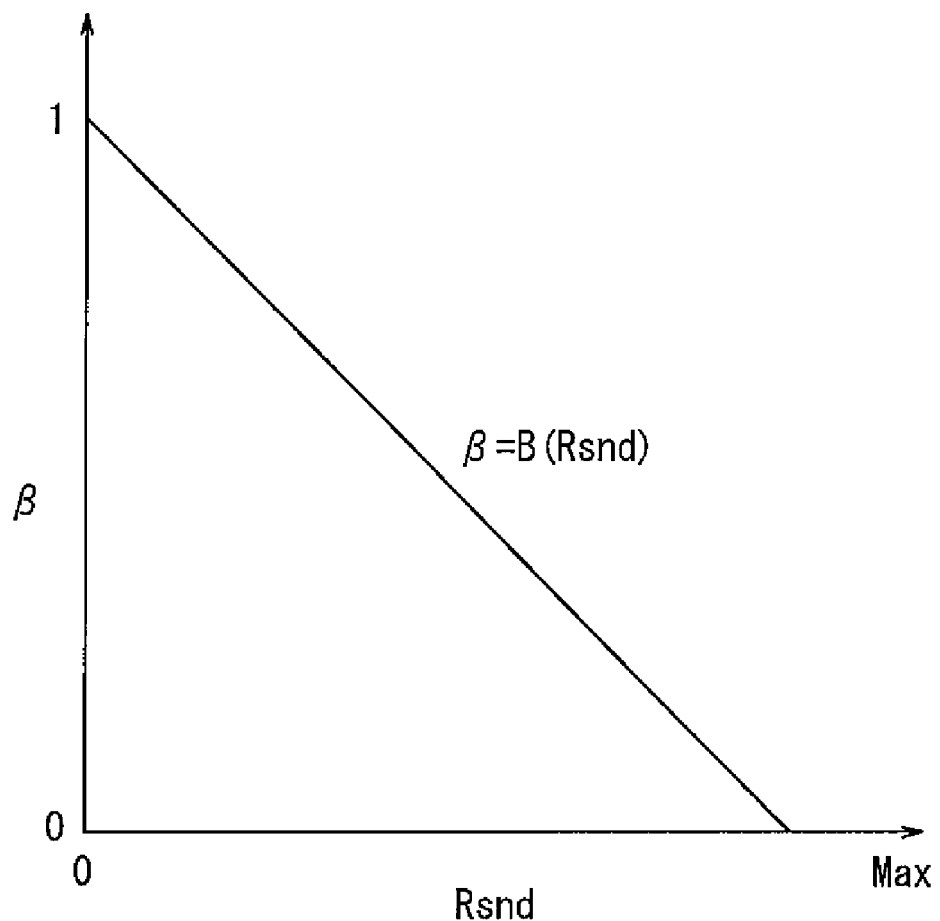
FIG. 29 is a view explaining an example of setting a coefficient β shown in FIG. 28.

Next, a limit band value Fn (Rsndn(t)) is acquired from the transmission band limit value Rlmt of the transmission band increase limit table corresponding to the path n (Step S106), and a coefficient $\beta$ ($\beta$=B(RsndnA)) is acquired on the basis of the transmission band RsndnA at present (Step S107). $\beta$ is, as shown in FIG. 29, a ratio which allots 100% of the transmission band limit value Rlmt obtained from the transmission band increase limit table when the value of RsndnA is zero, while 0% of the transmission band limit value Rlmt when the value of RsndnA is the application requested band. $\beta$ represents a ratio which can be allotted by one band-allotment.

Next, the band increase Ruplmt(n) which can be newly allotted with respect to the path n is calculated by $\beta$(Rlmt−RsndnA) (Step S108), and the band increase Ruplmt(n) thus calculated is compared with the predetermined limit value $\Delta$R2 (Step S109). Then, if the band increase Ruplmt(n) is less than the limit value $\Delta$R2, the process for the next path n follows. In contrast, if the band increase Ruplmt(n) is equal to or exceeds the limit value $\Delta$R2, the band increase Ruplmt(n) is added to the total value Ruplmtsum of the total increase limit (Step 5110) and the number of paths Nact where band-allotment is possible is incremented (Step S111).

By carrying out the aforementioned process for all of the paths n of the path population G, the number of paths Nact where band-allotment is possible and the total value Ruplmtsum of the newly allotted bands are obtained.

The coefficient $\beta$ in Step S107 is for attaining balance in band-allotment to paths. By setting the coefficient as shown in FIG. 29, it is possible, with respect to a path having relatively little band-allotment, to allot a band to the allotment limit of the path, while with respect to a path already having relatively large band-allotment to alleviate band-allotment thereto, thereby substantially equalizing the band-allotment to each path. As a result, it is possible to prevent in advance significantly large delay which is caused when a path where a lot of bands have been allotted is suddenly deteriorated.

In the present embodiment, in each of the switching server 250 and MN450, for each available wireless communication path, a transmission band limit value when the transmission band is increased is recorded in association with each transmission band in a transmission band increase limit table; and during a period in which communication is carried out by using, for example, the radio IP network 10A between MN450 and the IP phone terminal 40, when the transmission band is insufficient with respect to the application requested band, other radio IP networks which can complement the insufficient band are extracted on the basis of the transmission band increase limit table, and a transmission band control Msg is transmitted to the corresponding party to urge band-complementary communication to be done by the other radio IP network thus extracted to an extent that the complemented band should not exceed the transmission band limit value, it is possible to prevent the transmission band of the other radio IP network which complement the insufficient band from being set beyond the increase limit which does not exist in the propagation environment. Accordingly, it is possible to carry out communication with appropriately complementing insufficiency in the transmission band by using plural radio IP networks such that there is generated no packets which are discarded without being reproduced due to delayed arrival time.

In the fourth embodiment described above, insufficiency in transmission band is complemented in both upstream and downstream directions. However, the embodiment may be modified to allow the transmission band to be complemented only in the upstream direction or the downstream direction.

The invention claimed is:

1. A communication control apparatus, in which plural different IP wireless communication paths are selected between a wireless communication apparatus and itself, a insufficient band in one of the wireless communication paths is complemented by another wireless communication path with respect to a request band of an application having real time characteristic in use, such that communication between the wireless communication apparatus and a corresponding party is controlled, comprising:
   a calculation unit for calculating, on the basis of a packet received by way of each wireless communication path, ideal signal-reception timing, which is a relationship between a transmission time of packet and a sequence number obtained, wherein the transmission time of the received packet is less than that of the ideal signal-reception timing for the same sequence number, and allowable limit timing of the packet received at the wireless communication path;
   a memory unit for receiving and memorizing variation absorbing time, which is an allowable time for a buffer storing received packets, in the received packet in the application transmitted from the wireless communication apparatus; and
   a selection unit for selecting the plural different wireless communication paths such that variation request time, which is an accumulation time of the buffer in which no packet arriving from any wireless communication path is discarded, obtained on the basis of the ideal signal-reception timing and the allowable limit timing at the wireless communication path calculated by calculation unit, does not exceed the variation absorbing time in the application memorized in the memory unit.

2. The communication control apparatus of claim 1, characterized in that the selection unit selects as the one wireless communication path a wireless communication path having the slowest allowable limit timing calculated by the calculation unit, of the selected plural different wireless communication paths.

3. The communication control apparatus of claim 1, characterized in that the selection unit obtains the variation request time by subtracting the earliest ideal signal-reception timing from the slowest allowable limit timing calculated by the calculation unit in the selected plural different wireless communication paths.

4. A wireless communication apparatus, in which plural different IP wireless communication paths are selected between itself and a communication control apparatus, and a band insufficient in one of the wireless communication paths is complemented by another wireless communication path with respect to a request band of an application having real time characteristic in use, such that wireless communication with a corresponding party by way of the communication control apparatus is effected, comprising:
   a calculation unit for calculating, on the basis of a packet received by way of each wireless communication path, ideal signal-reception timing, which is a relationship between a transmission time of packet and a sequence number obtained, wherein the transmission time of the received packet is less than that of the ideal signal-reception timing for the same sequence number, and allowable limit timing of the packet received at the wireless communication path;
   a memory unit for variation absorbing time, which is an allowable time for a buffer storing received packets, in the received packet in the application; and
   a selection unit for selecting the plural different wireless communication paths such that variation request time, which is an accumulation time of the buffer in which no packet arriving from any wireless communication path is discarded, obtained on the basis of the ideal signal-reception timing and the allowable limit timing at each wireless communication path calculated by calculation unit, does not exceed the variation absorbing time in the application memorized in the memory unit.

5. The wireless communication apparatus of claim 4, characterized in that the selection unit selects as the one wireless communication path a wireless communication path having the slowest allowable limit timing calculated by the calculation unit, of the selected plural different wireless communication paths.

6. The wireless communication apparatus of claim 4, characterized in that the selection unit obtains the variation request time by subtracting the earliest ideal signal-reception timing from the slowest allowable limit timing calculated by the calculation unit in the selected plural different wireless communication paths.

7. A communication control method, in which plural different IP wireless communication paths are selected between itself and a wireless communication apparatus, and a band insufficient in one of the wireless communication paths is complemented by another wireless communication path with respect to a request band of an application having real time characteristic in use, such that communication between the wireless communication apparatus and a corresponding party thereof is controlled, comprising the steps of:
   calculating, on the basis of a packet received by way of each wireless communication path, ideal signal-reception timing, which is a relationship between a transmission time of packet and a sequence number obtained, wherein the transmission time of the received packet is less than that of the ideal signal-reception timing for the same sequence number, and allowable limit timing of the packet received at the wireless communication path;
   receiving and memorizing variation absorbing time, which is an allowable time for a buffer storing received packets, in the received packet in the application transmitted from the wireless communication apparatus; and
   selecting the plural different wireless communication paths such that variation request time, which is an accumulation time of the buffer in which no packet arriving from any wireless communication path is discarded, obtained on the basis of the ideal signal-reception timing and the allowable limit timing at the wireless communication path calculated in the calculating step, does not exceed the variation absorbing time in the application memorized in the memorizing step.

8. A wireless communication method, in which plural different IP wireless communication paths are selected between a wireless communication apparatus and a communication control apparatus, and a band insufficient in one of the wireless communication paths is complemented by another wireless communication path with respect to a request band of an application having real time characteristic in use, such that wireless communication with a corresponding party by way of the communication control apparatus is effected, comprising the steps of:
   calculating, on the basis of a packet received by way of each wireless communication path, ideal signal-reception timing, which is a relationship between a transmission time of packet and a sequence number obtained, wherein the transmission time of the received packet is less than that of the ideal signal-reception timing for the same sequence number, and allowable limit timing of the packet received at the wireless communication path; and
   selecting the plural different wireless communication paths such that variation absorbing time, which is an allowable time for a buffer storing received packets, obtained on the basis of the ideal signal-reception timing and the allowable limit timing at each wireless communication path calculated by the calculation step, does not exceed a variation absorbing time, which is an allowable time for a buffer storing received packets, in the application.

9. A communication control apparatus, in which plural different IP wireless communication paths are available for use between a wireless communication apparatus and itself, and a band insufficient in one of the wireless communication paths is complemented by another wireless communication path with respect to a request band of an application having real time characteristic in use, such that communication between the wireless communication apparatus and a corresponding party is controlled, comprising:
   a calculation unit for calculating, on the basis of a packet received by way of each wireless communication path, a range of allowable reception timing of packet reception at each wireless communication path;
   a band-state analyzing unit for analyzing a band state of the wireless communication path on the basis of comparison of reception timing of a packet transmitted at timing other than predetermined timing of transmission by the wireless communication apparatus, with the range of allowable reception timing calculated by the calculation unit with respect to the wireless communication path to which the packet has been transmitted; and
   a transmission control unit for transmitting to the wireless communication apparatus, based on a result of analysis by the band-state analyzing unit, transmission control information for controlling a transmission band of a packet at the wireless communication path.

10. A communication control apparatus, in which plural different IP wireless communication paths are available for use between a wireless communication apparatus and itself, and a band insufficient in one of the wireless communication paths is complemented by another wireless communication path with respect to a request band of an application having real time characteristic in use, such that communication between the wireless communication apparatus and a corresponding party is controlled, comprising:

a calculation unit for calculating, on the basis of a packet received by way of each wireless communication path, a range of allowable reception timing of packet reception at each wireless communication path; a band-state analyzing unit for analyzing a band state of the wireless communication path on the basis of comparison of reception timing of a packet transmitted at timing other than predetermined timing of transmission by the wireless communication apparatus, with the range of allowable reception timing calculated by the calculation unit with respect to the wireless communication path to which the packet has been transmitted; and a transmission control unit for transmitting to the wireless communication apparatus, based on a result of analysis by the band-state analyzing unit, transmission control information for controlling a transmission band of a packet at the wireless communication path.

11. A wireless communication apparatus, in which plural different IP wireless communication paths are available for use between itself and a communication control apparatus, and a band insufficient in one of the wireless communication paths is complemented by another wireless communication path with respect to a request band of an application having real time characteristic in use, such that communication between a corresponding party by way of the communication control apparatus is effected, comprising:

a calculation unit for calculating, on the basis of a packet received by way of each wireless communication path, a range of allowable reception timing of packet reception at each wireless communication path;

a band-state analyzing unit for analyzing a band state of the wireless communication path on the basis of comparison of reception timing of a packet transmitted at timing other than predetermined timing of transmission by the wireless communication apparatus, with the range of allowable reception timing calculated by the calculation unit with respect to the wireless communication path to which the packet has been transmitted; and a transmission control unit for transmitting to the communication control apparatus, based on a result of analysis by the band-state analyzing unit, transmission control information for controlling a transmission band of a packet at the wireless communication path.

12. The wireless communication apparatus of claim 11, characterized in that: the band-state analyzing unit analyzes that the allowable band of the wireless communication path is wider than the transmission band when the reception timing of a packet received earlier than the predetermined timing is within the range of the allowable reception timing at the wireless communication path calculated by the calculation unit; and the transmission control unit, when the band-state analyzing unit has analyzed that the allowable band is wider than the transmission band, transmits to the communication control apparatus the transmission control information for controllably broadening the transmission band of the wireless communication path.

13. A communication control method, in which plural IP different wireless communication paths are available for use between a communication control apparatus and a wireless communication apparatus, and a band insufficient in one of the wireless communication paths is complemented by another wireless communication path with respect to a request band of an application having real time characteristic in use, such that communication between the wireless communication apparatus and a corresponding party is controlled, comprising the steps of calculating, on the basis of a packet received by way of each wireless communication path, a range of allowable reception timing of packet reception at each wireless communication path; analyzing a band state of the wireless communication path on the basis of comparison of reception timing of a packet transmitted at timing other than predetermined timing of transmission by the wireless communication apparatus, with the range of allowable reception timing calculated with respect to the wireless communication path to which the packet has been transmitted; and transmitting to the wireless communication apparatus, based on a result of analysis of the band-state, transmission control information for controlling a transmission band of a packet at the wireless communication path.

* * * * *